US009969481B2

(12) United States Patent
Stigler et al.

(10) Patent No.: US 9,969,481 B2
(45) Date of Patent: May 15, 2018

(54) AUTONOMOUS INTELLIGENCE SURVEILLANCE RECONNAISSANCE AND PAYLOAD DELIVERY SYSTEM AND METHOD OF USING SAME

(71) Applicant: Silicis Technologies, Inc., Westfield, IN (US)

(72) Inventors: Michael J. Stigler, Westfield, IN (US); Nicholas James Setar, Westfield, IN (US)

(73) Assignee: Silicis Technologies, Inc., Westfield, IN (US)

( * ) Notice: Subject to any disclaimer, the term of this patent is extended or adjusted under 35 U.S.C. 154(b) by 0 days. days.

(21) Appl. No.: 15/160,874

(22) Filed: May 20, 2016

(65) Prior Publication Data
US 2016/0375976 A1  Dec. 29, 2016

Related U.S. Application Data

(62) Division of application No. 13/568,025, filed on Aug. 6, 2012, now Pat. No. 9,373,262.
(Continued)

(51) Int. Cl.
| | |
|---|---|
| *B64B 1/12* | (2006.01) |
| *G08G 5/00* | (2006.01) |
| *B64B 1/10* | (2006.01) |
| *B64B 1/14* | (2006.01) |
| *B64B 1/22* | (2006.01) |
| *B64B 1/24* | (2006.01) |
| *B64B 1/60* | (2006.01) |
| *B64B 1/62* | (2006.01) |
| *B64B 1/64* | (2006.01) |
| *B64B 1/66* | (2006.01) |
| *B64C 39/02* | (2006.01) |

(Continued)

(52) U.S. Cl.
CPC ............. *B64B 1/12* (2013.01); *B64B 1/005* (2013.01); *B64B 1/10* (2013.01); *B64B 1/14* (2013.01); *B64B 1/18* (2013.01); *B64B 1/22* (2013.01); *B64B 1/24* (2013.01); *B64B 1/36* (2013.01); *B64B 1/60* (2013.01); *B64B 1/62* (2013.01); *B64B 1/64* (2013.01); *B64B 1/66* (2013.01); *B64C 39/024* (2013.01); *G05D 1/0027* (2013.01); *G05D 1/101* (2013.01); *G08G 5/0069* (2013.01); *G09F 21/04* (2013.01); *G09F 21/06* (2013.01); *B64C 2201/022* (2013.01); *B64C 2201/126* (2013.01); *B64C 2201/127* (2013.01); *B64C 2201/141* (2013.01)

(58) Field of Classification Search
CPC ..................................... B64B 1/10; B64B 1/12
See application file for complete search history.

(56) References Cited

U.S. PATENT DOCUMENTS 5,348,251 A * 9/1994 Ferguson ................. B64B 1/02
 244/29
5,358,200 A * 10/1994 Onda ....................... B64B 1/10
 244/29

* cited by examiner

*Primary Examiner* — Brian M O'Hara
(74) *Attorney, Agent, or Firm* — Ice Miller LLP

(57) ABSTRACT

An intelligence, surveillance, and reconnaissance system is disclosed including a ground station and one or more aerial vehicles. The aerial vehicles are autonomous systems capable of communicating intelligence data to the ground station and be used as part of a missile delivery package. A plurality of aerial vehicles can be configured to cast a wide net of reconnaissance over a large area on the ground including smaller overlapping reconnaissance areas provided by each of the plurality of the aerial vehicles.

16 Claims, 36 Drawing Sheets

Related U.S. Application Data

(60) Provisional application No. 61/515,314, filed on Aug. 4, 2011, provisional application No. 61/573,858, filed on Sep. 13, 2011, provisional application No. 61/610,884, filed on Mar. 14, 2012.

(51) Int. Cl.
*G09F 21/04* (2006.01)
*G09F 21/06* (2006.01)
*B64B 1/00* (2006.01)
*B64B 1/18* (2006.01)
*G05D 1/00* (2006.01)
*B64B 1/36* (2006.01)
*G05D 1/10* (2006.01)

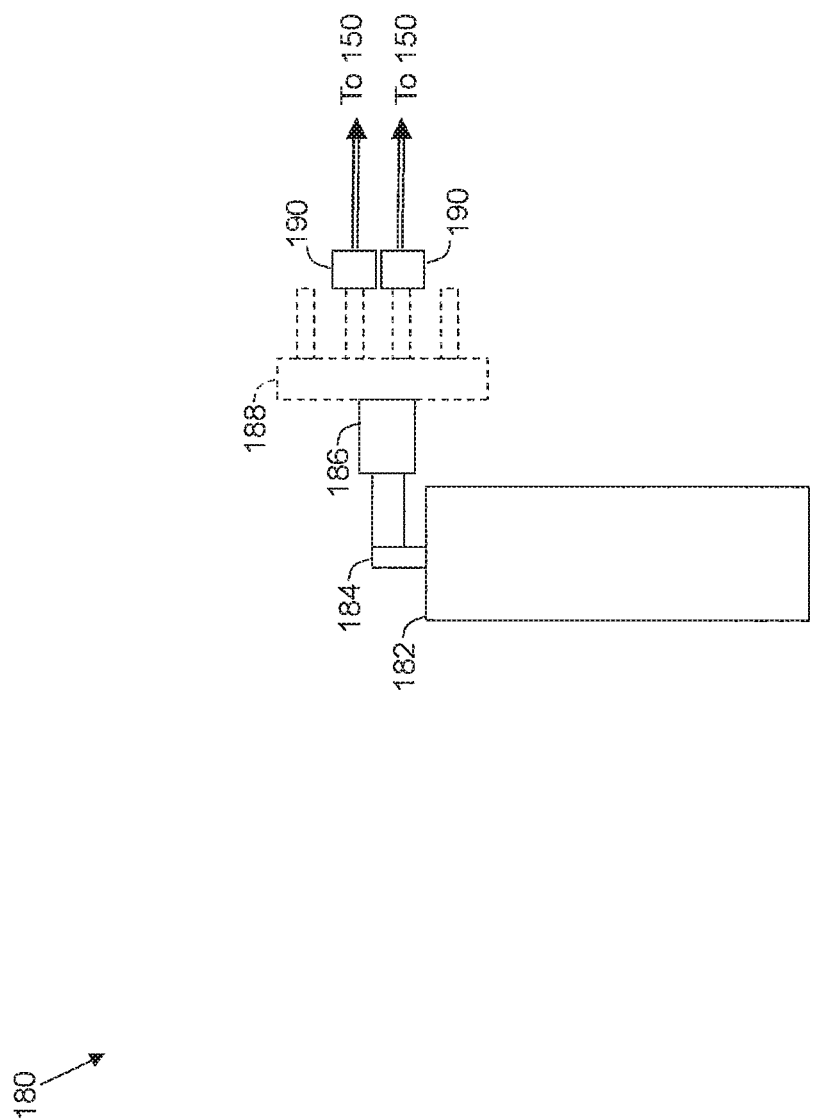

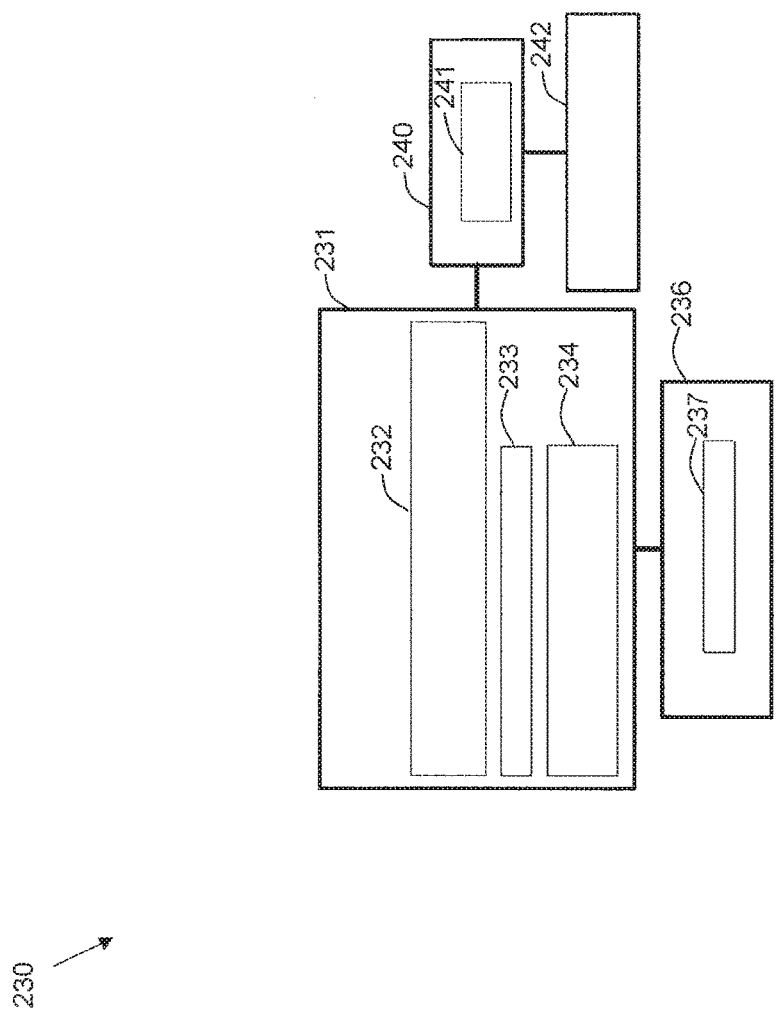

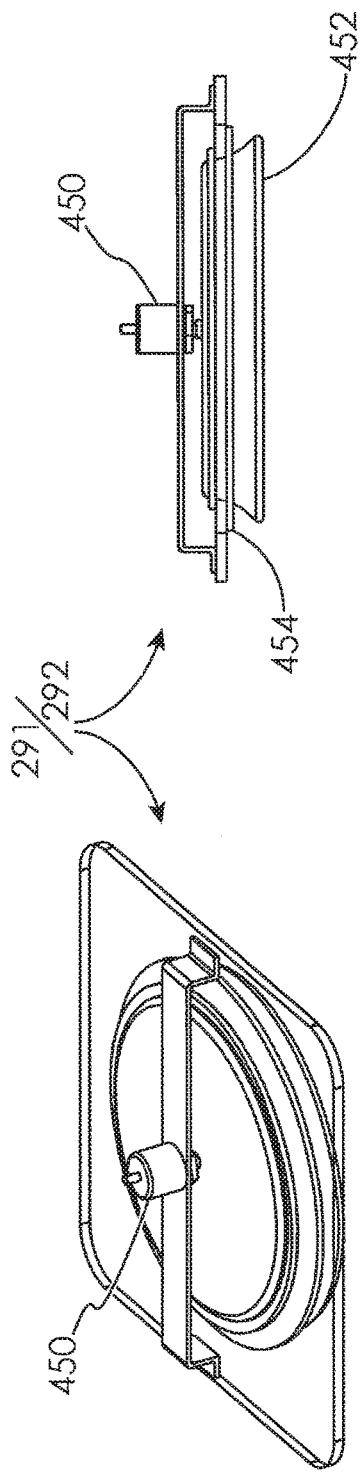
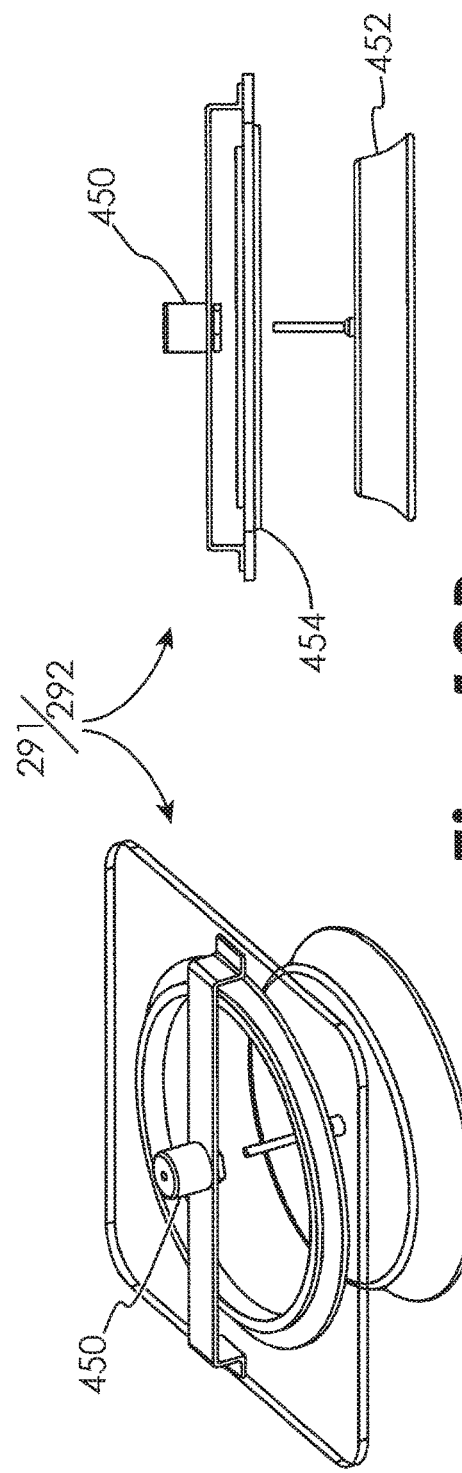

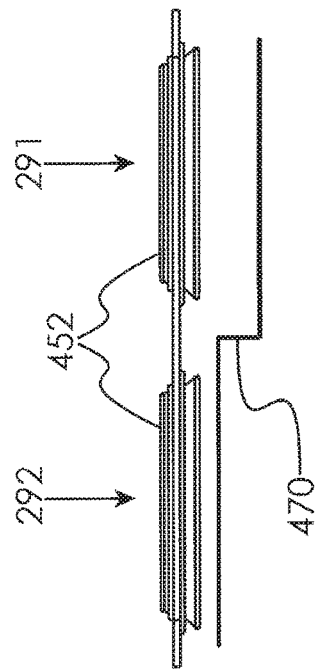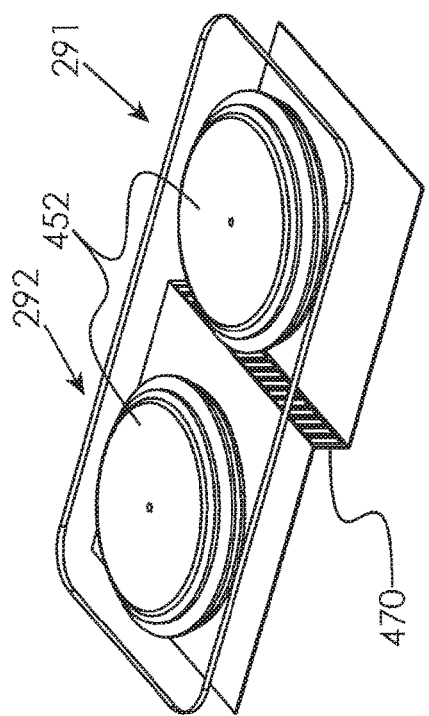
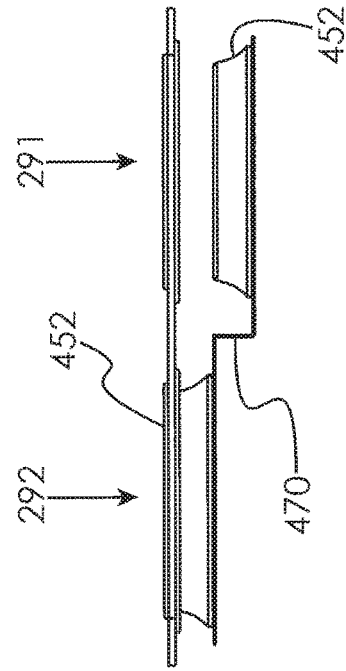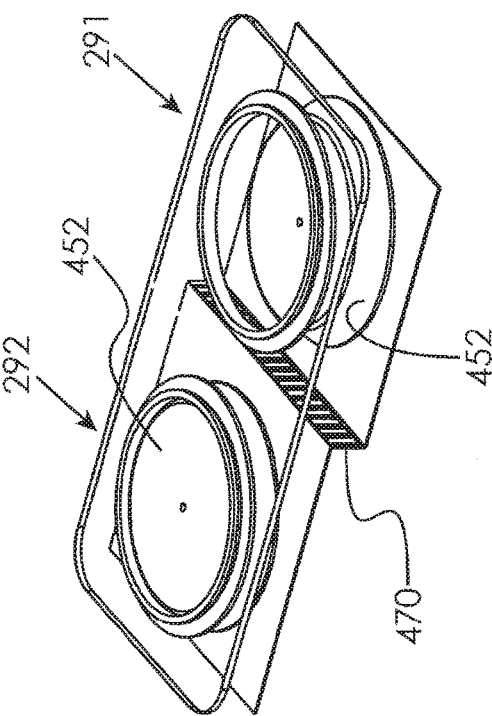
Fig. 22A
Fig. 22B

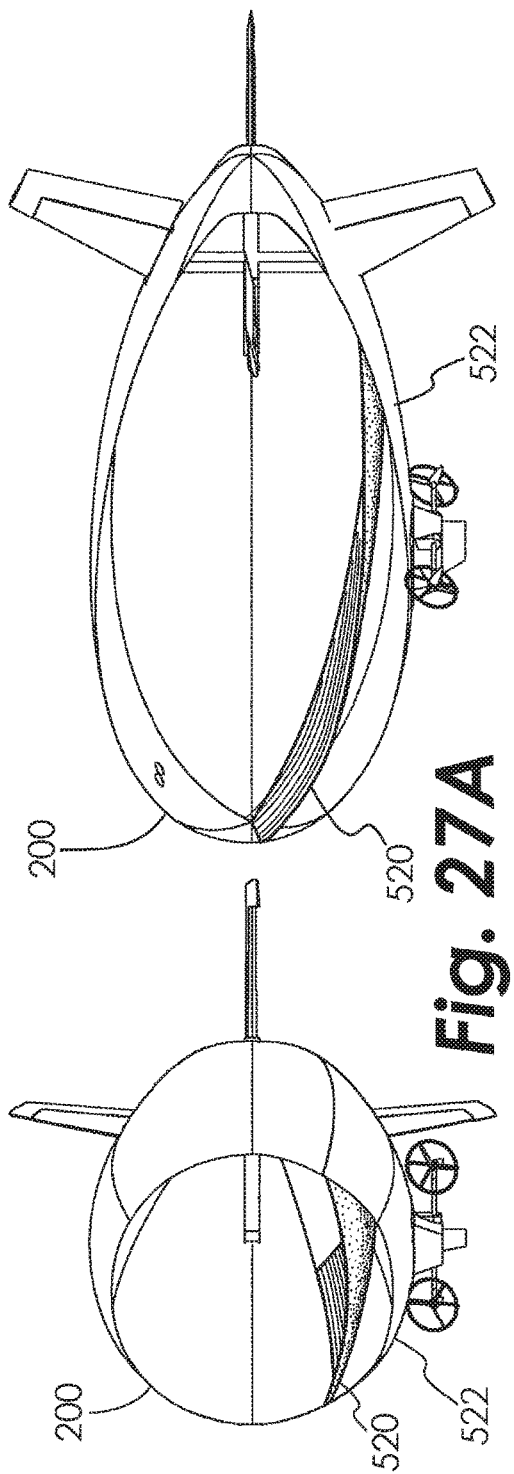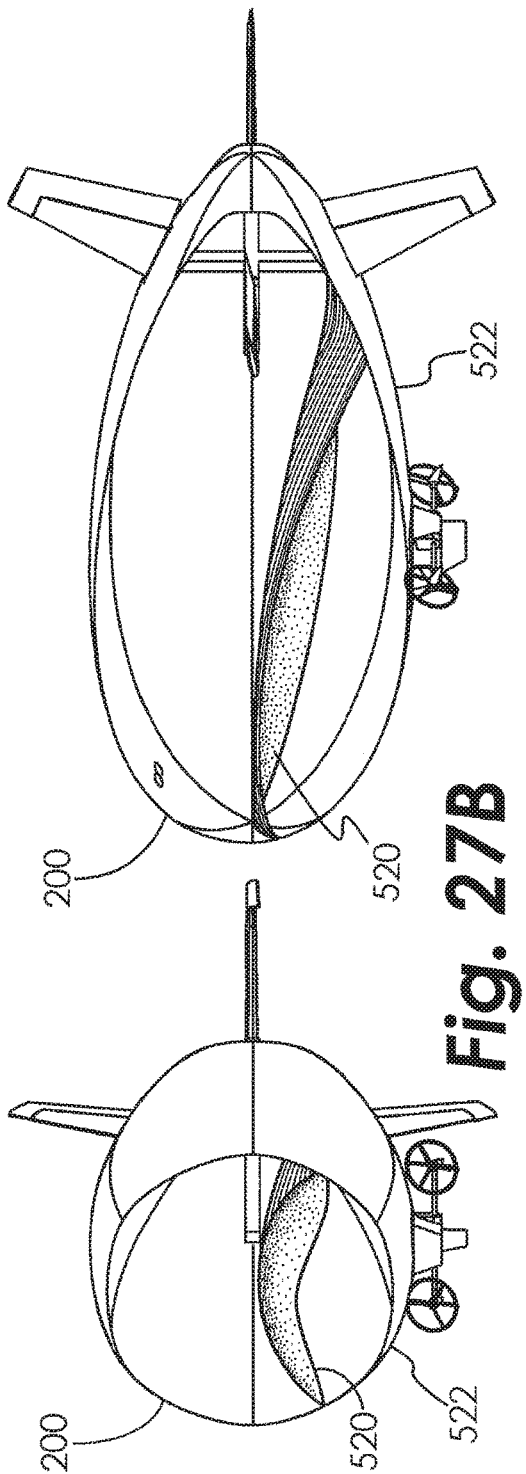
Fig. 27A
Fig. 27B

AUTONOMOUS INTELLIGENCE SURVEILLANCE RECONNAISSANCE AND PAYLOAD DELIVERY SYSTEM AND METHOD OF USING SAME

CROSS-REFERENCE TO RELATED APPLICATIONS

This application claims the benefit of and is a divisional of U.S. patent application Ser. No. 13/568,025, filed Aug. 6, 2012, which claims the benefit of U.S. Provisional Patent Application No. 61/515,314, filed Aug. 4, 2011, U.S. Provisional Patent Application No. 61/573,858, filed Sep. 13, 2011, and U.S. Provisional Patent Application No. 61/610,884, filed Mar. 14, 2012, the contents of each of which are hereby incorporated by reference.

TECHNICAL FIELD

The present disclosure generally relates to autonomous or semi-autonomous aircraft and other vehicles and a system and method for controlling aircraft and other vehicles.

BACKGROUND

Since the early days of intelligence satellites, aerial surveillance and reconnaissance has been a paramount feature of the intelligence community. Satellite reconnaissance, however, suffers from many drawbacks. For example, satellites are very costly to manufacture, deploy and operate. In addition, in order to monitor a particular area on the ground, the position of a geosynchronous orbit satellite may need to be changed. The process of changing the position of a satellite is costly and cumbersome. Furthermore, some satellites are not configured to provide continuous high resolution video monitoring of an area. In some cases, the satellites are configured to only provide high resolution still images.

Other aerial reconnaissance vehicles include manned or unmanned aerial vehicles, such as intelligence aircraft, e.g., unmanned drones. However, these aerial vehicles also suffer from drawbacks. For example, the length of time an aerial vehicle can remain above a particular area is limited to amount of fuel and/or battery charge onboard the vehicle. In addition, operational costs of these vehicles can also be high and prohibitive of widespread use. In fact, the cost of operation alone is a limiting factor for widespread use of these vehicles in modern reconnaissance operations.

Therefore, a low cost intelligence, surveillance and reconnaissance system including one or several aerial vehicles is needed to provide useful intelligence in widespread reconnaissance operations.

SUMMARY

The present disclosure provides an intelligence, surveillance, and reconnaissance system including a ground station and one or more aerial vehicles. The aerial vehicles are autonomous systems capable of communicating intelligence data to the ground station and can be used as part of a payload delivery package. A plurality of aerial vehicles can be configured to cast a wide net of reconnaissance over a large area on the ground including smaller overlapping reconnaissance areas provided by each of the plurality of the aerial vehicles. In some embodiments, the vehicles are not aerial vehicles.

In one embodiment, a method of operating a vehicle system comprising an autonomous vehicle and a command and control interface station having at least intermittent communication with the vehicle is disclosed, the method comprising the steps of: a) the vehicle monitoring a plurality of environment data; b) the vehicle calculating, based at least in part upon the environment data, a soft wall radius from which it can return to the command and control interface station; c) the vehicle receiving a destination position to which it is commanded to fly; d) the vehicle determining if the destination position is beyond the soft wall radius; and e) the vehicle communicating an alert to the command and control interface station if the destination position is beyond the soft wall radius.

In another embodiment, a vehicle is disclosed, comprising: a skin defining an interior volume adapted to hold a quantity of fluid that is lighter than air; a blow-hole formed in the skin; a valve positioned in said blow-hole and having a closed position sealing the blow-hole and an opened position allowing the fluid to escape from within the interior volume; and a solenoid operatively coupled to the valve; wherein the valve is biased toward the opened position and changing a state of the solenoid allows the valve to assume the opened position.

In another embodiment, a vehicle is disclosed, comprising: a skin defining an interior volume adapted to hold a first quantity of fluid that is lighter than air; a bladder releasably coupled to an exterior portion of the skin, the bladder adapted to hold a second quantity of fluid that is lighter than air; wherein the first quantity of fluid does not intermingle with the second quantity of fluid.

In another embodiment, a vehicle is disclosed, comprising: a skin defining an interior volume adapted to hold a first quantity of fluid that is lighter than air; at least one closable aperture in the skin; a ballonet disposed within the interior volume and adapted to hold a second quantity of fluid; and at least one lumen fluidically coupling the ballonet and the at least one aperture for controllable flow of fluid therebetween; wherein the ballonet is not coupled to the skin except by the at least one lumen.

In another embodiment, a fin assembly for a vehicle having a skin defining an interior volume adapted to hold a first quantity of fluid that is lighter than air, the fin assembly comprising: a first rod disposed within the interior volume, the first rod having a first end and a second end; a second rod disposed within the interior volume, the second rod having a third end and a fourth end; a first horizontal fin disposed external to the interior volume and operatively coupled to the first end through the skin; a second horizontal fin disposed external to the interior volume and operatively coupled to the second end through the skin; a first vertical fin disposed external to the interior volume and operatively coupled to the third end through the skin; and a second vertical fin disposed external to the interior volume and operatively coupled to the fourth end through the skin.

In another embodiment, a fin assembly for a vehicle having a skin defining an interior volume adapted to hold a first quantity of fluid that is lighter than air is disclosed, the fin assembly comprising: a support attached to an exterior surface of the skin; and at least one fin coupled to the support.

In another embodiment, a vehicle is disclosed, comprising: a main system processor operative to control the vehicle; a subsystem that is detachable from the vehicle, the subsystem comprising: a subsystem processor; and a communication bus coupling the main system processor and the subsystem processor when the subsystem is attached to the vehicle; and wherein when the subsystem is attached to the vehicle, the subsystem processor is operative to self-configure the subsystem without control input from the main system processor; wherein when the subsystem is attached to the vehicle, the subsystem processor is operative to announce its presence to the main system processor over the communication bus; and wherein the main system processor is operative to take an action if it determines that a predetermined set of subsystems has not announced their presence, the action selected from the group consisting of: preventing the vehicle from operating, and creating an alert signal; wherein the valve is biased toward the opened position and changing a state of the solenoid allows the valve to assume the opened position.

In another embodiment, a system is disclosed, comprising: a vehicle, comprising: a skin defining an interior volume adapted to hold a quantity of fluid that is lighter than air; a vehicle control system; a first coupler formed in the skin; and a radio frequency identification (RFID) tag disposed adjacent the fluid coupler; and a fluid charging station, comprising: a supply of fluid; a hose coupled to the supply of fluid; a second coupler coupled to the hose, the second coupler adapted to mate with the first coupler; an RFID reader adapted to read the RFID tag when the first and second couplers are mated; and a command and control interface station operatively coupled to the vehicle control system for receipt of first information therefrom, the hose, and the RFID reader for receipt of second information therefrom; wherein the command and control interface station is operative to prevent flow of fluid from the supply of fluid to the first coupler based upon a comparison of the first information and the second information.

In another embodiment, a method for charging a vehicle with a fluid, the vehicle comprising an interior volume, a vehicle control system and a radio frequency identification (RFID) tag is disclosed, the method comprising the steps of: a) receiving from the vehicle control system first information indicating a first quantity of fluid that may be held by the interior volume; b) receiving from the RFID tag second information indicating a second quantity of fluid that may be held by the interior volume; c) if the first quantity and the second quantity match, allowing fluid to flow into the interior volume; and d) if the first quantity and the second quantity do not match, preventing fluid from flowing into the interior volume.

In another embodiment, a vehicle is disclosed, comprising: a skin defining an interior volume adapted to hold a first quantity of fluid that is lighter than air; a spool operatively coupled to the skin; a source of rotary motion coupled to the spool; and a tether operatively coupled to the spool such that it may be extended therefrom by the source of rotary motion spinning the spool.

In another embodiment, a method of grounding a lighter-than-air vehicle having an extendable and retractable tether, the method comprising the steps of: a) extending the tether distally from the vehicle; b) substantially fixing a position of a distal end of the tether; and c) retracting the tether to the vehicle, whereby the vehicle is caused to move toward the distal end of the tether.

In another embodiment, a vehicle is disclosed, comprising: a skin comprising a plurality of gores defining an interior volume adapted to hold a first quantity of fluid that is lighter than air; wherein at least one of the plurality of gores disposed on a bottom of the skin is thicker than others of the plurality of gores.

In another embodiment, a vehicle is disclosed, comprising: a skin comprising a plurality of gores defining an interior volume adapted to hold a first quantity of fluid that is lighter than air; wherein at least one of the plurality of gores disposed on a bottom of the skin has a different planar size than others of the plurality of gores.

In another embodiment, a vehicle is disclosed, comprising: a skin comprising a plurality of gores defining an interior volume adapted to hold a first quantity of fluid that is lighter than air; wherein all of the plurality of gores are selected from the group consisting of: transparent, substantially transparent, semi-transparent, and translucent.

In another embodiment, a vehicle is disclosed, comprising: a skin defining an interior volume adapted to hold a quantity of fluid that is lighter than air; a blow-hole formed in the skin; a valve positioned in said blow-hole and having a closed position sealing the blow-hole and an opened position allowing the fluid to escape from within the interior volume, the valve comprising a valve body and a valve seat; and a solenoid operatively coupled to the valve; wherein the valve is biased toward the opened position and changing a state of the solenoid allows the valve to assume the opened position; and a travel limiting stop disposed adjacent the valve and limiting a distance the valve body may travel in the opened position.

In another embodiment, a vehicle is disclosed, comprising: a skin defining an interior volume adapted to hold a quantity of fluid that is lighter than air; and a gondola operatively coupled to the skin, the gondola comprising at least one layer of ballistic fabric.

In another embodiment, a method of operating an autonomous vehicle is disclosed, comprising the steps of: a) an autonomous controller operating the vehicle at a first location; b) the autonomous controller sensing that the vehicle has been hit by a projectile; and c) in response to sensing that the vehicle has been hit by a projectile, the autonomous controller causing the vehicle to move to a second location.

In another embodiment, a vehicle is disclosed, comprising: a skin defining an interior volume adapted to hold a quantity of fluid that is lighter than air; and a plurality of gondolas operatively coupled to the skin.

In another embodiment, a vehicle is disclosed, comprising: a skin defining an interior volume adapted to hold a quantity of fluid that is lighter than air; at least one hollow sleeve formed in the skin; and at least one reinforcing element disposed within a respective one of the at least one hollow sleeve.

In another embodiment, a vehicle is disclosed, comprising: a skin defining an interior volume adapted to hold a quantity of fluid that is lighter than air; a blow-hole formed in the skin; a valve positioned in said blow-hole and having a closed position sealing the blow-hole and an opened position allowing the fluid to escape from within the interior volume, the valve comprising a valve body and a valve seat; and a solenoid operatively coupled to the valve; a blower in line with the valve; wherein when the valve is biased toward the opened position and the blower is activated, a portion of the fluid may be actively vented from the interior volume.

In another embodiment, a vehicle is disclosed, comprising: a skin defining an interior volume adapted to hold a quantity of fluid that is lighter than air; at least one movable opening formed in the skin; and at least one payload bay formed within the interior volume adjacent the movable opening.

In another embodiment, a vehicle system is disclosed, comprising: an aerial vehicle comprising skin defining an interior volume adapted to hold a quantity of fluid that is lighter than air; a ground vehicle; and a tether coupling the aerial vehicle to the ground vehicle.

In another embodiment, a vehicle is disclosed, comprising: a skin defining an interior volume adapted to hold a quantity of fluid that is lighter than air; at least one inflatable fin coupled to the skin; and at least one non-inflatable controllable surface coupled to a respective one of the at least one inflatable fin.

In another embodiment, a vehicle is disclosed, comprising: a skin defining an interior volume adapted to hold a quantity of fluid that is lighter than air; at least one light source disposed within the interior volume; and a control system operative to control illumination of the at least one light source in order to create a coded illuminated message.

In another embodiment, a vehicle is disclosed, comprising: a skin defining a first interior volume adapted to hold a quantity of fluid that is lighter than air; and at least one pocket defining a second interior volume and disposed on the skin such that the skin at least partially separates the first and second interior volumes.

In another embodiment, an autonomous lighter-than-air vehicle is disclosed, comprising: a skin defining an interior volume adapted to hold a quantity of fluid that is lighter than air; and at least one service tool carried onboard the autonomous lighter-than-air vehicle; wherein the at least one service tool enables the autonomous lighter-than-air vehicle to be repaired when away from a dedicated repair facility.

In another embodiment, a vehicle is disclosed, comprising: a skin defining a first interior volume adapted to hold a quantity of fluid that is lighter than air; and a section of material disposed within the interior volume, the section of material coupled to the skin around an entire perimeter thereof to define a second interior volume.

In another embodiment, a vehicle is disclosed, comprising: a skin defining a first interior volume adapted to hold a first quantity of fluid that is lighter than air; and a ballonet defining a second interior volume, the ballonet disposed within the interior volume and adapted to hold a second quantity of fluid; wherein the second interior volume comprises about 30% to about 99% of the first interior volume.

In another embodiment, a vehicle is disclosed, comprising: a skin comprising multiple sections joined together and defining a first interior volume adapted to hold a first quantity of fluid that is lighter than air; and a filament joined to at least one of the multiple sections and adapted to cause the at least one section to assume a predetermined shape when inflated.

In another embodiment, a vehicle is disclosed, comprising: a skin defining a first interior volume adapted to hold a first quantity of fluid that is lighter than air; and at least one tube adapted to hold a second quantity of pressurized fluid; wherein the at least one tube causes the skin to assume a predetermined shape when the at least one tube is pressurized.

In another embodiment, a vehicle is disclosed, comprising: a skin defining an interior volume adapted to hold a quantity of fluid that is lighter than air; and at least one divider disposed in the interior volume and operative to divide the interior volume into a plurality of chambers; wherein fluid in each of the plurality of chambers is isolated from others of the plurality of chambers.

In another embodiment, a vehicle is disclosed, comprising: a skin defining an interior volume adapted to hold a quantity of fluid that is lighter than air; and a propulsion system operatively coupled to the skin; and a touch sensor operatively coupled to the skin and to the propulsion system; wherein the touch sensor is operative to prevent the propulsion system from being activated when the touch sensor senses contact with an operator.

In another embodiment, a method of grounding a lighter-than-air vehicle having a vectored thrust propulsion system is disclosed, the method comprising the steps of: a) selecting a first thrust vector for the propulsion system; b) flying the vehicle to the ground; and c) selecting a second thrust vector for the propulsion system, wherein the second thrust vector is chosen such that the second thrust vector causes the vehicle to remain in contact with the ground.

In another embodiment, a vehicle is disclosed, comprising: a skin defining an interior volume adapted to hold a quantity of fluid that is lighter than air; a gondola operatively coupled to the skin; and at least one fin coupled to the gondola.

In another embodiment, a method of sealing a bundled wire having an outer casing, a first end, and a second end is disclosed, the method comprising the steps of: a) inserting the first end into a quantity of non-solid sealant; b) applying a vacuum to the second end; and c) after sealant has entered an interior of the outer casing, allowing the sealant to cure.

In another embodiment, a vehicle is disclosed, comprising: a skin defining an interior volume adapted to hold a quantity of fluid that is lighter than air; at least one tail fin mounted on the skin and defining an x axis, y axis, and z axis of the vehicle, wherein a plane containing the x axis and z axis bisects each at least one tail fin; and at least one side force generating fin operatively coupled on or near a centerline of the vehicle and operative to generate lateral force along the y axis and substantially no moment about the z-axis.

In another embodiment, a vehicle is disclosed, comprising: a skin defining an interior volume adapted to hold a first quantity of fluid that is lighter than air; a tether operatively coupled to the skin; and a tension gauge operatively coupled to the tether and operative to measure a tension force in the tether.

In another embodiment, a vehicle is disclosed, comprising: a skin defining an interior volume adapted to hold a first quantity of fluid that is lighter than air; a tether operatively coupled to the skin, the tether including a portion that is operative to temporarily linearly expand under tension.

In another embodiment, a vehicle is disclosed, comprising: a skin defining an interior volume adapted to hold a first quantity of fluid that is lighter than air; a tether attachment plate operatively coupled to the skin; and a tether operatively coupled to the tether attachment plate.

In another embodiment, a method of communicating information between a plurality of lighter-than-air vehicles is disclosed, the method comprising the steps of: a) each of the plurality of vehicles monitoring information at the current location of the vehicle; b) each of the plurality of vehicles communicating the monitored information to each of the other of the plurality of vehicles; and c) at least one of the plurality of vehicles taking an action based upon information communicated to that vehicle.

In another embodiment, a vehicle is disclosed, comprising: a skin defining an interior volume adapted to hold a first quantity of fluid that is lighter than air; an attachment plate operatively coupled to the skin; a device operatively coupled to the attachment plate; and at least one magnet operatively coupled to at least one of the attachment plate and the device.

In another embodiment, a vehicle system is disclosed, comprising: a skin defining an interior volume adapted to hold a first quantity of fluid that is lighter than air; a cocoon, comprising: a first portion having at least one first attachment coupler disposed on a first periphery of the first portion, the first portion being disposed over at least a portion of a top surface of the skin; a second portion having at least one second attachment coupler disposed on a second periphery of the second portion, the second portion being disposed under at least a portion of a bottom surface of the skin; wherein the first and second attachment couplers are coupled to one another; and at least one guy wire having a first end operatively coupled to the cocoon and a second end operatively coupled to ground.

Other embodiments are also disclosed.

BRIEF DESCRIPTION OF DRAWINGS

FIG. 5 is a schematic view of the smart charging station of FIG. 2.

FIG. 7 is a block diagram of the propulsion bay of FIG. 6A depicting various components of the propulsion bay.

FIGS. 18A-B are schematic representations of solenoid controlled blow-hole valves according to one embodiment of the present disclosure.

FIG. 22A-B is a schematic representation of a travel limiting stop used with solenoid controlled blow-hole valves according to one embodiment of the present disclosure.

FIGS. 27A-B are schematic representations of a vehicle having a ballonet that is formed from a double ply gore that is part of the vehicle envelope according to one embodiment of the present disclosure.

DETAILED DESCRIPTION

Figure 1:
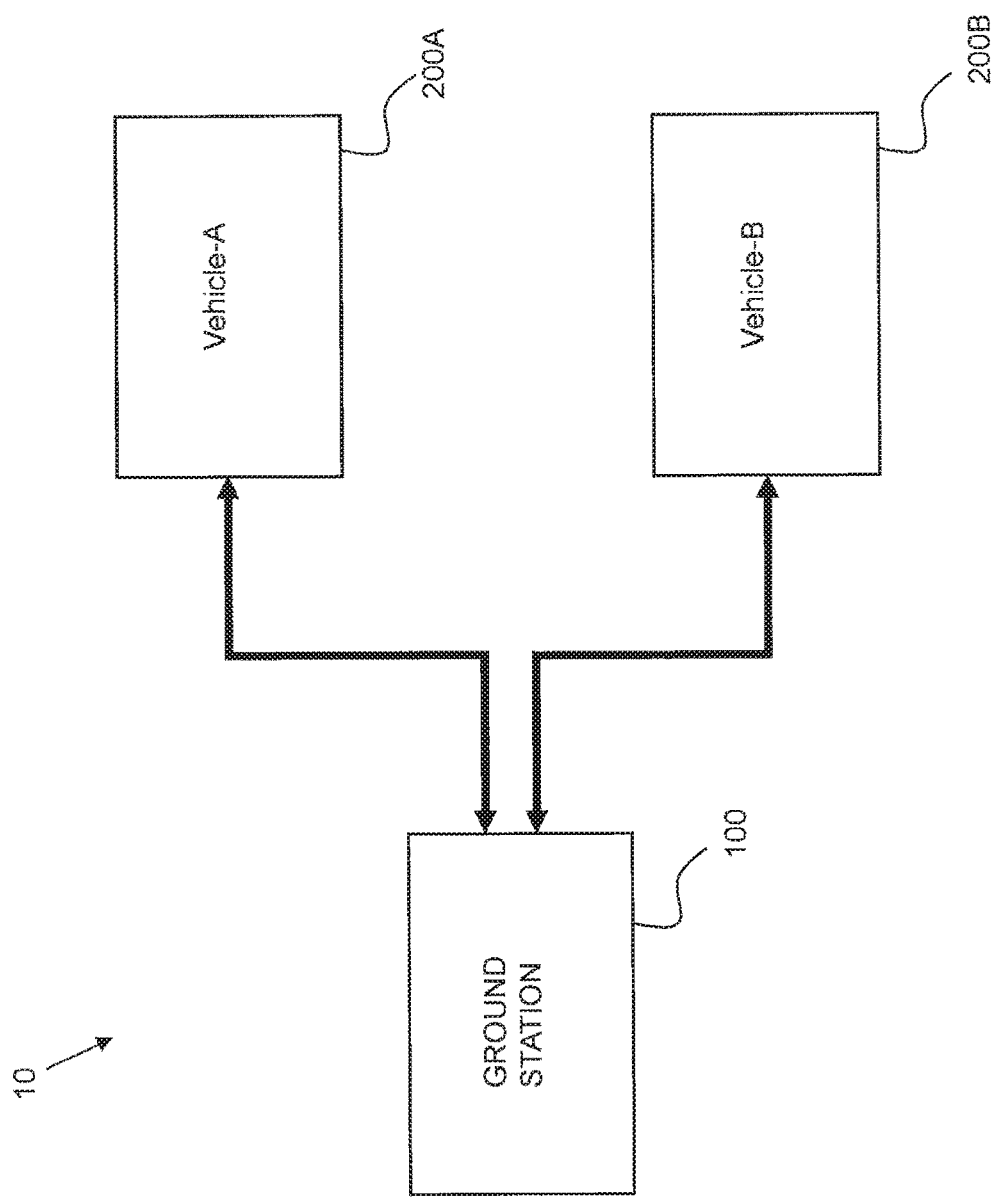
FIG. 1 is a block diagram of an aerial reconnaissance system according to the present disclosure, including a ground station and multiple vehicles.

For the purposes of promoting an understanding of the principles of the present disclosure, reference will now be made to the embodiments illustrated in the drawings and described in the following written specification. It is understood that no limitation to the scope of the present disclosure is thereby intended. It is further understood that the present disclosure includes any alterations and modifications to the illustrated embodiments and includes further applications of the principles of the present disclosure as would normally occur to one of ordinary skill in the art to which this disclosure pertains.

An aerial intelligence surveillance and reconnaissance system (ISRS) capable of delivering payloads to targets has been developed and is described in the present disclosure. While the ISRS is described herein in reference to an autonomous self-propelled lighter than air vehicle, it should be appreciated that the ISRS is also operational with different types of aerial, ground-base, and water-base vehicles. For example, in addition to or in place of the autonomous self-propelled lighter than air type vehicles, the ISRS can be implemented with any number of autonomous vehicles such as helicopters, rotary propelled aircraft, turbofan propelled aircraft, jet propelled aircraft, wheeled ground vehicles, spacecraft, over-water and underwater vehicles, and other mobile crafts or devices. In one aspect of the disclosure, each of these vehicles can be autonomous in the sense that it is configured to operate to carry out a mission (or that vehicle's part of a mission) with minimal user interactions beyond inputting the mission parameters and other details. In another aspect, each vehicle can be further configured to return to the home station or another predetermined coordinate under their own control in a normal mode or a duress mode. As described below, it should also be noted that the ISRS can be tethered to another vehicle or a ground-based device. Furthermore, as explained below, the ISRS may be configured to be transformed between a tethered formation and an untethered formation.

Ground Station and Aerial Vehicle(s)

Referring to FIG. 1, a block diagram of the ISRS 10 according to the present disclosure is depicted. The ISRS 10 includes a ground station system 100 and one or more aerial vehicles 200A and 200B. It should be appreciated that the reference numeral 200 may be used to indicate a singular vehicle. The ground station system 100 is in two-way communication with the vehicles 200A and 200B, by way of communication links as indicated by the double arrow lines connecting these components. In one embodiment, the ground station 100 may be in communication with other client devices (not shown) to provide information exchange including information from the vehicle and to provide information to the vehicle. In yet a further embodiment, these clients may be in communication with or form part of the ground station 100 configured to provide information or commands back to the ground station 100 or directly to the vehicles 200A and 200B. The communication links can be radio frequency links, optical links including laser links, tether links, and a variety of other types of links known to a person of ordinary skill in the art. As described further below, ground station system 100 may provide a variety of information/commands for the vehicles 200, such as targeting, weather, satellite location information (in the event of the vehicle's 200 loss of GPS signal), navigation commands, and desired user tasks (e.g., loitering), to name just a few non-limiting examples, while the vehicles 200 provide reconnaissance and other information back to the ground station system 100. Such information can include, among other things, still images, live video, audio, heat signatures, and other information obtained from or provided to a variety of other active and passive sensors and other intelligence components onboard the vehicles 200A and 200B. Although hereafter the vehicle is described as aerial vehicle 200, it is within the scope of this disclosure for other types of vehicles to be used instead, including without the limitation those mentioned above. Furthermore, ground station 100 can also be considered as a home station positioned above ground, below ground, on water, below water, etc.

In addition to using the vehicles 200A and 200B in an intelligence gathering mode, the vehicles 200A and 200B can also be used in an operational mode as part of a missile strike package. For example, as part of a missile strike package while a camera (not shown) in vehicles 200A and 200B is panning an area, the ISRS 10 can be configured to utilize a commercially available targeting subsystem so that a target can be chosen by the ground station system 100 and communicated to the vehicles 200A and 200B. An independent laser painting apparatus (not shown) can be utilized on the vehicles 200A and 200B to paint the designated target and independently lock the laser on the target despite movements of the vehicles 200A and 200B using a stabilizing apparatus (not shown). The communication link between the ground station system 100 and the vehicles 200A and 200B can monitor and verify placement of the laser on the target and make fine-tuning adjustments as needed. Navigational systems onboard an incoming missile can then locate and use the spot on the target generated by the laser beam to make final calculations to accurately strike the painted target. In the prior art, painting of a target is performed by special operation forces near the target who are thus placed in harm's way. By utilizing the laser painting apparatus carried by the vehicle 200, the need to place special operation forces in harm's way can be significantly reduced.

Figure 2:
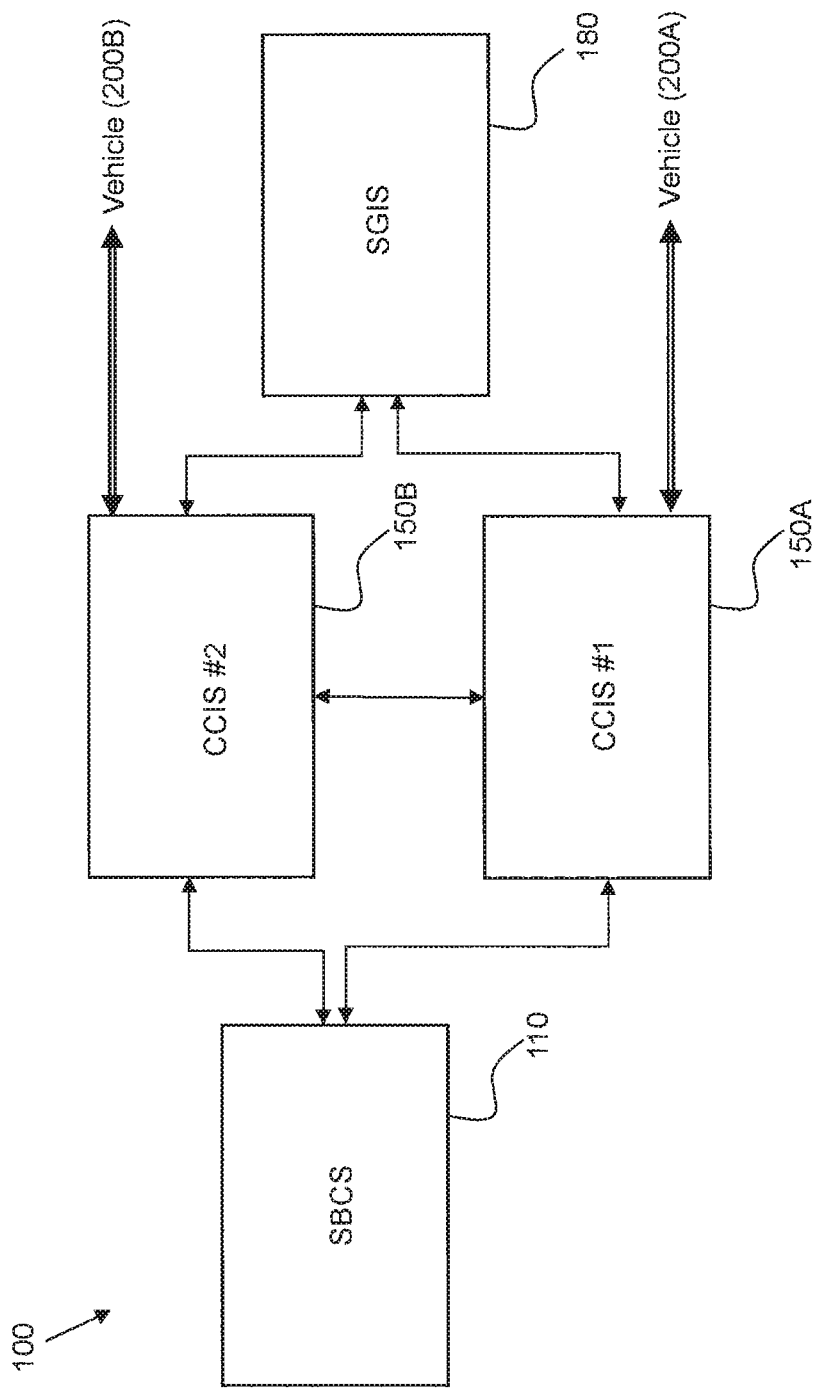
FIG. 2 is a block diagram of the ground station of FIG. 1, depicting various components of the ground station including a battery charging station, one or more ground stations and a gas inflation station according to one embodiment of the present disclosure.

Referring to FIG. 2, a block diagram of the ground station system 100 is depicted. The ground station system 100 includes a smart battery charger station (SBCS) 110, one or more command and control interface silos (CCIS) 150A and 150B, and a smart gas inflation station (SGIS) 180. The SBCS 110 is connected to and in communication with the CCIS 150A and 150B. The CCIS 150A and 150B are in electrical and fluid communication with the SGIS 180 as well as vehicles 200A and 200B. In one embodiment, a single CCIS 150 may control a number of vehicles 200A and 200B; theoretically, hundreds or thousands of vehicles 200A and 200B can be controlled by a single CCIS 150.

Referring to FIG. 2, in one embodiment, when there are multiple CCIS 150, these units can share information, resources, and command or ownership of the vehicles 200A and 200B. The reader should appreciate that where CCIS 150 is used herein, such a usage is relevant to either CCIS 150A and 150B.

Smart Battery Charger Station

Figure 3:
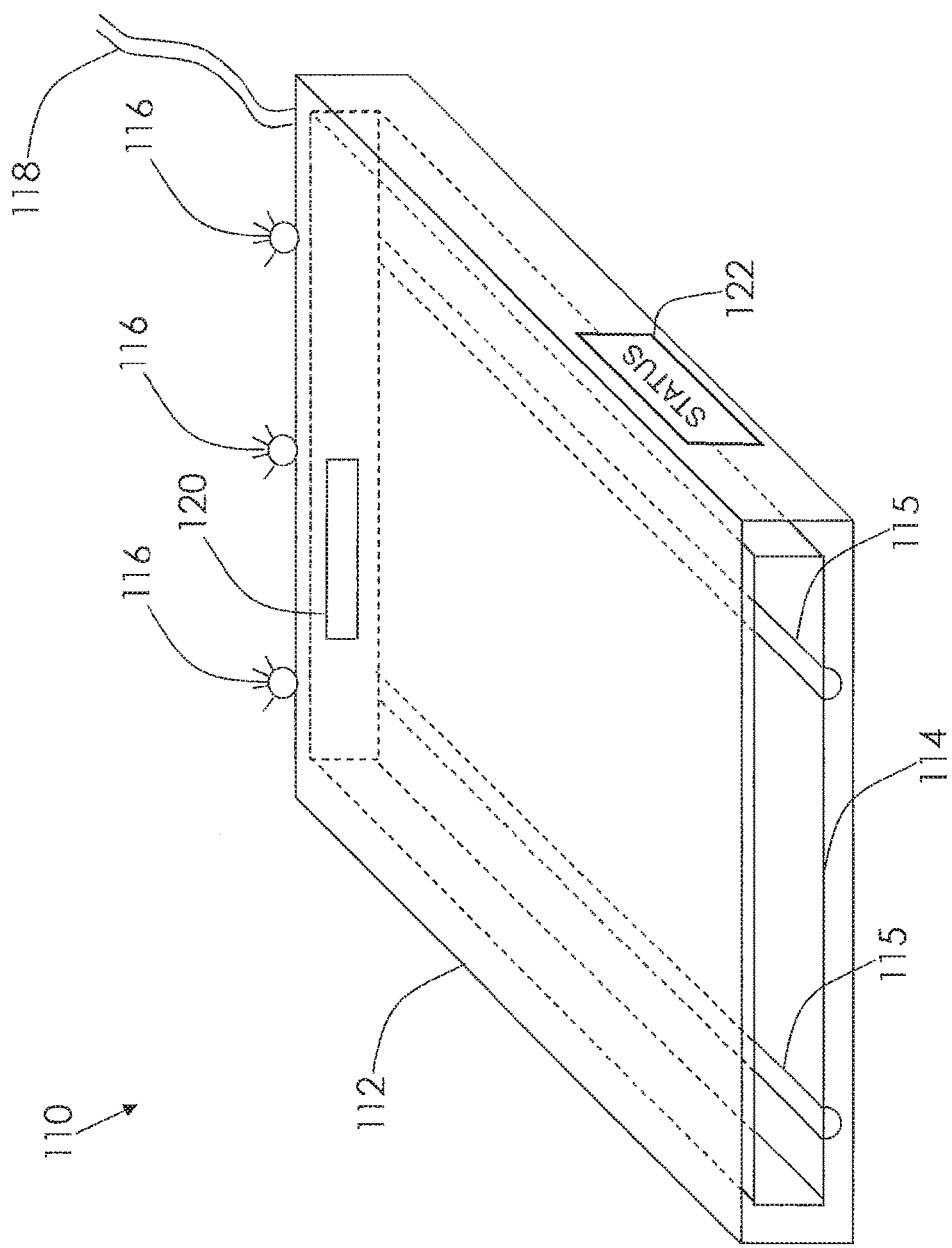
FIG. 3 is a schematic view of the smart battery charging station of FIG. 2.

A schematic view of the SBCS 110 is depicted in FIG. 3. The SBCS 110 are generally used to charge smart batteries (not shown) that are to be used on the vehicles 200A and 200B and the CCIS 150A and 150B. In one embodiment, the SBCS 110 is associated with each CCIS 150 so that information associated with a smart battery can be provided to the user of the CCIS 150. The batteries are utilized to operate electronics onboard the vehicles 200A and 200B and the CCIS 150A and 150B, as well as provide power to the propulsion bay 230 (first depicted in FIG. 6A and further described with reference to FIG. 7). The batteries can be lithium ion or other lithium ion derivatives known to a person of ordinary skill in the art. Other battery technologies may include nickel metal hydride, nickel cadmium, lead acid, and other power technologies such as the fuel cell technology, to name just a few non-limiting examples.

The SBCS 110 includes a case 112, a battery bay 114 including keyed interface 115, light emitting diodes (LEDs) 116, a power and communication interface 118, a series of spring loaded contacts 120 for voltage and communication buses that achieve positive connection with the batteries without locking, and a liquid crystal display (LCD) status indicator 122. The battery bay 114 is configured to have one or more smart batteries charged at the same time. Each smart battery may include a radio frequency identification (RFID) tag identifying the battery by a serial number. The SBCS 110 includes a processor (not shown) and a memory (not shown) which are configured to display and send error messages. Therefore, if a smart battery has begun to show signs of degradation, e.g., inability to fully hold a charge, when the smart battery is placed in the SBCS 110, the smart battery immediately communicates these errors and the processor can be configured to provide a message on the LCD status indicator 122 indicating the smart battery is no longer usable and send the same message with further details to CCIS 150A.

The keyed interface 115 provides a mechanical interface that allows the smart battery to be inserted in a predetermined way and prevent insertion of the smart battery in any other way that could be detrimental to the system. The keyed interface 115 corresponds to an associated interface on the smart battery and aligns with spring loaded contacts 120 of SBCS 110, thus providing power and communication access to the smart batteries.

The LEDs 116 provide visible indications of the status of the charging operation. For example, one LED 116 can be red indicating the status charging. Another LED 116 can be green indicating the status charged. Yet another LED 116 can be blue indicating availability of power for charging. LEDs 116 can also be dimmed for night missions or strobed for other feedback means.

Figure 4:
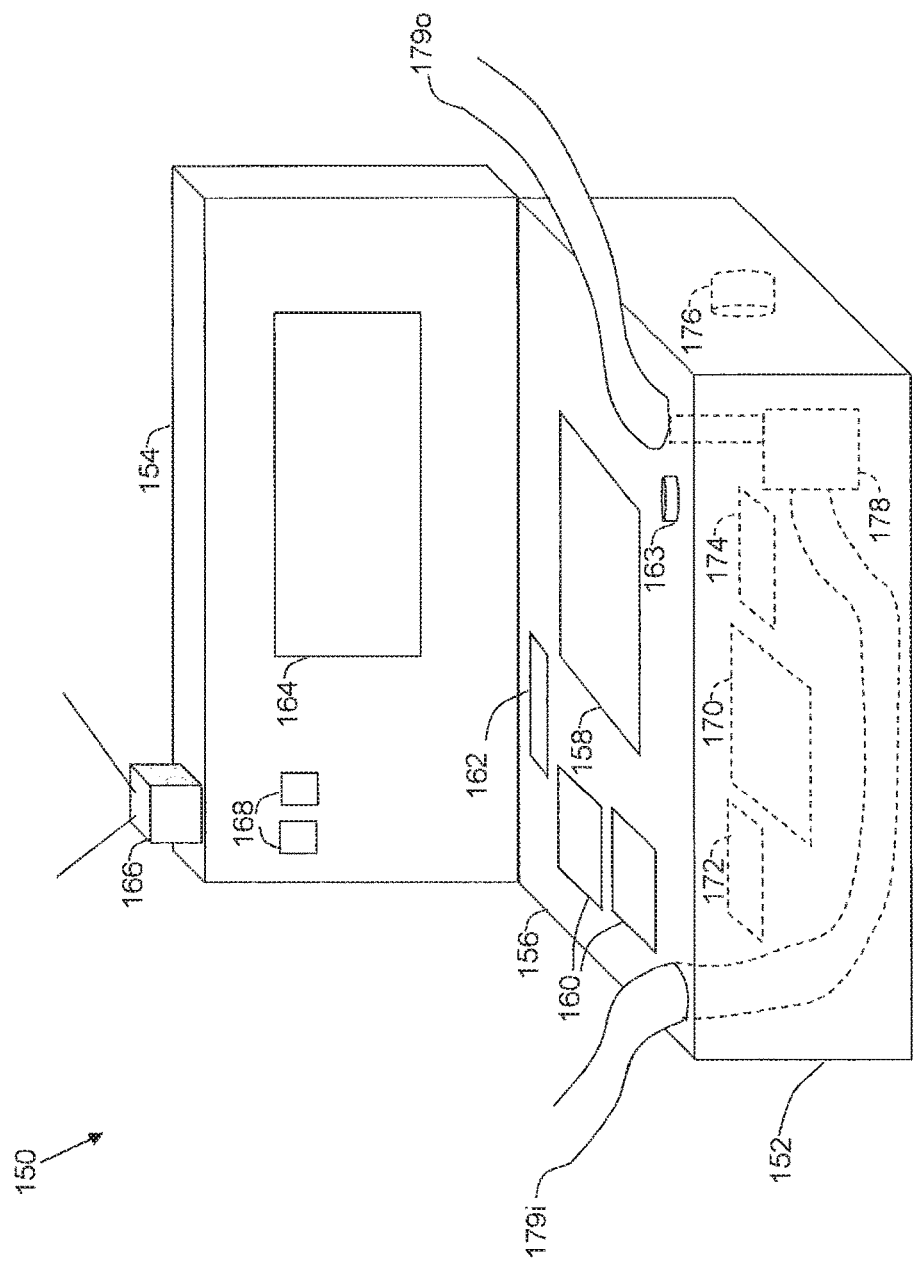
FIG. 4 is a schematic view of one of the ground station silos of FIG. 2.

The power and communication interface 118 provides power for charging to the SBCS 110 and enables the SBCS 110 to communicate with CCIS 150A. Part of such communication is to relay charging information associated with each smart battery to the CCIS 150A and 150B. While a cable is depicted in FIG. 4 for the power and communication interface 118, it is to be understood that both power and communication links can be provided in a wireless fashion, as known to a person of ordinary skill in the art. The SBCS 110 can charge and communicate with smart batteries in a standalone mode where there is not a communication connection to CCIS 150A.

Command and Control Interface Silo

Referring to FIG. 4, a schematic view of the CCIS 150A is provided. The CCIS 150A is a battery operated command and control unit that can be used out in the field without need for external power for an extended period of time. The CCIS 150A includes a case 152 and a lid 154. The case 152 includes a tray 156 with various components mounted thereon including a touch screen 158, power connections 160, a battery life indicator 162, and a protected emergency shut off button 163. The lid 154 includes a video screen 164, an antenna 166 that may or may not fold out, and infrared and visible LEDs and photodiodes 168.

The case 152 also includes a tray (not shown) for internal circuit boards and other components including a smart battery 170, embedded board 172, a power monitoring and distribution board 174, and a fan 176. The case 152 also includes a solenoid valve 178, a flow meter (not shown) and an absolute pressure sensor (not shown). The solenoid valve is in fluid communication with an inlet hose 179*i*, an outlet hose 179*o*, and the vehicle 200A for transferring helium or other fluids from the SGIS 180 to the vehicles 200A. The flow meter is coupled to the embedded board 172, such that embedded board 172 can monitor the amount of fluid that passes through the solenoid valve 178 as well as pressure on both sides of the solenoid valve 178. The absolute pressure sensor is coupled to the embedded board 172, such that a differential pressure can be calculated with respect to a deployed vehicle 200A using pressure readings transmitted from the vehicle 200A. Using the absolute pressure sensor in this manner, an unadjusted, closed system vehicle 200A altitude calculation is allowed with the CCIS 150.

For mission operations, data transmitted from multiple vehicles 200A and 200B can be displayed on the video screen 164 and touch screen 158 or a variety of other input devices known to a person of ordinary skill in the art. In addition, multiple vehicles 200A and 200B can receive communications from a single CCIS 150. An operator can use the touch screen 158 to enter commands into the CCIS 150 which can then be communicated with the vehicles 200A and 200B.

Smart Gas Inflation Station

The CCIS 150 is configured to simultaneously fill one or more vehicles 200 with a gas (e.g., helium), received from the SGIS 180. While charging the vehicle 200 with the gas, the CCIS 150 is configured to communicate with the vehicle's RFID tag 214 (shown in FIG. 6A), to ensure a correct amount of fluid is transferred from the SGIS 180 to the vehicle 200. There is an RFID tag 214 in the vehicle 200 gas inlet coupling and an RFID reader on the coupler on the hose 179*o*, thus allowing the vehicle 200 envelope to identify itself through a factory coded size identifier independent of the gondola (see below for a description of the gondola). If the gondola, RFID tag 214 and CCIS 150 do not all agree, inflation will not take place. This prevents the automated system from attempting to put 10,000 cubic feet of helium where there is only 500 cubic feet of capacity, for example. A second layer of protection is provided by the internal bag pressure sensors that are feeding back pressure data to the CCIS 150 through the gondola. These sensors would also halt the system once the bag is full, regardless of whether the CCIS 150 calculated that the bag was only ¼ full, for example. In some embodiments, if, for example, the vehicle 200 senses it does not need additional gas, but the SGIS 180 determines additional gas is still required, an alert can be generated.

Referring to FIG. 5, a block diagram of the SGIS 180 is depicted. The SGIS 180 includes a reservoir 182, a valve 184, a pressure regulator 186, an optional manifold 188, and step down regulators 190. The valve 184 shuts off fluid flow from the reservoir 182 to the pressure regulator 186. The pressure regulator steps down pressure inside the reservoir 182 to an intermediate pressure. The pressure regulator 186 can be in direct coupling with one step down regulator 190 or through an optional manifold 188 with several step down regulators. Each step down regulator 190 communicates with a CCIS 150 inlet hose 179*i* (see FIG. 4).

Vehicle Generally

Figure 6A:
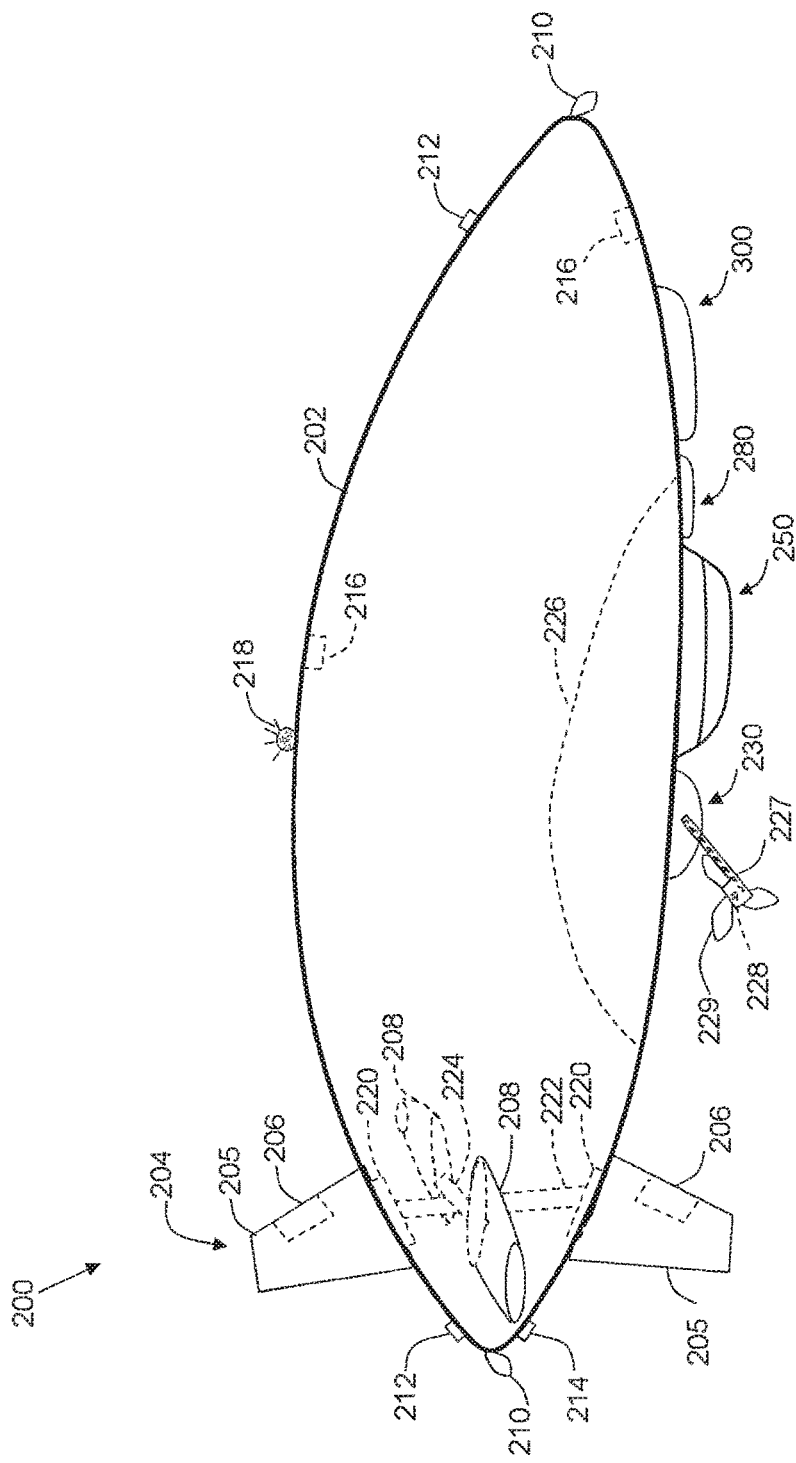
FIG. 6A is a schematic view of one of the vehicles of FIG. 1, according to one embodiment of the present disclosure, including a fin assembly, a propulsion bay, a main gondola, an interior interface module, and a sensor pod.

Referring to FIG. 6A, a schematic view of the vehicle 200 according to one embodiment of the present disclosure is depicted. The vehicle 200, depicted in FIG. 6A, is a lighter than air vehicle configured to communicate with the CCIS 150. The vehicle 200 includes a shell 202, a fin assembly 204, a propulsion bay 230, a main gondola 250, an interior interface module 280, and a sensor pod 300.

While not shown, a data bus and a power bus are implemented within the various components of the vehicle 200 to provide data communication between these components as well as power. Various serial communication buses may be used, such as RS232, I²C, SPI, MIL-STD-1553, as well as other data buses known to a person of ordinary skill in the art.

Vehicle Shell

Figure 19:
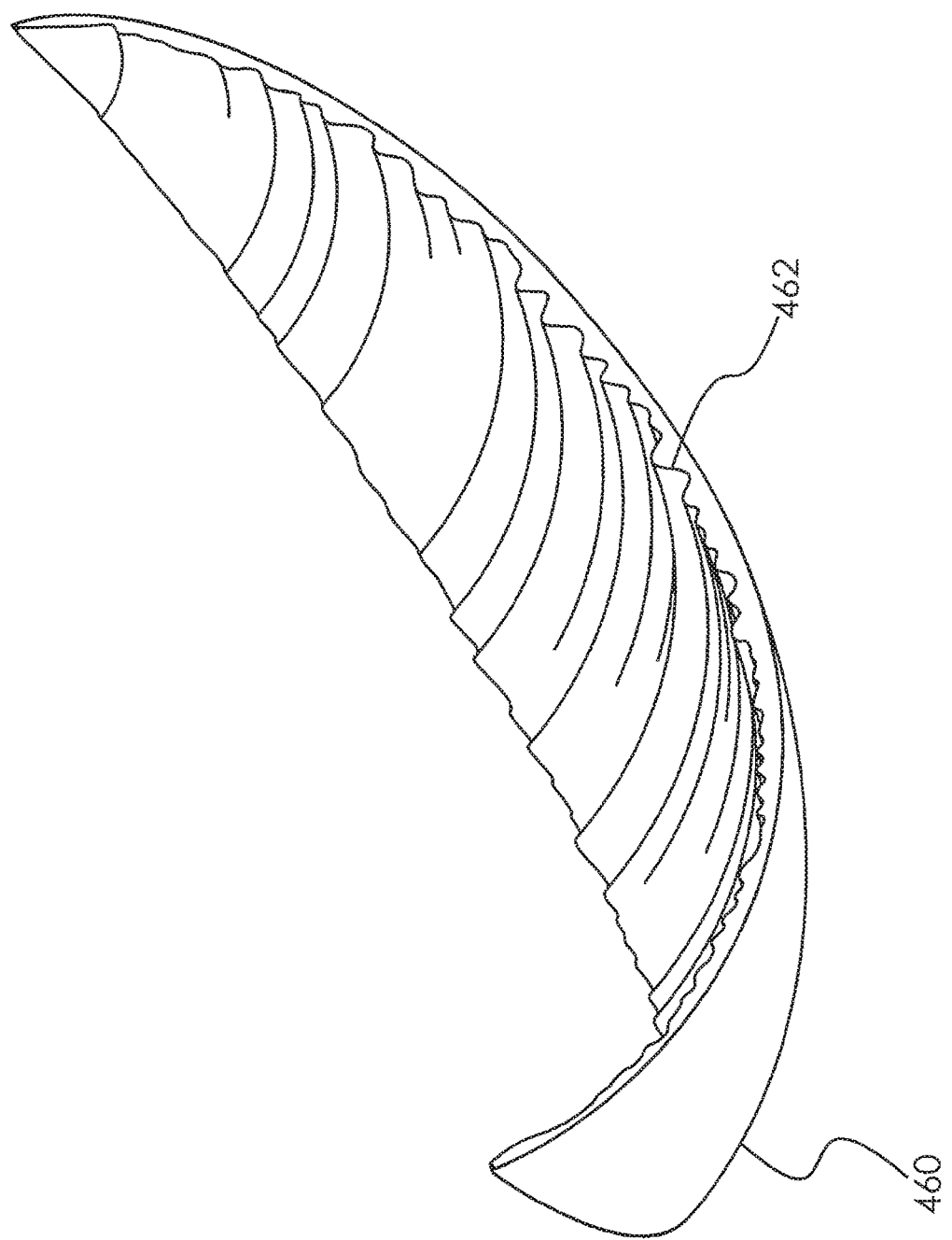
FIG. 19 is a cross-sectional schematic representation of a multiple layer gore according to one embodiment of the present disclosure.

In some embodiments, the shell is made from a polyurethane film ranging from about 1 to about 10 mils (thousands of an inch) thick, and in other embodiments about 2 to about 6 mils thick. It should be noted that the shell may not have a uniform thickness of polyurethane film. For example, the polyurethane film may be thicker on the bottom of the vehicle shell, as compared to the other areas of the shell, to reinforce such portion of the vehicle shell. For example, a thicker or multiple layer gore (individual panel) on the bottom of the vehicle 200 will allow the vehicle 200 to fly itself directly into the ground (and in some embodiments, the propulsion system will change its thrust vector to hold the vehicle down until it can be secured). In one embodiment, multiple films (or other suitable materials based on the desired application) of varying thicknesses may be included in addition to the polyurethane film to reinforce specific areas of the vehicle 200. FIG. 19 illustrates an embodiment in which a dual lined bottom gore includes a first exterior gore 460 and a second interior gore 462 that is not joined to the first gore over its entire surface, thus allowing the second layer 462 to move freely if the first is caught on something. For example, the first and second gores may be joined only at their peripheries. This looser second gore 462 is less likely to be snagged and compromised if the bottom gore 460 were to suffer a breach during launch, landing or ground handling.

Figure 20:
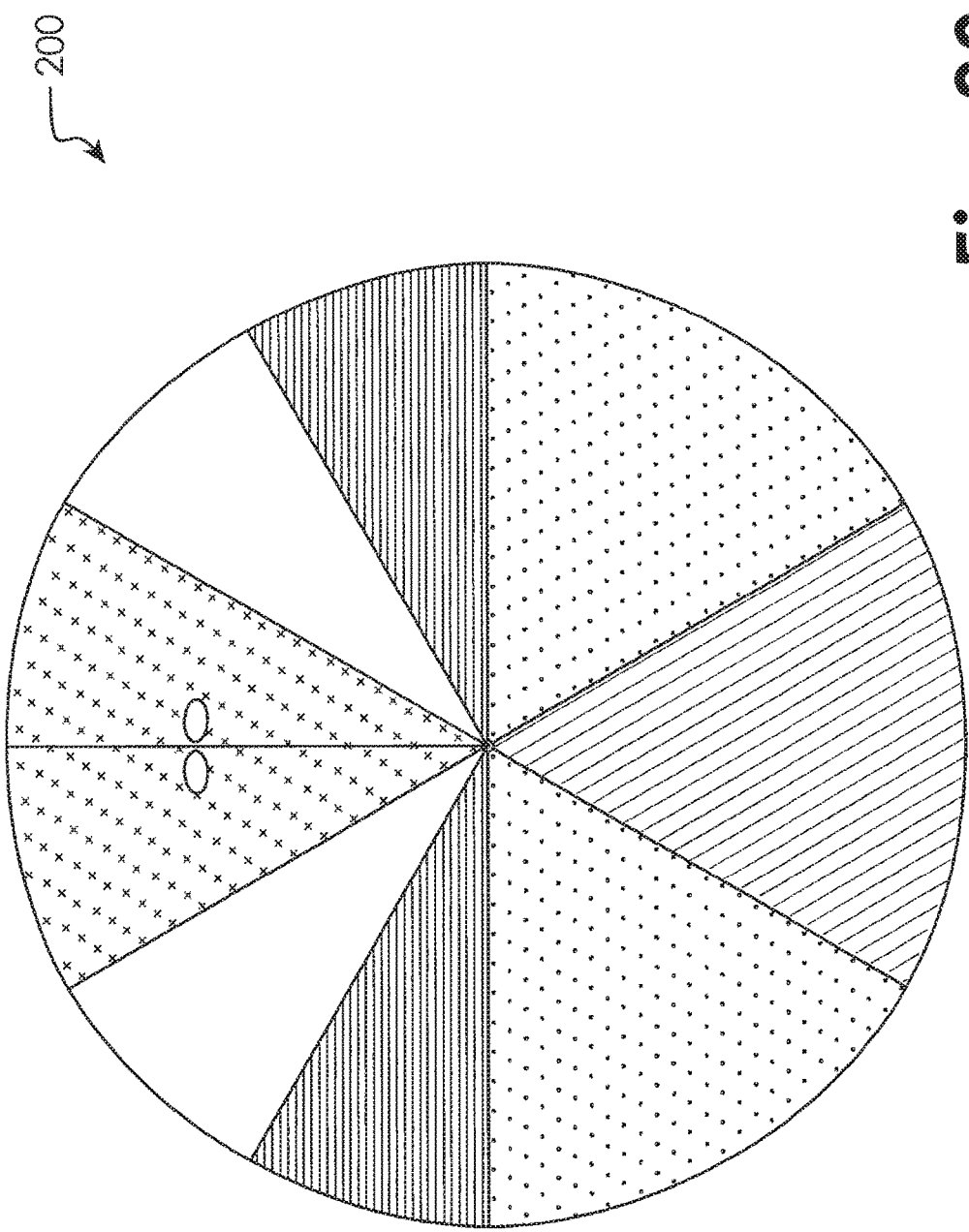
FIG. 20 is a schematic representation of a vehicle having gores of multiple colors according to one embodiment of the present disclosure.
Figure 21:
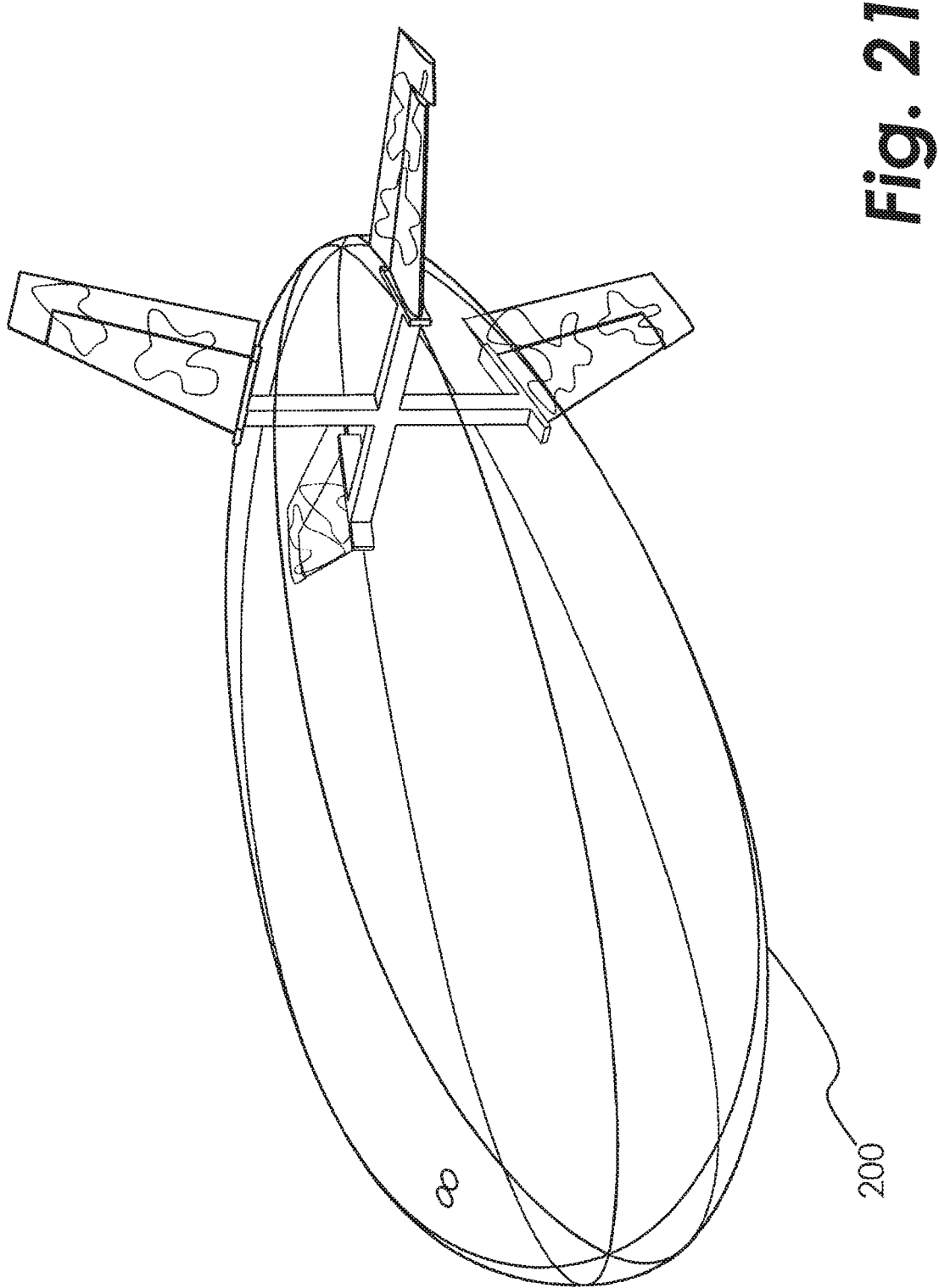
FIG. 21 is a schematic representation of a vehicle having gores that are transparent, semi-transparent and/or translucent, according to one embodiment of the present disclosure.

FIG. 20 illustrates how many different sizes and colors may be used for the gores that collectively make up the vehicle 200 envelope 202. For selective placement of strength where needed and weight savings, gores of different thickness, color &/or planar size may be used. This is useful to provide different properties to different portions of the vehicle 200. For example, different gores may be provided to provide greater structural rigidity to support fin systems, gondolas, resist small arms fire, support the vehicle's general shape, provide a thinned region to promote light weightedness, and the like. This also applies to the ballonet 226, utilizing a thinner film for this non-structural member will result in weight savings As a means to camouflage the vehicle 200, e.g. a need to make the vehicle 200 blend against a blue or overcast sky, combinations of colors, clear, or clear and any color(s), may be used for the gores. The shell 202 can be clear or colored depending on the application, e.g., a need to make the vehicle blend against a blue or overcast sky. As shown in FIG. 21, in some embodiments all of the gores and the fins are transparent, substantially transparent, semi-transparent, or translucent, such that the entire vehicle 200 will be camouflaged to make locating it once launched as difficult as possible. In some embodiments, the envelope will be transparent or semi-transparent and the gondola and fins will be a gray or sky camouflaged to reduce the ease of visual detection. In other embodiments, vibrant or contrasting colors may be used, for example, to make the vehicle more visible to serve as a deterrent to opposing forces.

The polyurethane film is tear resistant, and resistant to petrochemicals (e.g., gasoline, diesel fuel, aviation fuel and many other solvents). While, as discussed further below, the interior interface module 280 is configured to maintain a constant pressure differential between the inside portion of the vehicle 200 and the atmospheric pressure, the shell 202 is configured to stretch and contract to accommodate for instantaneous pressure differences.

Also depicted in FIG. 6A are tie-down straps 210, quick vent valves 212, and main fill up coupler 214. The tie-down straps 210 allow the vehicle to be strapped down to ground while the vehicle is parked. The quick vent (blow-hole) valves 212 allow quick release of fluid from the vehicle 200, as discussed in greater detail hereinbelow. As discussed above, the main fill up coupler includes an RFID tag that is matched with the CCIS 150 during the charging mode. The vehicle 200 also includes antenna mounting plates 216 that are mounted to the inside or outside compartment of the vehicle 200 for mounting antennas for communication.

Vehicle with Multiple Interior Compartments

Figure 30:
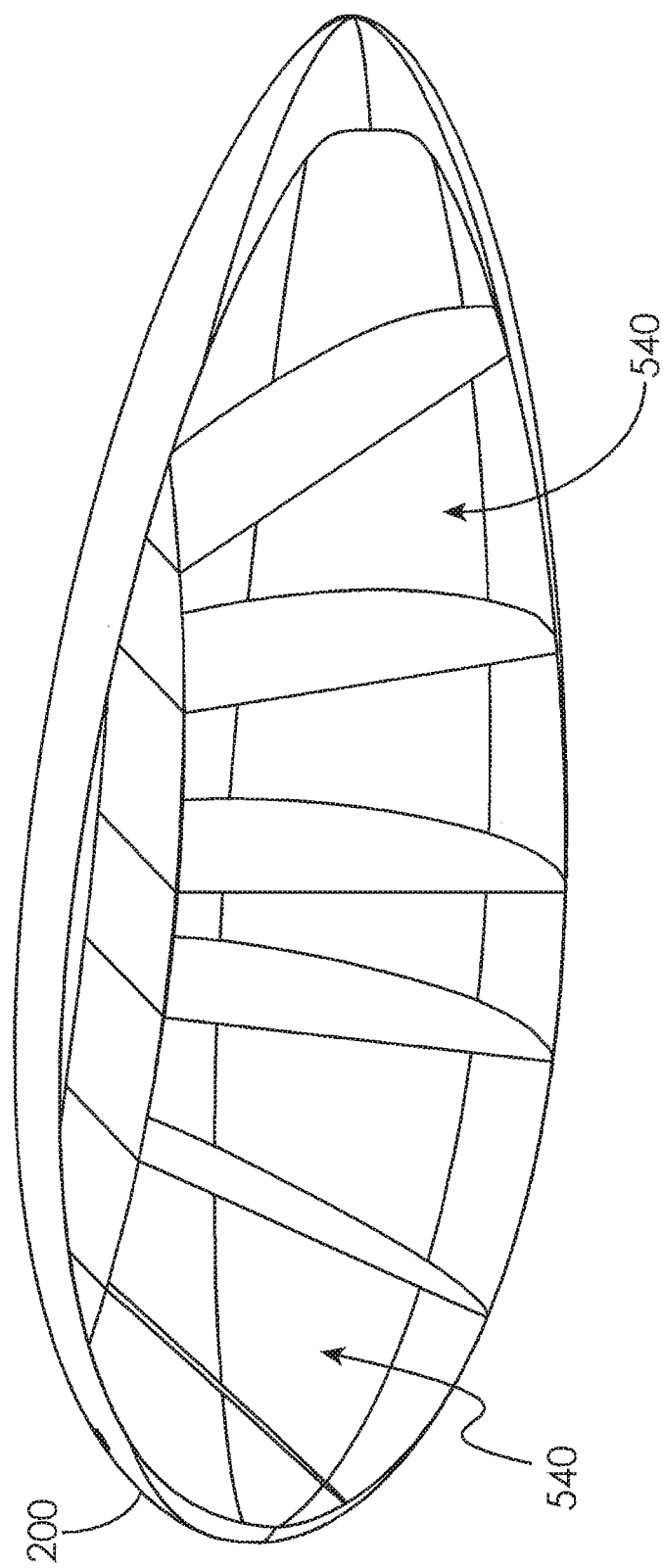
FIG. 30 is a schematic representation of a vehicle having a multi-chambered envelope according to one embodiment of the present disclosure.

Also, the shell 202 can be made from multiple compartments, such that if one compartment is compromised (i.e., punctured), other compartments will remain unaffected. In this embodiment, solenoid valves (not shown) can be placed between the compartments to selectively establish fluid communication between the different compartments (not shown). In addition, a small canister of high pressure fluid (not shown) can be provided within the shell 202 to replenish fluid pressure, in case of fluid loss due to puncture of the shell 202. A solenoid valve (not shown) connected to the canister (not shown) can be energized in order to release fluid into the shell 200. As shown in FIG. 30, a cross section of a vehicle 200 is depicted having a multi-chambered envelope for selective lifting gas venting and further mitigation against small arms fire risk. One or more of the chambers 540 may have its lifting gas vented to change the buoyancy of the vehicle 200 without affecting the lifting gas contained in the other chambers 540. Additionally, if the vehicle is hit with small arms fire and the envelope is compromised (resulting in a loss of lifting gas), the other chambers 540 will not be affected and the vehicle 200 will likely continue to be operational.

Ballonet Assembly

Also depicted in FIG. 6A is a ballonet assembly 226 which is provided inside the vehicle 200 in some embodiments. The ballonet assembly 226 is made from a film of polyurethane (or other suitable material) that is similar to the shell 202 and which is stretchable and contractible depending on the fluid pressure therein.

The ballonet assembly 226 is essentially an expandable bag within the vehicle 200. An air moving device (not shown), e.g., a fan, moves air into the ballonet from outside of the vehicle 200 and a solenoid valve (not shown) stops air from moving into or out of the ballonet assembly 226. The main function of the ballonet assembly 226 is to maintain a constant differential pressure between the inside of the vehicle 200 and the outside atmospheric pressure. Therefore, as the vehicle ascends or descends, or air temperature changes (and correspondingly the volume of the gas inside the shell 202), the ballonet assembly 226 is allowed to expand or contract to maintain a constant overall system differential pressure. The volume of the ballonet assembly 226 is preferably between 20 to 25% of the interior volume of the vehicle 200 but could be as high as 99% to realize certain favorable flight characteristics, as discussed in greater detail hereinbelow.

A ballonet control circuit 258, which may be located in the vehicle 200 main gondola (see below), includes a normally closed solenoid valve 259 and a squirrel cage fan 260. The solenoid valve 259 is configured to let forced air generated by the squirrel cage fan 260 into the ballonet assembly 226 from air surrounding the vehicle 200, and allow air out of the ballonet assembly 226 to atmosphere.

Figure 15:
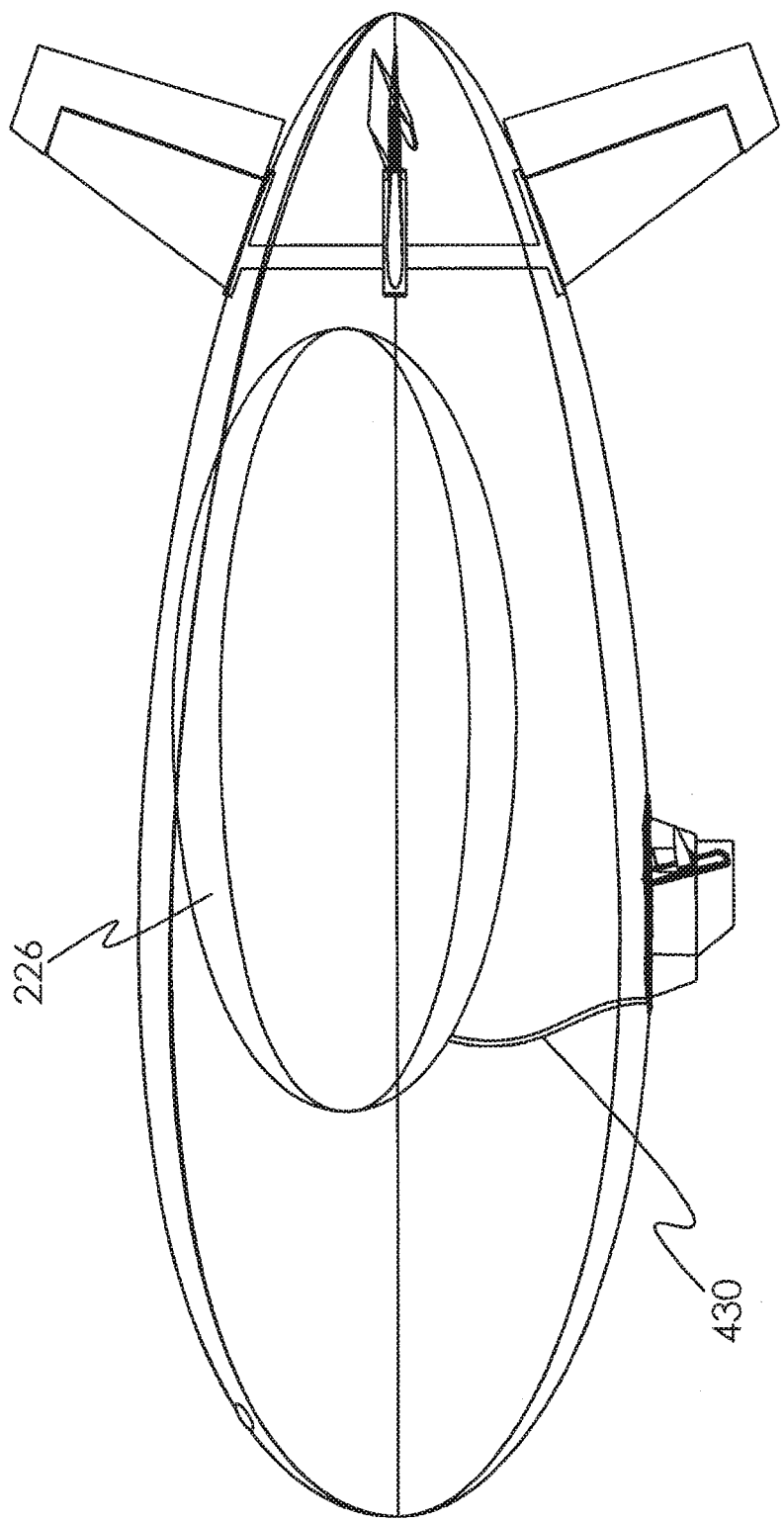
FIG. 15 is a schematic representation of a ballonet coupled to a vehicle only be a lumen according to one embodiment of the present disclosure.

In some embodiments, the placement of the ballonet 226 within the airship envelope is arbitrary and the ballonet 226 is not attached to the vehicle 200 envelope skin, except by one or more lengths of lumen 430 that are used to control the fill level of the ballonet 226, as shown in FIG. 15. So as not to limit possible future design changes or semi-custom implementations of any particular vehicle 200 design, the ballonet 226 can be what amounts to just a smaller airship within the interior volume of the vehicle 200, with only the one or more lengths of lumen 430 connecting it to the outer envelope and a coupler to the ballonet control valve 259 or, optionally and alternatively, with other additional connectors.

In some embodiments, as shown in FIGS. 27A and B, the ballonet assembly 226 can simply be a double ply gore with the interior ply 520 being wider than the exterior ply 522 (it being understood that either ply may comprise more than one piece of material joined with seams). The ballonet 226 is shown with less inflation in FIG. 27A, and with fuller inflation in FIG. 27B. Forming the ballonet 226 in this way allows for ease of manufacturing and weight savings. In this configuration, the bottom of the ballonet 226 forms the bottom of the entire airship, which saves weight and isolates the lifting gas if something were to compromise the bottom gore.

Ballonet is Large Percentage of the Size of the Airship

Typical airship ballonets occupy between 10-30% of the total volume of the airship. In some of the presently disclosed embodiments, the ballonet occupies about 30% to about 99% of the airship volume in order to increase the operational and safety capabilities of the airship. In other embodiments, the ballonet occupies about 40% to about 99% of the airship volume. In still other embodiments, the ballonet occupies about 50% to about 99% of the airship volume.

Controlled venting of lifting gas may occur during a rapid landing approach in high winds, operations where the airship needs to land quickly in order to not reveal the position of troops to enemy combatants, or to prevent the cargo or instruments onboard from falling into the hands of opposing forces, etc. During such maneuvers, the vehicle 200 will maintain its rigid shape because of the large ballonet (whose interior volume is not vented), ensuring control during the dump of its lifting gas during approach. Upon landing, recovery will be simplified because the vehicle 200 will have increased static heaviness. In some embodiments, the volume of air in the ballonet can be increased as the volume of lifting gas is decreased.

Additionally, the large ballonet can temporarily serve as the main envelope if the main envelope becomes damaged. All that is required is to fill the ballonet with lifting gas. This gives the airship the ability to continue operations during high priority missions without having to be replaced.

Vehicle Fin Assembly

Figure 16:
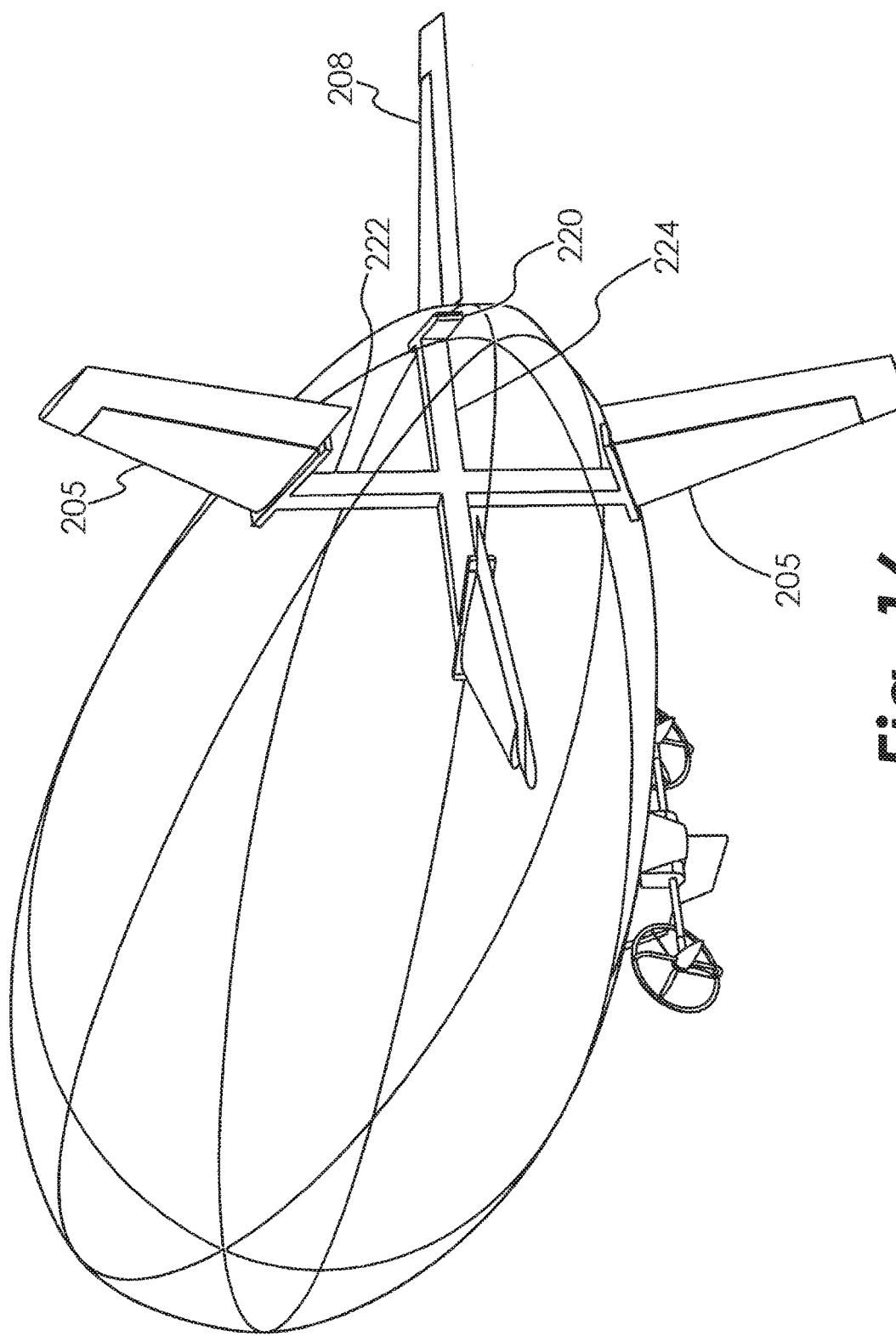
FIG. 16 is a schematic representation of a vehicle fin assembly according to one embodiment of the present disclosure.

The fin assembly 204 may include several fins. In FIG. 6A, a total of four fins are depicted including two vertical fins 205 and two horizontal fins 208, however, the vehicle may only have three fins or can comprise a system of fins. Generally, the fins cooperate with the propulsion system, discussed further below, to assist the vehicle in maintaining and changing stability, altitude, and position. In one embodiment, the fins 205 and 208 are connected to each other by rigid connecting members 222 and 224 inside the vehicle 200 formed in the shape of a cross, as shown in greater detail in FIG. 16. The cross-shaped connected rods 222 and 224 are coupled to the fins 205 and 208 by plates 220 for added strength and stability. Each pair of plates 220 may be fused to the skin by the use of heat and pressure in some embodiments. In this configuration, the fins 205 and 208 are built into the vehicle 200. This allows the fins to plug into the envelope, without the need of attachment wires or supports, all aerodynamic loads are transferred into the fin support structure. It will be appreciated that in some embodiments, the rods 222 and 224 are hollow and contain drive trains for coupling the fins to a source of rotary motion (not shown). The internal structure of the hollow rods 222 and 224 is sealed from the fluid inside the vehicle 200, thus allowing for wiring or use as a channel for other equipment, including but not limited to the fin drivetrain.

Figure 17:
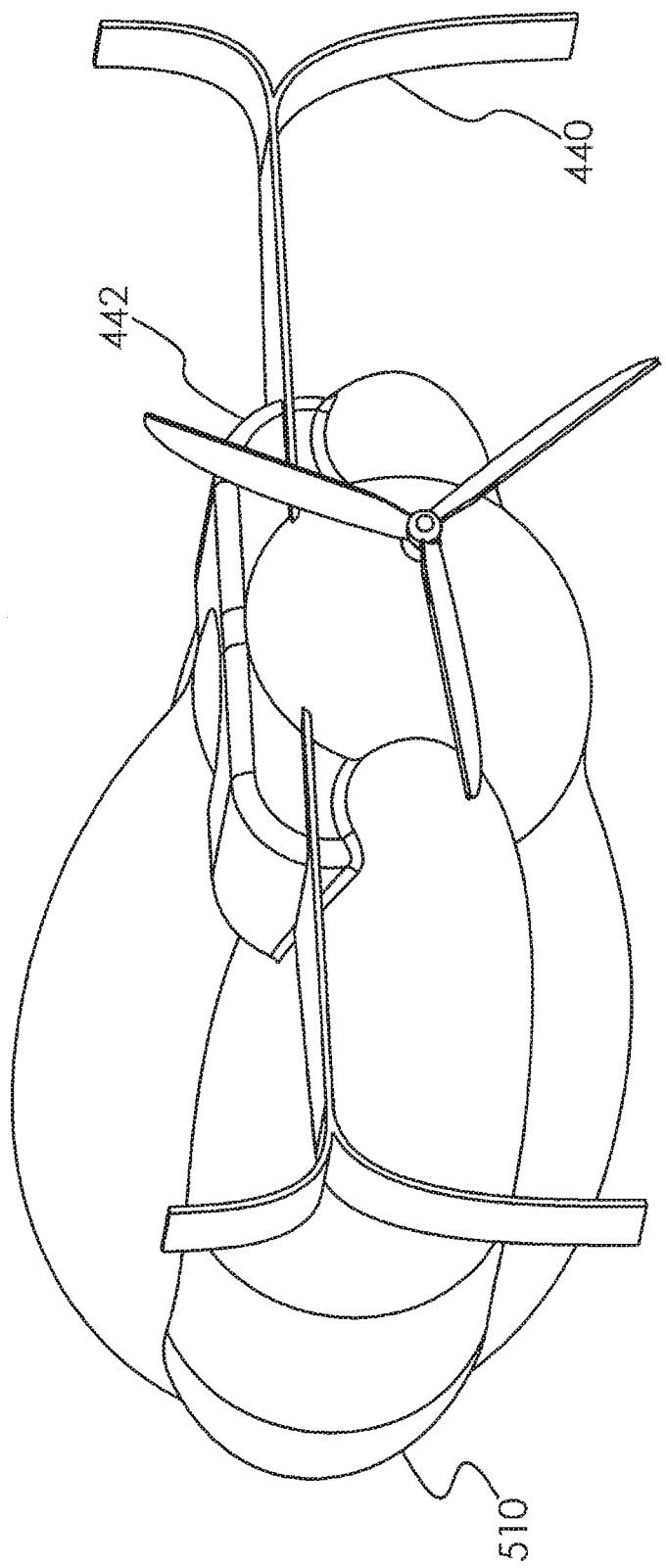
FIG. 17 is a schematic representation of a vehicle fin assembly according to a second embodiment of the present disclosure.
Figure 28:
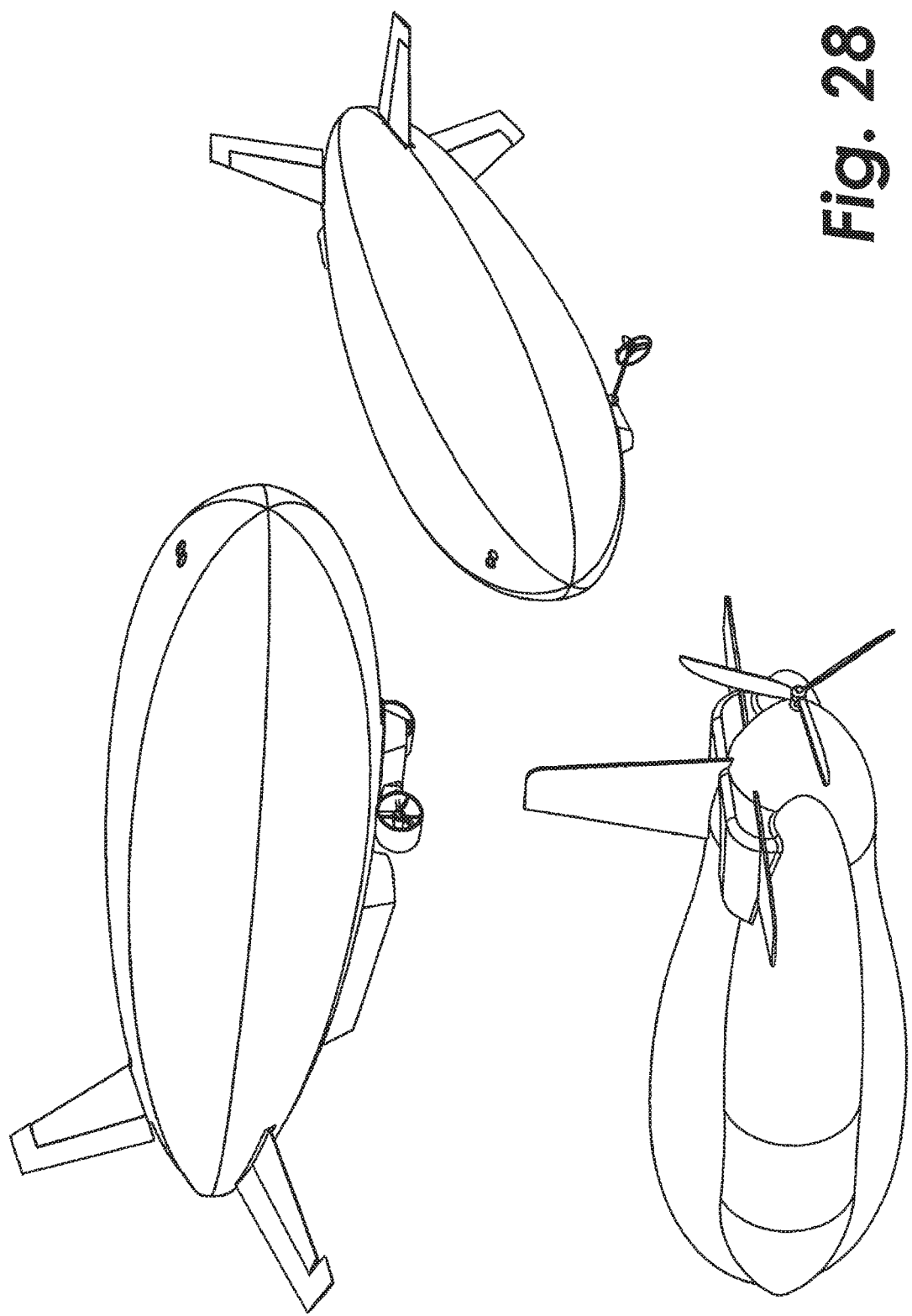
FIG. 28 is a schematic representation of a vehicle having an exterior fin assembly according to one embodiment of the present disclosure.

In another embodiment, the fin assembly 204 can be one unit that is mountable on the outside and backside of the vehicle 200. Fins, such as H-section fins 440 divided into two portions, are connected to each other outside of the vehicle with a rigid or semi-rigid hoop 442, as shown in FIG. 17. An embodiment is shown in FIG. 28. In this configuration rigid rods bent into shapes of various arcs can be used to position the fin assembly 204 over the backside of the vehicle. In the latter configuration, the fins can have an angle, e.g., 45°, with respect to a plane positioned along a longitudinal axis of the vehicle 200. The angle can assist the vehicle with respect to aerodynamic stability during flight and also during initial ascent and final descent. In any of the above fin assembly embodiments, the fin assembly 204 can be made to be modular so that if part or all of the assembly is damaged, the damaged portion or the entire assembly can be replaced.

Part or all of the fins may be moveable by utilizing an actuator (not shown). The moveable part is depicted with reference numeral 206 on the fins 205. Alternatively, the entire fin 205 can be moveable. The actuator (not shown) can be a brushless direct current (DC) motor, a brushed DC motor, a stepper motor, or other types of actuators known to a person of ordinary skill in the art, operating under the control of the fin system's own independent motor controller module (not shown). The actuator can be a direct drive actuator that is coupled to the fin assembly 204 with a direct coupling (not shown) or by a belt and pulley system where the actuator is mounted internally in the fin assembly 204.

It should be noted that each of the fins or portions of the fins may be inflatable. The inflatable fins may be filled with the same fluid as the shell (e.g. helium) or another fluid. Furthermore, one or more inflatable fins may be fluidly connected to the shell, such as through an aperture, or may be separate and distinct from the shell. In the latter configuration, each separate and distinct inflatable fin(s) may be directly connected to one or more air moving apparatuses and solenoid valves to maintain a certain air pressure. The air pressure in each inflatable fin may be monitored by a pressure sensor integrated with the corresponding inflatable fin. Such independence for each inflatable fin may be beneficial in the event one of the inflatable fins ruptures or otherwise leaks fluid. That is, the other inflatable fins are able to maintain a desired pressure when one of the inflatable fins loses pressure because each of the fins is separated from the others.

The inflatable fins may be integral with the shell or may be attached to the shell in various ways. For example, one or more inflatable fins may be attached to the shell through a connector (e.g., snaps), adhesive, or other device for securing the fin(s) to the shell. The inflatable fin(s) may also be connected to the shell through a series of rigid rods (which are connected to the shell) that secure the fin(s) to the shell. As described further below, such rods may be arranged with a guide or guides to maintain the inflatable fin(s) in a particular orientation.

Figure 26:
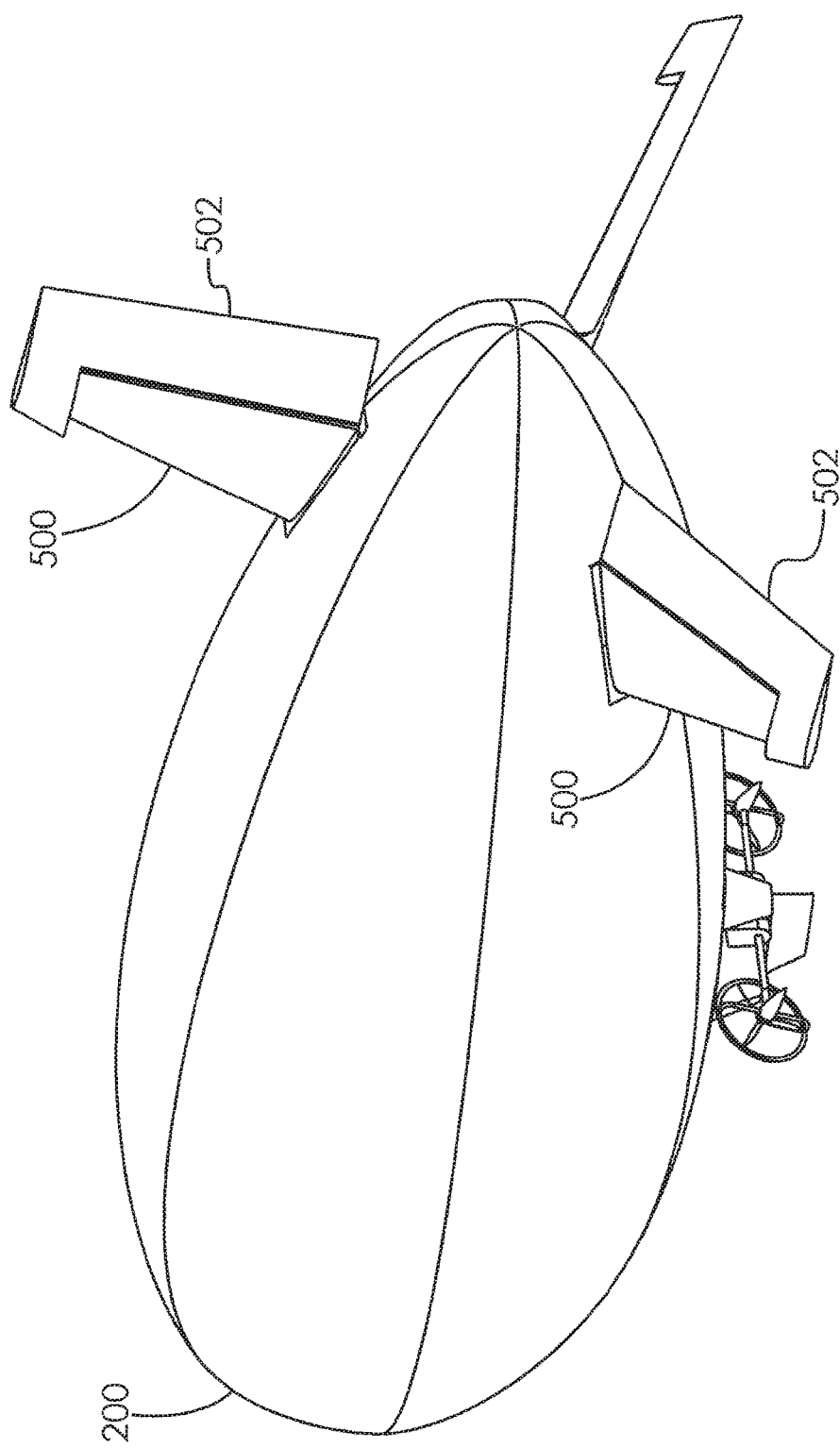
FIG. 26 is a schematic representation of a vehicle having inflatable fins and controllable surfaces immediately behind the inflatable fins according to one embodiment of the present disclosure.

In one embodiment, one or more inflatable fins may have control surfaces, which may be rigid or non-rigid. In another embodiment, one or more fins with controllable surfaces may be positioned adjacent to the one or more inflatable fins. In another embodiment, one or more controllable surfaces may be positioned adjacent to the one or more inflatable fins. For example, as shown in FIG. 26, a vehicle 200 is shown having inflatable fins 500 and controllable surfaces 502 immediately behind the inflatable fins 500. The addition of controllable surfaces (and/or fins with controllable surfaces) provides the vehicle with greater stability. The fins may inflate with the vehicle 200 envelope but still have rigid, movable surfaces attached that are used for flying/maneuvering the airship. This configuration allows for faster deployment due to the fact there would be no additional set up of the fins once inflated.

Figure 6B:
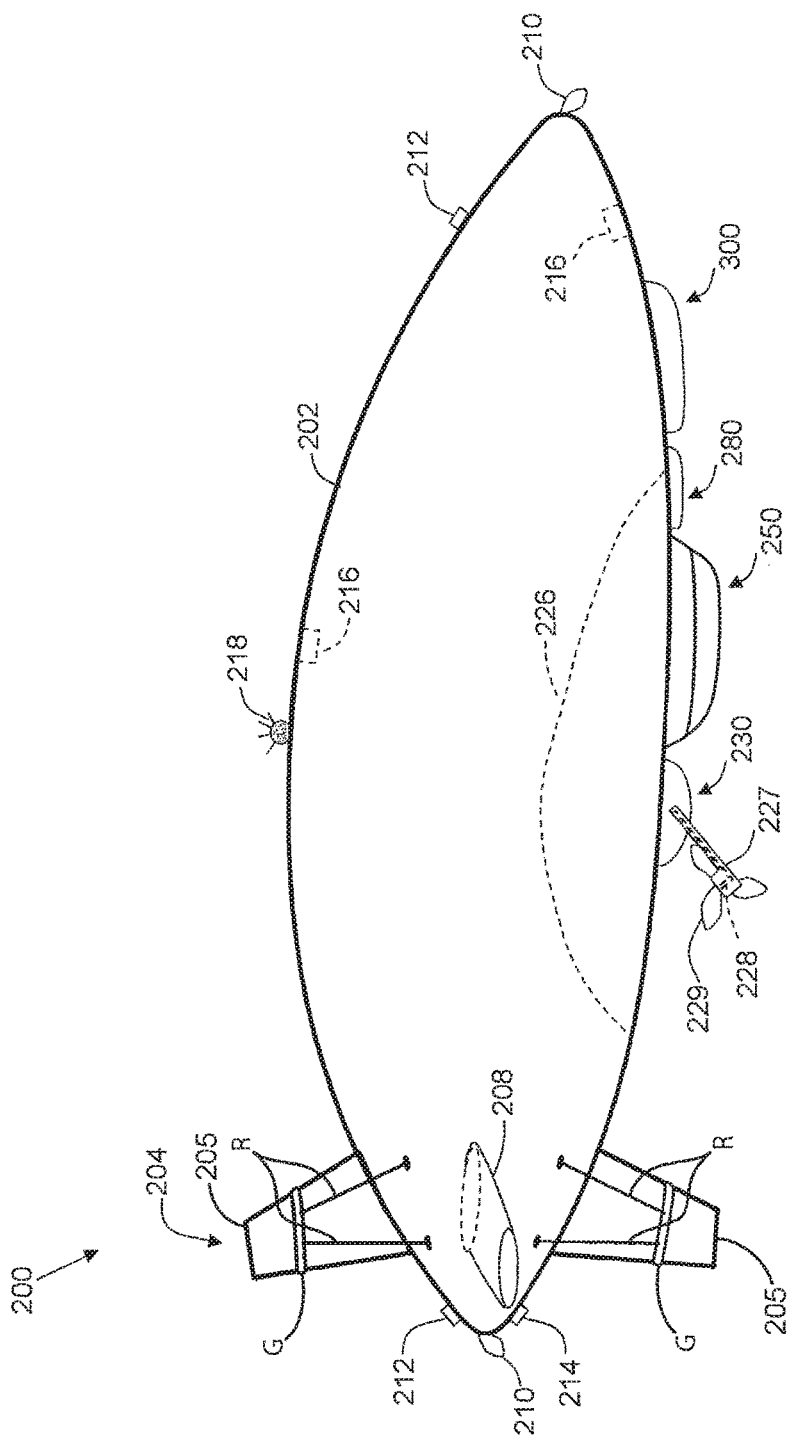
FIG. 6B is a schematic view of one of the vehicles of FIG. 1, according to one embodiment of the present disclosure, including a fin assembly with guides, a propulsion bay, a main gondola, an interior interface module, and a sensor pod.

As shown in FIG. 6B, guides G may be used to support and maintain the inflatable fins 205 in a particular orientation. In FIG. 6B, the guides G surround or substantially surround the inflatable fins 205 to substantially restrict the movement of the respective fin. That is, the guides G support each fin in a manner causing the respective fin to take on more rigid qualities. As shown in FIG. 6B, one or more rods R are connected to each guide G and are secured to the shell to maintain the guides G in a particular location relative to the shell. The guides G and/or rods R may be formed of a variety of materials, such as, for example, carbon composite materials. While not shown, it should be noted that guides G may be used to support fins 208 as well.

The vehicle 200 may be used in either (and transformed between) an aerostat mode or an airship mode. For example, inflatable fins may be used while the vehicle is operating in aerostat mode. When the vehicle needs to operate in airship mode, the inflatable fins may be detached, deflated, and/or inserted into the shell. After removing or inserting the inflatable fins into the shell (or, as described above, when sometimes the inflatable fins are left in place assembled), rigid fins with controllable surfaces may be attached or secured in their place or in addition to them. It should be noted that rigid fins may already be attached to the vehicle and therefore may not need to be attached after deflating/removing/inserting the inflatable fins. For instance, the fins with controllable surfaces adjacent to the inflatable fins may remain attached or integrated with the shell. It should also be noted that the fin configuration for aerostat mode may be the same for airship mode. In that case, the vehicle would not need to be transformed.

Figure 11:
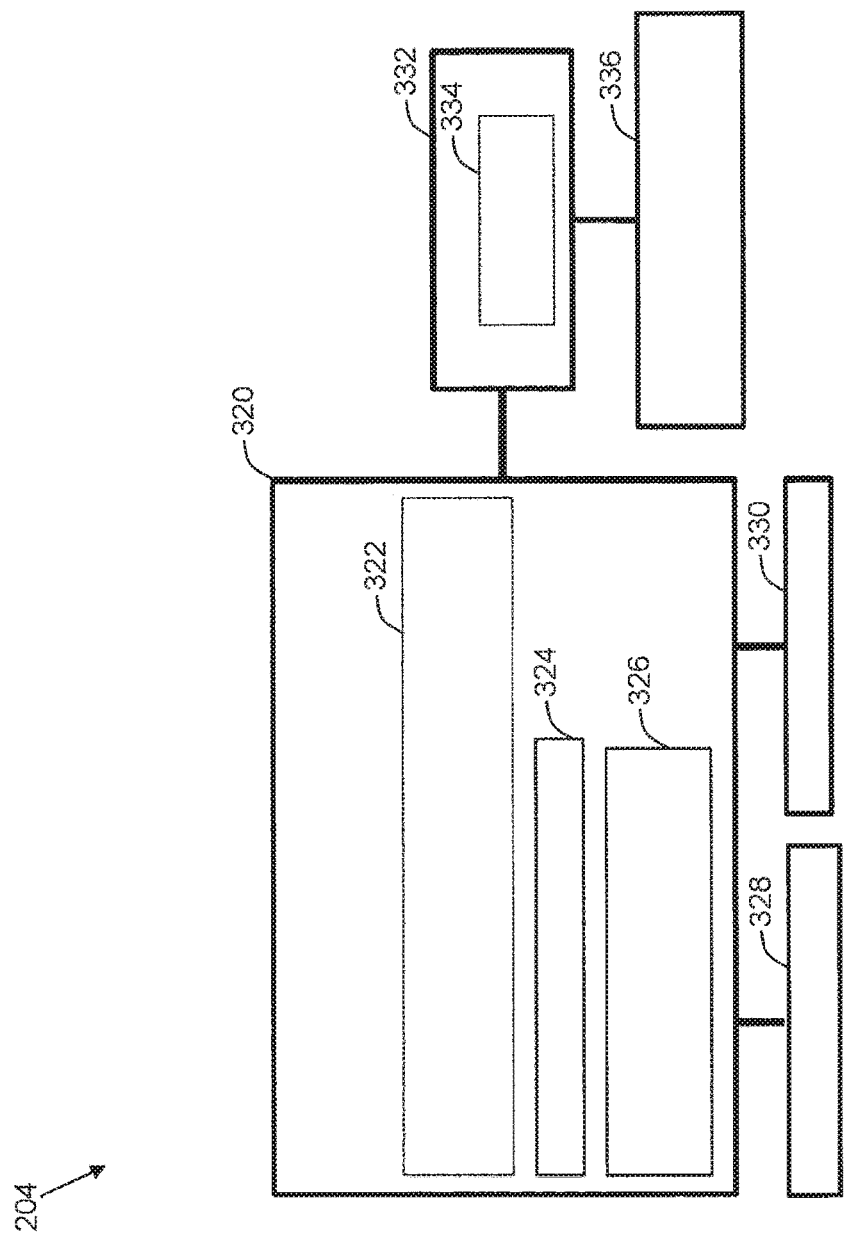
FIG. 11 is a block diagram of the fin assembly of FIG. 6A depicting various components of the fin assembly.

Referring to FIGS. 6 and 11, a block diagram of the fin assembly 204 is provided. The fin assembly 204 includes a fin surface controller 320 which includes a power routing/conditioning/monitoring circuit 324, a processor circuit 326, and a tri-axis accelerometer device 328. The fin surface controller 320 controls a brushed DC motor (which can also be a brushless DC motor or a stepper motor, or other types of actuators) 328, and receive data from an optical encoder 330 to determine the position of the motor 328 in order to control the motor 328. The fin surface controller 320 also communicates with an LED controller board 332 which controls LEDs 334.

Figure 32:
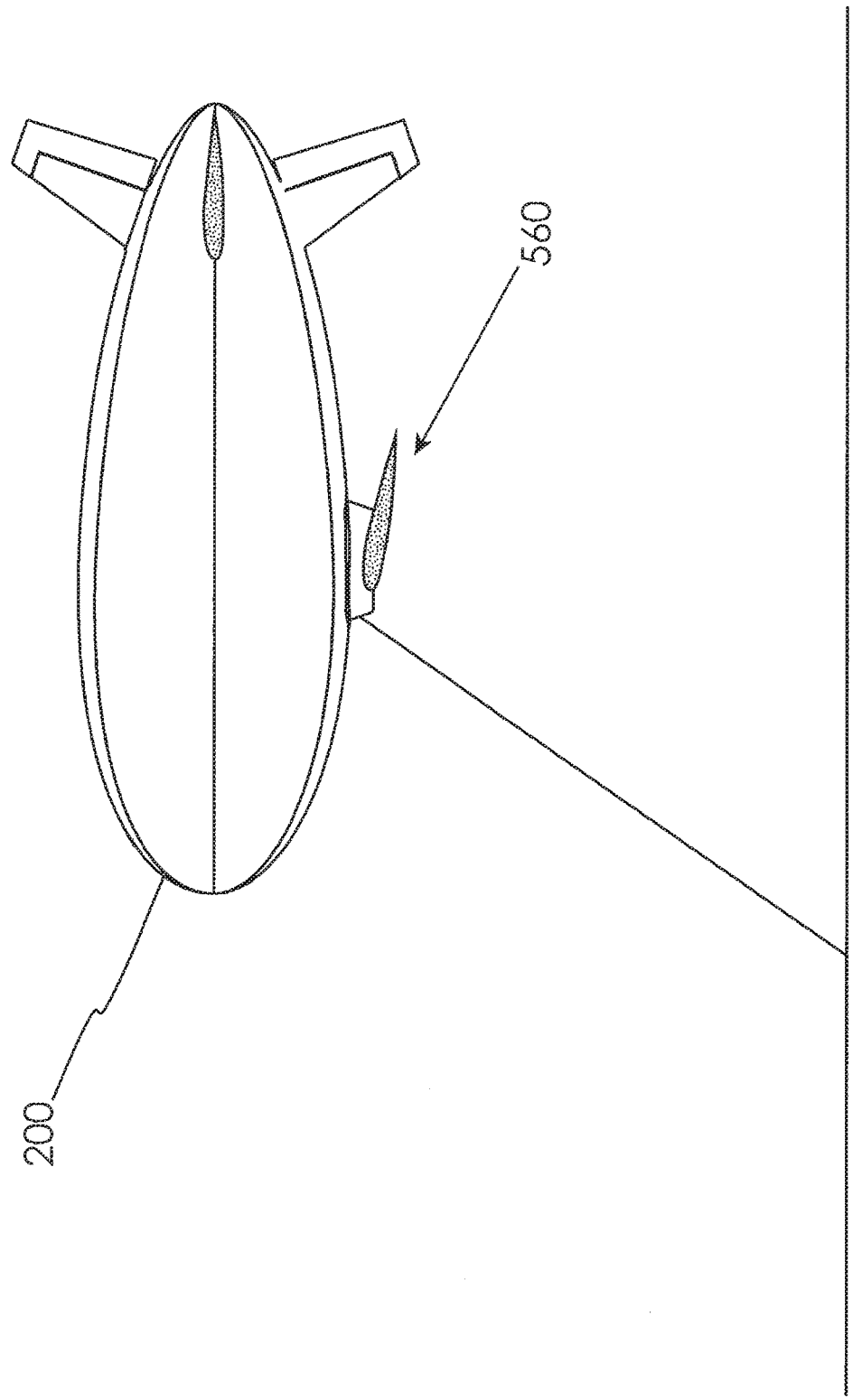
FIG. 32 is a schematic representation of a vehicle having an extra set of fins according to one embodiment of the present disclosure.

As shown in FIG. 32, when the vehicle 200 is in aerostat mode, some embodiments provide for an extra set of fins 560 on the gondola to generate the extra lift needed to overcome drag due to high winds. In some embodiments, the extra set of fins 560 are located on the gondola. The fins 560 may have surfaces shaped to change the lift upon movement of the fins 560 as wind speeds vary. The fins 560 may be permanently fixed, movably fixed, and, if fixed, fixed to the gondola at different angles of attack. This enables the vehicle 200 to fly back to altitude and reduces the "blow down" effect prior art aerostats are susceptible to in high winds. In other embodiments, the fins 560 are movable, wherein at least a portion of the fins 560 articulate about an axis.

The fins 560 work in coordination with, or in addition to, the tail fins. The onboard flight controller monitors wind speeds, angles of attack, tension in the main tether line, etc., and adjusts the surfaces in the tail fins and the fins 560 to keep the vehicle 200 at the desired altitude and to minimize shock loads on the tether.

Expandable Side Pockets

As shown in FIG. 17, expandable side pockets 510 may be provided on the exterior of the main vehicle 200 envelope. The side pockets 510 allow the shape of the vehicle 200 to change according to the mission or an increase in payload. It will be appreciated that the side pockets 510 may be located at any position on the vehicle 200, and in some embodiments the side pockets 510 are not located on the sides of the vehicle 200. Filling of the side pockets 510 with lifting gas increases the buoyancy of the vehicle 200 when required. The interior volume of the side pocket 510 may be fluidically coupled to the interior volume of the main vehicle 200 envelope, or may be completely self contained. When the side pocket 510 is not required to be inflated, it may be secured flat to the side of the vehicle 200. The side pocket 510 may also function as a ballonet and may be filled with non-lifting gas, such as air, to change the ballast and aerodynamics of the vehicle 200. Placement of the expandable side pockets 510 allows for hybrid airship shapes with no rigid or semi-rigid reinforcement needed.

Vehicle Propulsion Bay

The propulsion bay 230 illustratively includes two motor pods (not shown) on opposite sides of the main bay housing. The motor pod (not shown) includes a motor 236 (see FIG. 7), motor controller 231 and sensor(s) 234 (e.g., accelerometers) for determining position and orientation of the motor pod (not shown) with respect to the propulsion bay 230 and the vehicle 200 at system start up. The motor pod (not shown) terminates in the main propulsion bay housing (not shown) wherein blades of the propulsion system are co-located to effectively move air.

Referring to FIG. 7, a block diagram of the components of the propulsion bay 230 are depicted. The motor 236 can be a brushless DC motor that is controlled by a controller 232. Other types of motor or actuators may be used to provide motive power to the blades. The controller 232 includes a monitoring circuit (not shown) for monitoring current passing through the motor 236. A digital signal processing (DSP) processor 233 (or other processors, including but not limited to a field programmable gate array, microcontroller, and processors with other architectures) is also included as part of the propulsion bay 230 for receiving signals and processing the signals from a plurality of sensors 234 including tri-axis accelerometers. Coupled to a rotor of the motor 236 is an optical encoder 237 for determining a speed (such as revolutions per minute) of the motor 236.

As shown in FIG. 6A, the motor is illustratively coupled directly to the propeller blades. Motor booms 227 extend out of both sides of the propulsion bay 230 and terminate at the motor pods 228. The motor and the associated blades (2, 3, 4 or more blades) 229 are configured to provide propulsion for the vehicle 200. The propulsion bay 230 is configured to tilt the motor booms 227 in order to provide the desired pitch for the motor pods 228 and a corresponding thrust vector for the vehicle 200. Pitch, yaw, speed, and position of the vehicle 200 can be controlled by controlling the pitch of the motor pods 228, the speed of the rotation of the blades 229, and the position of the fin assembly 204.

Vehicle Signaling Lights

The propulsion bay 230 also includes LEDs (or other type of light source) 242 controlled by a controller 240 having a controller integrated circuit (IC) 241 for controlling the LEDs 242. The LEDs 242 can provide information about the operation of the vehicle 200 to the user and anyone in the surrounding area (ground or air). Alternatively, such LEDs 242 may be located elsewhere on the vehicle 200.

Figure 9:
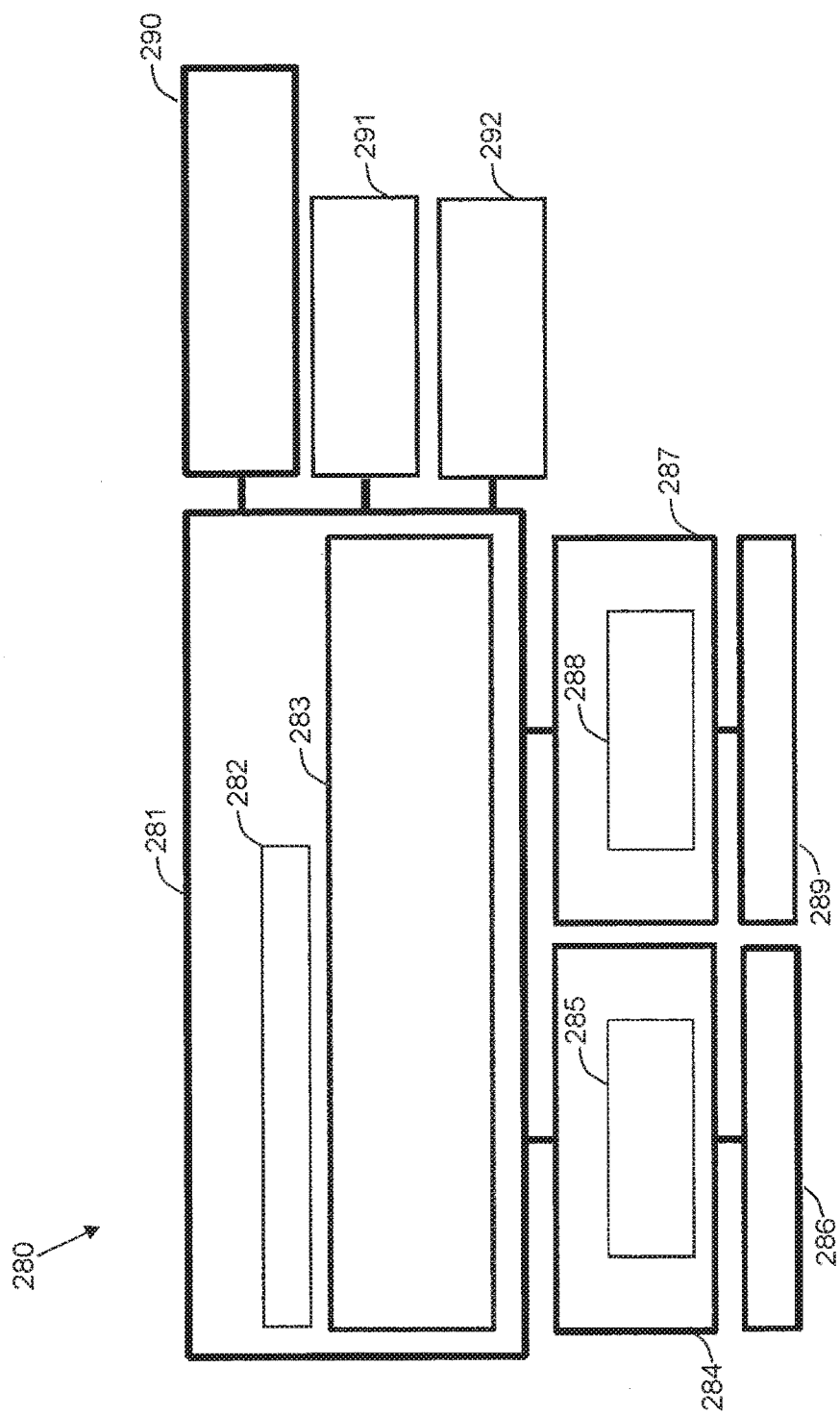
FIG. 9 is a block diagram of the interior interface module of FIG. 6A depicting various components of the interior interface module.

Referring to FIGS. 6 and 9, a block diagram of the interior interface module 280 is depicted. The interior interface module 280 includes a logic controller circuit 281 which includes a processor 282, and a power conditioning and monitoring circuit 283. Also depicted are LED controller boards 284 and 287. The processor 282 is configured to communicate and control the power conditioning and monitoring circuit 283 and the LED controller boards 284 and 287. Each of the LED controller boards 284 and 287 includes an LED controller IC 285 and 288 for controlling LEDs 286 and 289, respectively. The LED 286 can be a visible light device, while the LED 289 can be an infrared (IR) device. The LEDs 286 and 289 and the associated circuitry are designed to enable the vehicle 200 to communicate to a ground station system 100 or others in the area via a visible light or IR communication scheme, utilizing, e.g., a pulsating laser, e.g., using Morse code. In case RF communication has been disabled, the ground station system 100 can communicate with the vehicle 200 based on a predefined communication scheme. If the LEDs 286 and 289 are mounted internal to the vehicle 200 envelope, the light reflecting/refracting inside of the envelope will be visible at a great distance. While LEDs 286 and 289 are discussed, it should be appreciated that photodiodes can also be used to receive light pulses communicated from the ground station system 100 or others in the area. These photodiodes can be strategically mounted on the outside of the vehicle 200 for optimal reception.

Vehicle Main Gondola

Figure 8:
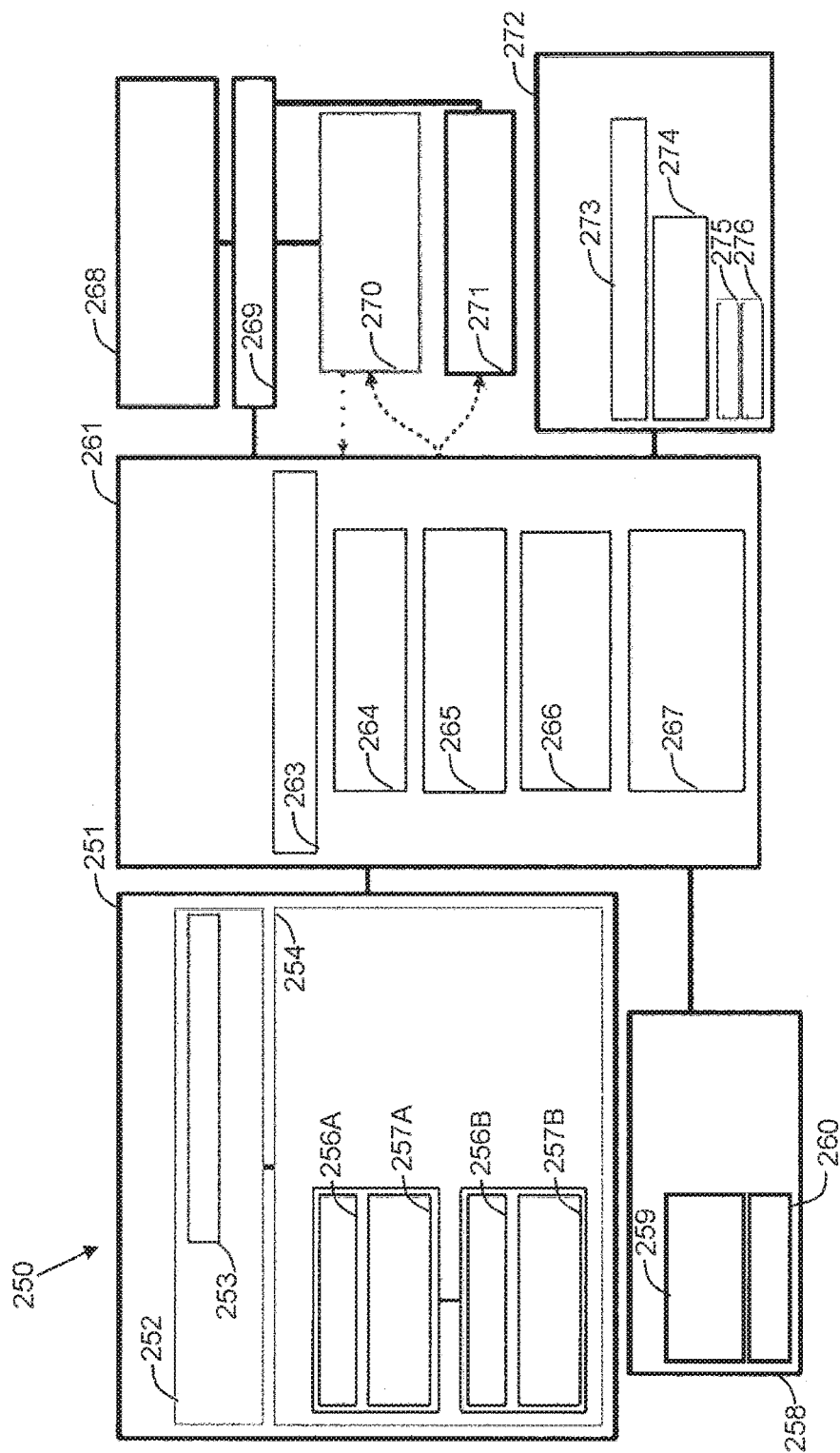
FIG. 8 is a block diagram of the main gondola of FIG. 6A depicting various components of the main gondola.

Referring back to FIG. 6A and further to FIG. 8, the main gondola 250 may include a smart battery pack 251, an embedded system 261, a vehicle main computer 268 and associated circuits, and the ballonet control circuit 258. The smart battery pack 251 may include a power monitoring circuit 252 which includes a processor 253, e.g., a Freescale 56F8037, 32 MHz hybrid DSP processor, a battery circuit 254 which may include battery monitoring circuits 256B and 256B, e.g., Texas Instruments bq20z65, and smart batteries 257A and 257B, e.g., Dow/Kokam three cell lithium polymer. The smart batteries 257A and 257B can be provided in duplicative form for redundancy rather than for increased capacity. The smart battery pack 251 and power monitoring circuit 252 are configured to monitor the vehicle power (i.e., electrical power used for propulsion, control, and reconnaissance).

The embedded system 261 includes a processor 263, e.g., a Freescale 56F8367, 60 MHz hybrid DSP processor, absolute pressure sensors 264, differential pressure sensors 265 and 266, and an inertial measurement unit 267. The embedded system 261 is configured to monitor pressure, using the differential pressure sensor 265 within the vehicle 200 and to maintain a constant pressure differential between inside of the vehicle 200 and the atmospheric pressure. The embedded system 261 monitors air speed with a pitot static tube (not shown) and the differential pressure sensors 266.

The ballonet control circuit 258 includes a normally closed solenoid valve 259 and a squirrel cage fan 260. The solenoid valve 259 is configured to let forced air generated by the squirrel cage fan 260 into the ballonet assembly 226 from air surrounding the vehicle 200, and allow air out of the ballonet assembly 226 to the atmosphere.

The vehicle main computer 268 and associated circuits include a processor, e.g., Intel's Atom processor, serial communication circuit 269, an RF communication module 270, and a global positioning system module 271. The vehicle main computer 268 is configured to control functions not otherwise controlled by various other controllers and processors distributed throughout the vehicle. It will be appreciated by those skilled in the art that input of sensor data, data processing, and control of the various systems disclosed herein may be carried out by one or more processors located at various positions on or in the vehicle 200 or on the ground, and that where particular data processing applications are carried out is not critical.

In some embodiments, the gondola may comprise one or more ballistic fabric layers to protect vital electronics inside the gondola from small arms fire. As used herein, the phrase "ballistic fabric" comprises any fabric that is designed to at least partially absorb the impact from firearm-fired projectiles and shrapnel from explosions. In some embodiments, if the vehicle 200 determines that it has been hit by a projectile (such as by means of an appropriate sensor, such as detecting an impulse signal from its accelerometer to name just one non-limiting example), it will immediately transition into an avoid state in which it flies to a higher altitude and/or away from its current location to lower the probability of being hit again.

Figure 23:
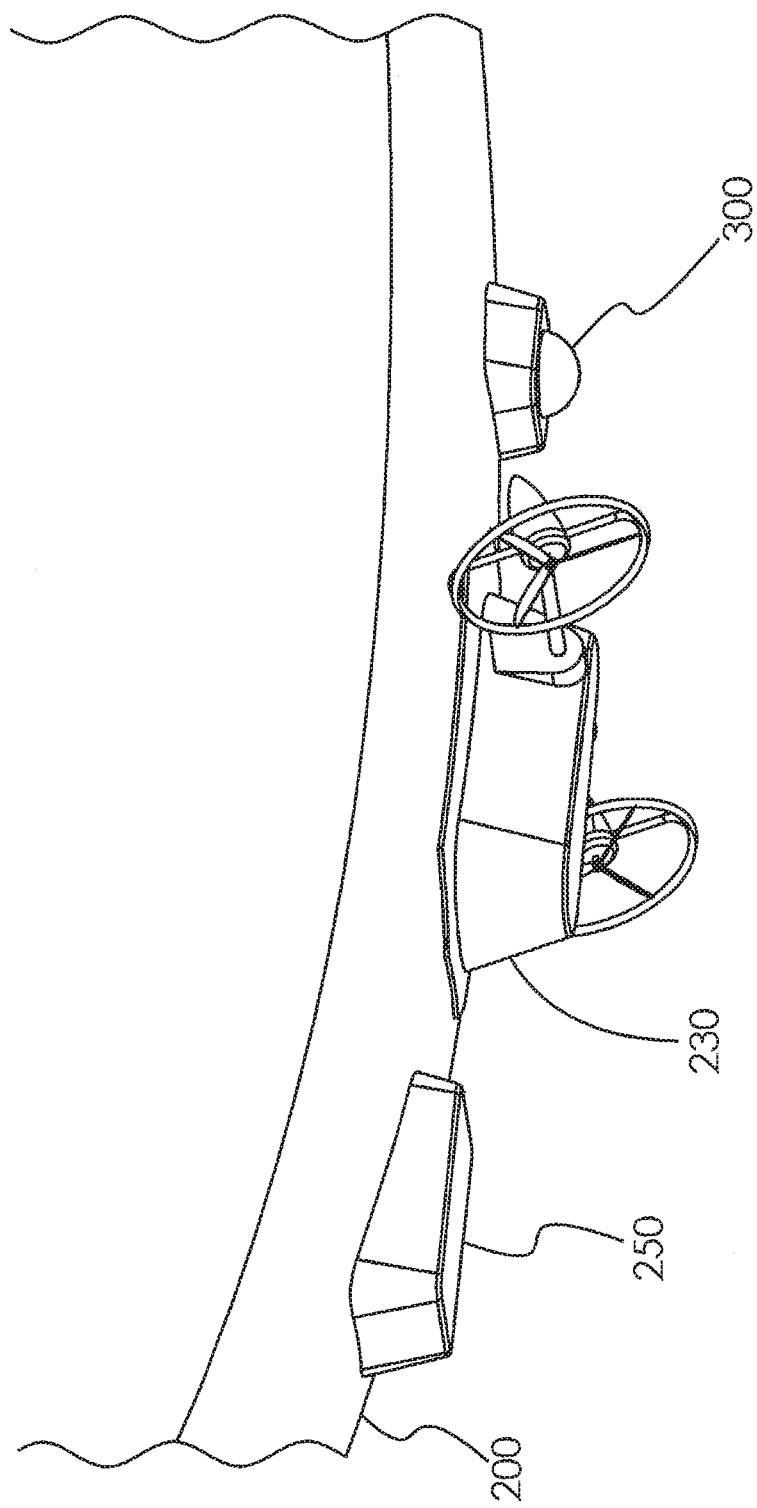
FIG. 23 is a schematic representation of a vehicle having discrete gondolas attached thereto according to one embodiment of the present disclosure.

In some embodiments, for reasons of serviceability, analog dampening and analog sensor isolation (to name just a few examples), the gondolas can be separated into two or more discrete pods that are physically separated when attached to vehicle 200 envelope. As shown in FIG. 23 motor propulsion gondola 230, sensor gondola 300, and main processing/power gondola 250 can be three different pods. This also allows the propulsion system to be in the most optimal location for the mission profile, while distributing other portions of the system for weight balancing reasons. In some embodiments, the gondola(s) is(are) removable from the vehicle 200 envelope, allowing the vehicle 200 to be easily reconfigurable for different functions, payloads, and/or weight balancing.

Propeller Safety System

Figure 31:
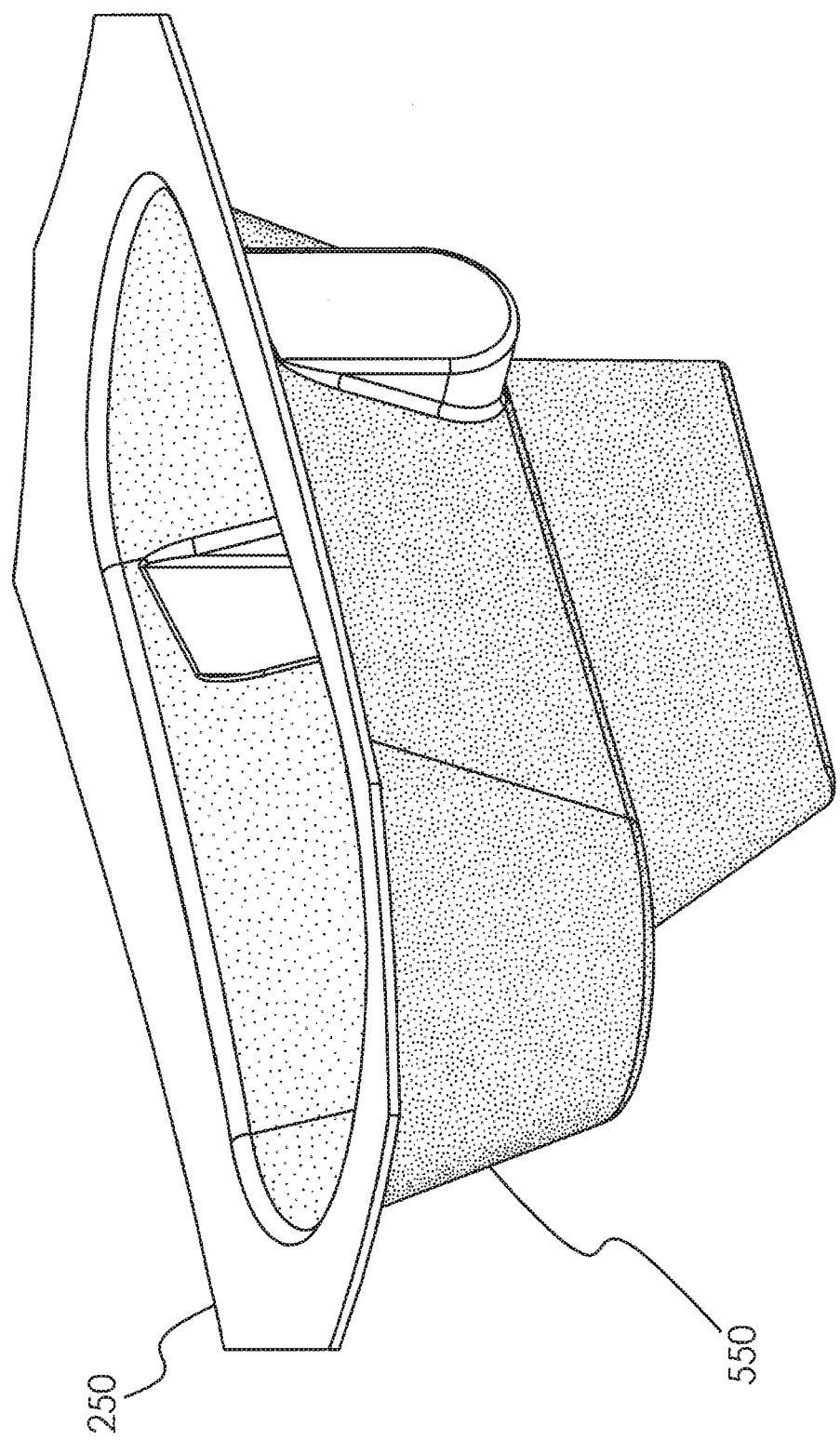
FIG. 31 is a schematic representation of a vehicle having a gondola incorporating a propeller safety system according to one embodiment of the present disclosure.

A propeller safety system 272 is also provided as part of the main gondola 250. The propeller safety system 272 includes a processor 273, a capacitive touch sensor 274 and multiple touch sensitive pads 275 and 276. The propeller safety system 272 is configured to prevent energization of the propellers of the propulsion bay 230 when the system 272 senses contact (i.e., human touch contact) with the main gondola 250. FIG. 31 depicts one embodiment gondola 250 incorporating a propeller safety system, wherein the shaded area 550 comprises a touch sensitive pad.

It should be appreciated that entire vehicle 200 can be hand launched (depending on the size of the vehicle 200). The propeller safety system 272 prevents energization of the propulsion bay while a person is touching the main gondola 250 (or other protected zone).

Envelope Venting and Blow-Hole Failsafe System

In some embodiments, the interior interface module 280 includes a pressure sensor 290 and solenoid 291 and solenoid valve 292. The processor 282 monitors the pressure inside the vehicle 200 by monitoring data provided by the pressure sensor 290 as a redundant check and in conjunction with the differential pressure sensors of the main embedded system 251 (See FIG. 8). In a failure mode, such as when the vehicle systems determine that the vehicle has been shot or the tether has been cut, for example, the interior interface module 280 can activate the solenoid 291 to open a blow-hole configured for a large scale release of fluid from within the vehicle 200 or activate the solenoid valve 292 for controlled release of fluid. In some embodiments, the diameter of the blow-hole may range from two inches to twelve inches. Those skilled in the art will recognize from the present disclosure that the size of the blow-hole may at least in part be determined by the size of the vehicle 200. It should be appreciated that a single solenoid 291 can be configured to operate multiple blow-hole safety releases using a plunger that is activated by the single solenoid. Alternatively, separate solenoids can be provided to operate dedicated blow-hole valves.

The solenoid valve 292 can be activated in connection with the ballonet assembly 226 operation to maintain a constant pressure differential between the inside of the vehicle 200 and the atmospheric pressure. However, if the vehicle 200 determines that it is outside of a desired range because of some catastrophic failure, the processor 282 may activate the solenoid 291 to quickly ground the vehicle 200. Controlled venting of lifting gas may occur during a rapid landing approach in high winds, a determination that the vehicle is unable to return to the CCIS 150 or operations where the airship needs to land quickly in order to not reveal the position of troops to enemy combatants, e.g. controlled rapid decent for supply delivery in an area where envelope detection is undesirable. By the time the airship is reaching the ground it would in some embodiments contain only 30% lifting gas remaining, thus the vehicle experiences controlled but quickly descending flight and the remaining lifting gas may be quickly dispensed once the vehicle 200 is on the ground. All of this makes any detection of the vehicle 200 far less likely.

In some embodiments, the solenoid valve 291/292 fails open and allows for resealing once the vehicle 200 is recovered. As shown in FIGS. 18A and 18B, the solenoid valve 291/292 is held in place with a normally open solenoid 450, such that if an unexpected total loss of power occurred, the blow-hole fails open, vents the lifting gases and the vehicle 200 will descend. FIG. 18A shows the solenoid valve 291/292 in the operating position and FIG. 18B shows the solenoid valve 291/292 in the open/venting position. In some embodiments, the solenoid valve 291/292 includes a valve body 452 and valve seat 454 made from rubber. The shape and hardness of the valve body 452 and valve seat 454 are factors contributing to the success of the solenoid valve 291/292. The seal needs to be helium (or other lifting gas) tight, and still be able to allow the valve body 452 to fall away if power is removed from the solenoid 450. In the embodiment of FIGS. 18A and 18B, a tapered valve body 452 that the solenoid 450 attaches to is pulled or pushed into a valve seat 454 that is lined with rubber.

In another embodiment, the allowed displacement of the valve body 452 may be varied for a slow, controlled venting valve. As shown in FIG. 22A-B, a travel limiting stop 470 may be provided that limits the length of travel of the valve body 452. It will be appreciated that the valve bodies 452 are controlled by solenoids 450 in some embodiments although not illustrated in FIG. 22A-B. The solenoid valve 292 on the left in FIGS. 22A-B is for controlled venting, such that even when fully open can still be pulled close by the solenoid, thus the travel limiting stop 470 in this area does not allow the valve body 452 to completely clear the valve seat, thereby limiting the rate at which fluid that may be vented through the valve. The solenoid valve 291 on the right in FIGS. 22A-B functions as a blow-hole and is used for safely grounding the airship, thus the travel limiting stop in this area allows the valve body 452 to completely clear the valve seat but still captures it so that it is not lost.

Main Envelope Chamber Vent and Refill with Air Capability

In a situation where the majority of the payload is offloaded from the vehicle 200 and there are no means (or it is inconvenient) to add ballast back to the vehicle 200, means to add air and/or vent lifting gas may be provided. For example, for a typical ballonet of 30% total envelope volume that is already full, there may be the desire to, with force, vent more of the lifting gas to reduce buoyancy. Instead of, or in addition to, using the blow-hole solenoid valve 292 discussed above, a blower fan in series with a solenoid valve may be connected to the vehicle 200 envelope to actively suck lifting gas from the main lifting gas chamber. Additionally, a second blower fan in series with a second solenoid valve (or alternatively the same blower fan operating in reverse) may be used to force air into the main lifting gas chamber.

Sensor Pod

Figure 10:
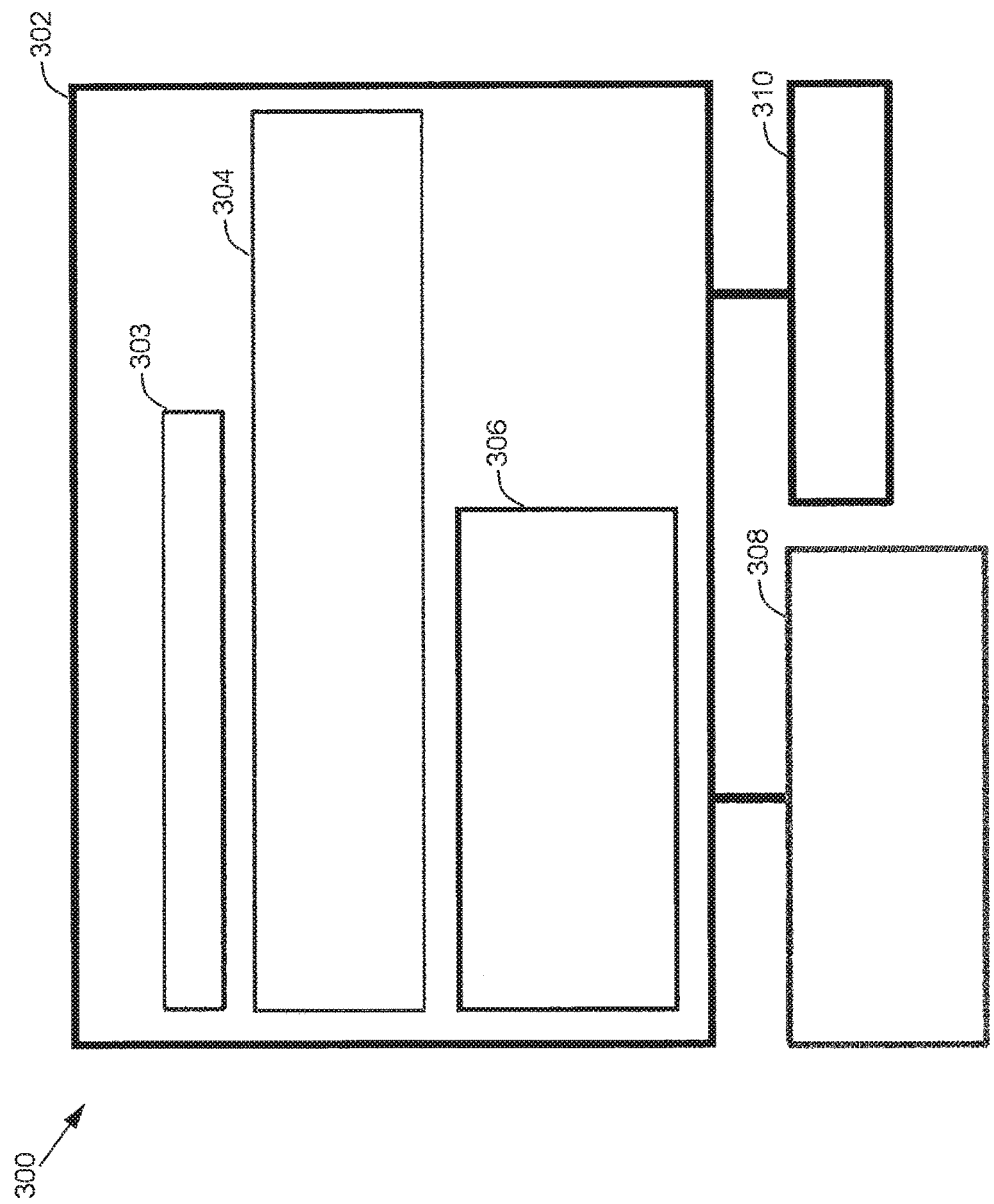
FIG. 10 is a block diagram of the sensor pod of FIG. 6A depicting various components of the sensor pod.

Referring to FIGS. 6 and 10, a block diagram of the sensor pod 300 is depicted. The sensor pod 300 includes a sensor pod controller circuit 302 which include a processor 303, a power conditioning and monitoring circuit 304 and an inertial measurement unit 306. The sensor pod 300 also includes an RF transmitter circuit 308 that, under the control of the processor 303, transmits video and other sensor data from the video unit/sensor unit 310. Besides video, the RF transmitter circuit transmits other sensor data such as audio, position data and general health of the vehicle (i.e., pressure data, battery life, laser painting data described above, etc.).

Modularity and Redundancy

It should be apparent from the above description, that the components used in the vehicle 200 are intended to be modularized for ease of replacement for repairs, upgrades and modifications to add, remove, or change the various components. As a result there are several levels of redundancy. For example, in the systems described above there are distributed processors, power conditioning/monitoring circuits, etc. The distributed approach provides modularity as well as redundancy in case of failure of one or more systems. While this distributed approach is by design, it should also be appreciated that combining redundancies into a more central system approach is also contemplated by the authors of the present disclosure. In such a system, fewer parts can be used. However, one cost of the central approach is lack of modularity as well as lack of redundancy.

Modular Self-Configuration

In some embodiments, many of the subsystems on the vehicle 200 self-configure to the environment through their own local sensors and processors. For example, a fin may have positional awareness by the inclusion of a 3-axis accelerometer. The fin processor is programmed to move the fin to a predetermined starting position upon being powered up, so the processor may operate the appropriate drive motor(s) to move the fin until its position, as determined by the 3-axis accelerometer, matches the preprogrammed starting position.

Any of the subsystems on the vehicle 200 may be designed to self-configure. Once the subsystem is powered up and its orientation determined (if needed), the subsystem announces its presence on the system communications bus, and it is recognized by the main system processor. The main system processor will not start operation of the full vehicle system without all predetermined "necessary" components, and in some embodiments will communicate to a user which necessary subsystems it believes are still missing. The main system processor also handles conflicts, e.g., two starboard (right) fins reporting presence, and will "reboot" conflicting fins using the communication bus, and/or at some point alert the user. Such self-configuration greatly simplifies the construction/repair of the vehicle, particularly if it is being assembled in the field (e.g., in a theater of war).

Disposable Piggyback Bladder

Figure 13:
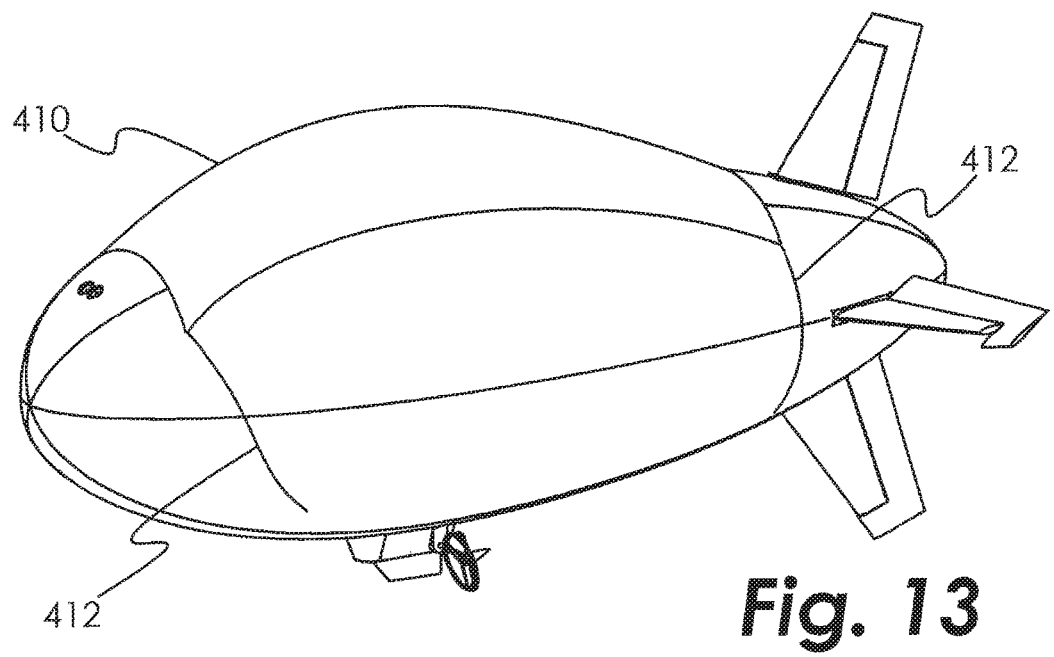
FIG. 13 is a schematic representation of a piggyback bladder installed on a vehicle according to one embodiment of the present disclosure.
Figure 14:
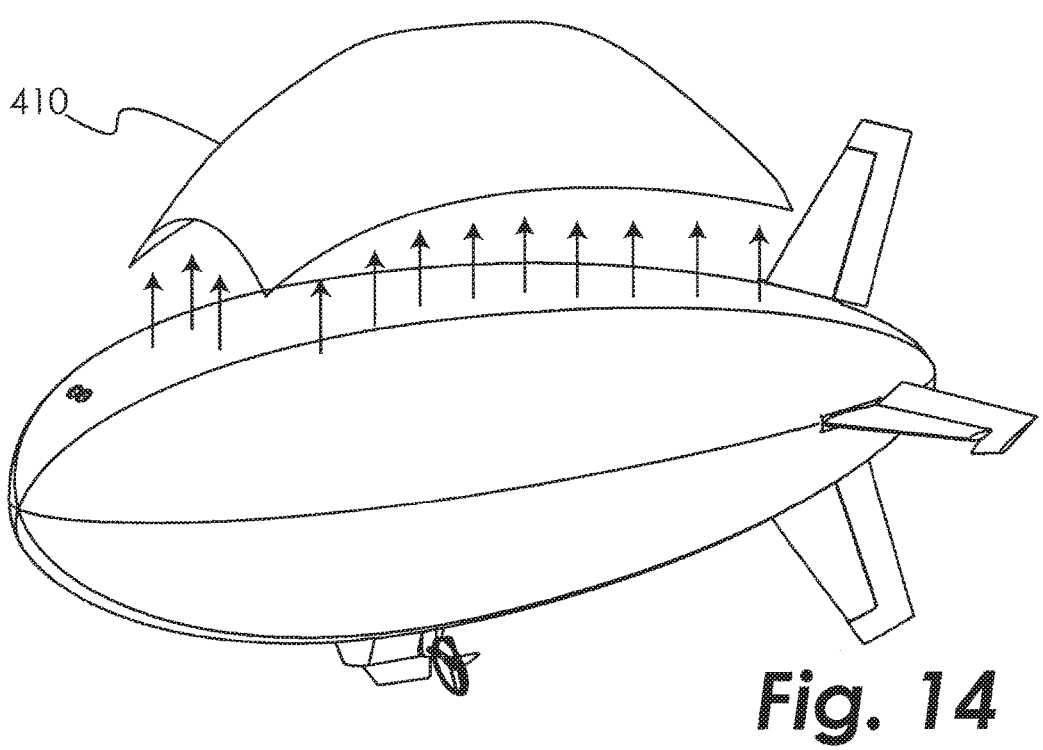
FIG. 14 is a schematic representation of the piggyback bladder of FIG. 13 released from a vehicle according to one embodiment of the present disclosure.

In some situations, such as when delivering a heavy payload, it may be desirable to provide extra buoyancy to the vehicle 200. One way to achieve this is to provide an external saddle bladder that fits around the outside of the vehicle 200 envelope, thereby allowing the user to strap on "extra lift" to the vehicle 200. One embodiment of such a piggyback bladder 410 is illustrated in FIGS. 13 and 14. The piggyback bladder 410 may be a sheet of material that uses a portion of the vehicle 200 envelope to form one side of the extra fluid holding chamber (as illustrated in FIGS. 13 and 14), or the piggyback bladder may be self-contained and not require cooperation of the vehicle 200 envelope to hold the fluid. The piggyback bladder 410 is able to quickly release from the main envelope of the vehicle 200 and thereby instantly removes a predetermined amount of lift/buoyancy. This would be useful if, for example, where emergency supplies were dropped from the vehicle 200 and the unmanned vehicle 200 had to quickly redeploy before ballast could be added. The piggyback bladder 410 may be releasably attached to the vehicle 200 in any convenient fashion. FIGS. 13 and 14 illustrate the piggyback bladder 410 held onto the vehicle 200 by means of cords 412. In some embodiments, the cords 412 may be released from the vehicle 200 by activation of solenoids (not shown) under control of a data processing device in the vehicle 200 or the CCIS 150.

Sealed Wire Bundles

Over time, the lifting gas inside the vehicle 200 envelope can escape through various locations, including through wire used for various functions onboard the vehicle 200. For example, bundled wire, such as CAT5e, CAT6, etc., typically used for network applications is one such location for escape of the lifting gas. In its standard commercial configuration, these bundled wires can allow the lifting gas to enter the wire shield or casing through the connectors and through the empty spaces between the wire shield or casing and the insulation/interior wires. In one embodiment of the present disclosure, this characteristic of bundled wire is changed by a vacuum sealing technique. A vacuum is pulled on one end of the wire while the other end of the wire is inserted into a reservoir of appropriate sealant, such as silicone caulk or epoxy, for example. As the vacuum extracts the air from this now closed system, the sealant is pulled into at least a portion of the voids within the wire bundle. After a period of time, which varies depending on the viscosity of the sealant, the size of the opening in the wire, the length of the wire, the level of vacuum applied to the system, and other variables (but is typically 1-60 minutes), the wire bundle has been at least partially impregnated and the sealant will then cure as necessary. The commercially available wire is now helium (or other gas) proof, such that if the wire is used to send voltage and communications to electronics inside the envelope of the vehicle 200, air will not leak into the envelope and helium will not leak out through the modified bundled wires.

Vehicle Failsafes

It should also be appreciated that the vehicle 200 is configured so that it is not lost, whether due to end user error, catastrophic failure, or system anomaly. This autonomous characteristic is achieved through self-monitoring processes calculating range, remaining power, pressure within the vehicle and other general health conditions that are monitored and communicated to the ground station system 100. Aspects of the autonomous characteristics include one or more of the following: i) blowhole safety valve (described above with respect to solenoid 291 depicted in FIG. 9) which prevents a float away condition, ii) ballonet system 226 which is part of a pressure monitoring system that maintains a constant pressure differential between inside of the vehicle 200 and atmospheric pressure, iii) multiple chambers within the shell 202 that allow the airship to remain airborne longer, even with part of the shell 202 being compromised, iv) a manual pull ripcord that will open a hole in the skin (can be used when the vehicle 200 is near the ground or while tethered (see below), and v) automatically returning to a set of designated coordinates on the ground by adjusting the pitch of the blades 229 and the fin assembly 204 and descending to positions at the designated coordinates on the ground.

Figure 12:
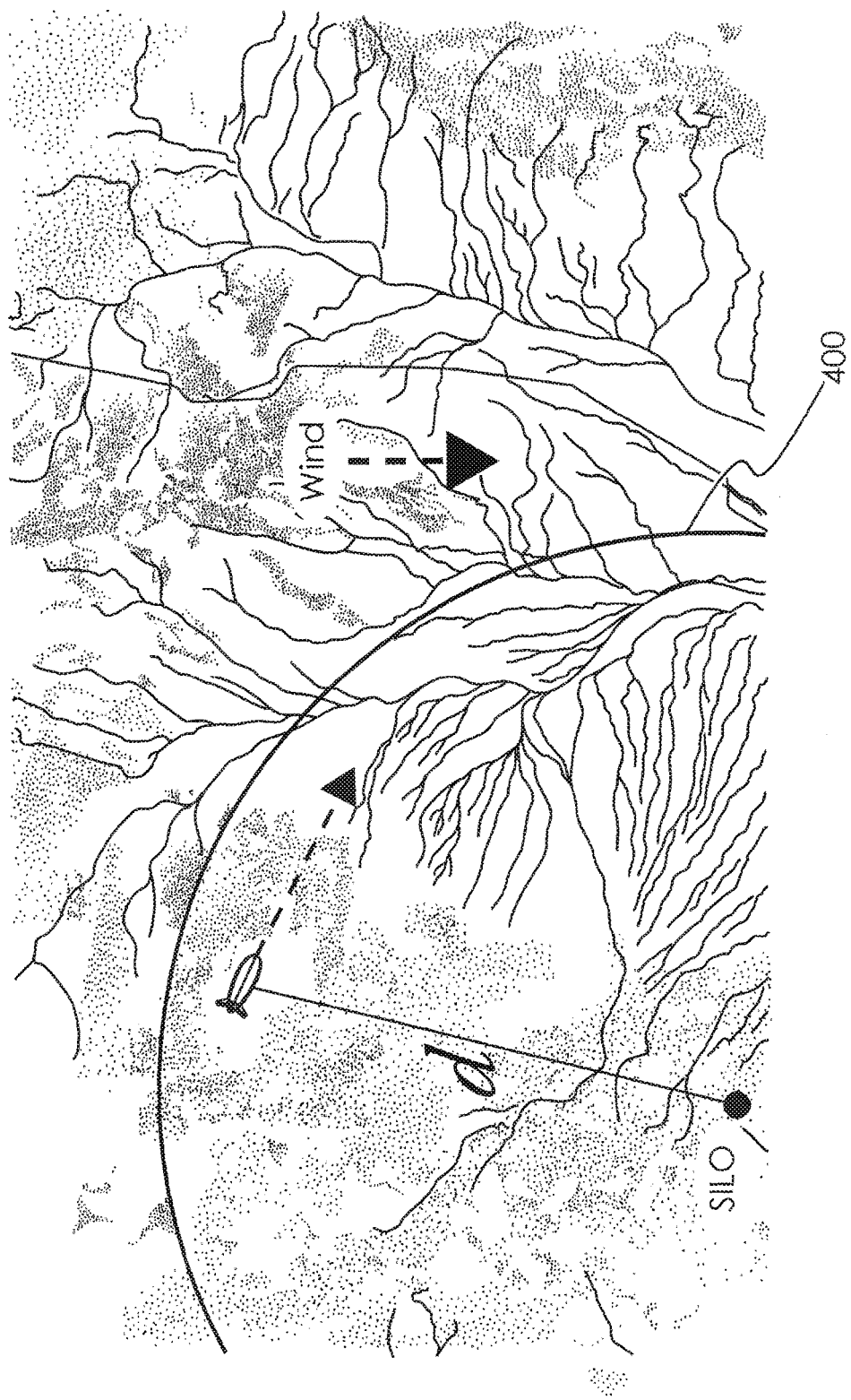
FIG. 12 is a schematic representation of a vehicle establishing a soft wall radius according to one embodiment of the present disclosure.

As shown in FIG. 12, in some embodiments the vehicle 200 self-monitors various environment data including mean power consumption for 30 second, one minute, 10 minute and entire mission, remaining battery charge, wind speed, wind direction, ambient temperature, current heading, speed, relative position and distance to the CCIS 150. A fewer or greater number of factors can be considered in the self-monitoring process. Using the self-monitored environment data, the vehicle 200 calculates a soft wall radius 400 from which it can always return back to the CCIS 150. Due to changing weather conditions or mission characteristics, this radius 400 is dynamic and constantly being updated, but only significant changes are communicated back to the user of the CCIS 150. If the CCIS 150 commands the vehicle 200 to proceed to a GPS waypoint that is outside the soft wall radius 400, the vehicle 200 will fly to its soft wall limit 400 and alert the user of the CCIS 150 to the fact that the vehicle 200 will not have enough remaining battery charge to return to the CCIS 150. The vehicle 200 will not proceed beyond the soft wall limit 400 unless over ridden by the user of the CCIS 150.

Tethered Vehicles

While the vehicle 200 is configured to be autonomous or semi-autonomous, a tethered embodiment is also envisioned. In such an embodiment, a cable connects the airborne vehicle 200 to the ground station system 100 to provide communication through the tether. In other embodiments, the tether or cable is merely to maintain the general position of the vehicle 200 without communication links in the cable, and communication is instead accomplished using radio, light, or other appropriate forms of communication. The vehicle 200 remains under power (i.e., propulsion) to maintain position, however, data is securely transferred between the ground station and the vehicle, either through the tether or by other means. Additionally, power may be provided to the vehicle 200 through the tether. As noted above, the vehicle 200 may be configured to be tethered or untethered.

In some embodiments, the tether may be retracted onto a motorized spool (not shown) carried by the vehicle 200. Once the vehicle 200 tether is released from the ground, the vehicle 200 control system may rotate the spool to retract the tether back to the vehicle 200. In some embodiments, the vehicle 200 may be programmed to fly to a designated location, and extend its tether to the ground where it may be retrieved by a user and used to secure the vehicle 200. In other embodiments, this procedure is used to land the vehicle 200, either by the user pulling down on the tether until the vehicle is grounded, or by the user securing the tether and the vehicle 200 rotating the spool to retract the tether, thereby lowering the vehicle 200 to the ground. In other embodiments, the non-spool end of the tether is attached to the vehicle 200 and the spool is lowered to the ground by unreeling the spool.

In some embodiments, the tension in the tether line is maintained substantially constant by changing the angle of attack of the fin control surfaces. A tension gauge within the tether line may measure the tension in the line and provide this information to the onboard computer that is monitoring the aerodynamic sensors to calculate the most effective angle to which to command the fins. Such a tension gauge may be located at any position along the length of the tether line. In other embodiments, the winding spool of the tether may include a clutch or brake that allows it to slip at certain predetermined loads, which aids in reducing shock loads. In other embodiments, a section of elastic line, spring, or other device that allows temporary linear expansion of the tether line, may be inserted into the tether line in order to reduce the shock loads.

The tether may be used to attach the vehicle 200 to ground vehicles to, for lack of a better term, create a mobile aerostat. This configuration saves on run time for the batteries and also allow the airship to function in high winds outside its regular operating conditions. This configuration is especially useful for convoy protection, where one or more tethered vehicles 200 accompany the convoy to provide aerial reconnaissance. The control system can still stabilize and adjust the control surfaces of the vehicle 200 to minimize disturbances from the wind and hold a heading of the vehicle 200 as desired. This will also ensure that the tension in the tether line is not exceeded, as happens with prior art systems. Furthermore, the benefit of safety systems already integrated in the airship would remain available.

The vehicle 200 can also separate from the ground vehicle at any time to go pursue a target of interest or perform other missions. As the vehicle 200 separates from the tether line, it begins the trimming process to ensure that it has the correct bag pressure and lifting gas for non-tethered flight.

Side Force Generator

Figure 33:
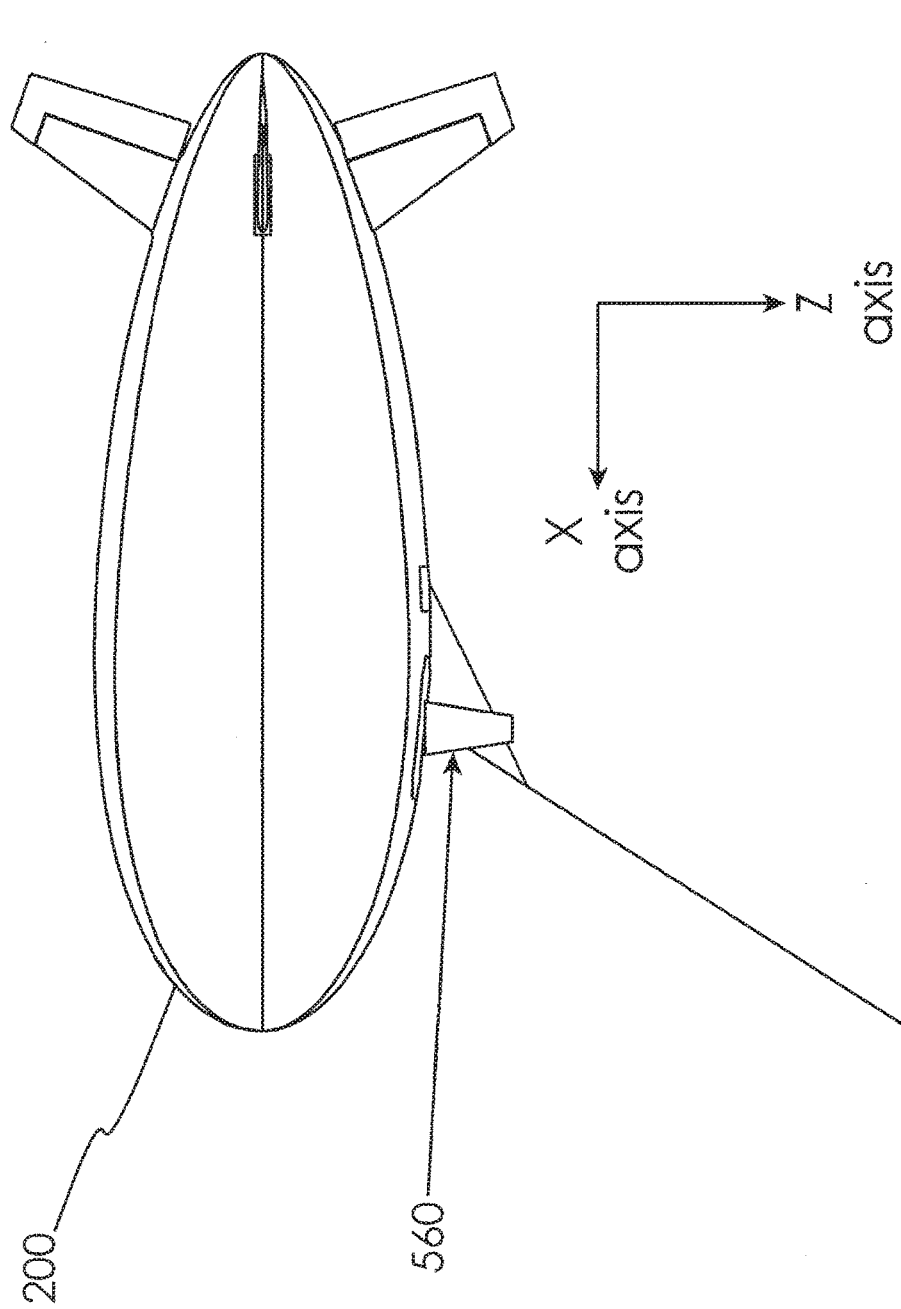
FIG. 33 is a schematic representation of a vehicle having an extra set of side force generating fins according to one embodiment of the present disclosure.

When the vehicle 200 is tethered, it is subject to being moved in a back and forth pattern during gusty wind conditions. As shown in FIG. 33, an additional set of fins 570 may be placed on or near the vehicle 200 centerline, such as on the gondola, tether attachment plate, vertical tail fin, or on the tether line directly. These fins 570 have small control surfaces or the entire fin 570 deflects, and can vary the angle of attack based upon feedback from the vehicle 200. Since the fins 570 are placed on or near the axis of the tether line, very little rotational moment about the z axis is generated. The lateral force, along the y axis, is used to damp out any oscillations along the y axis caused by wind.

Tether Attachment Plate

Figure 34B:
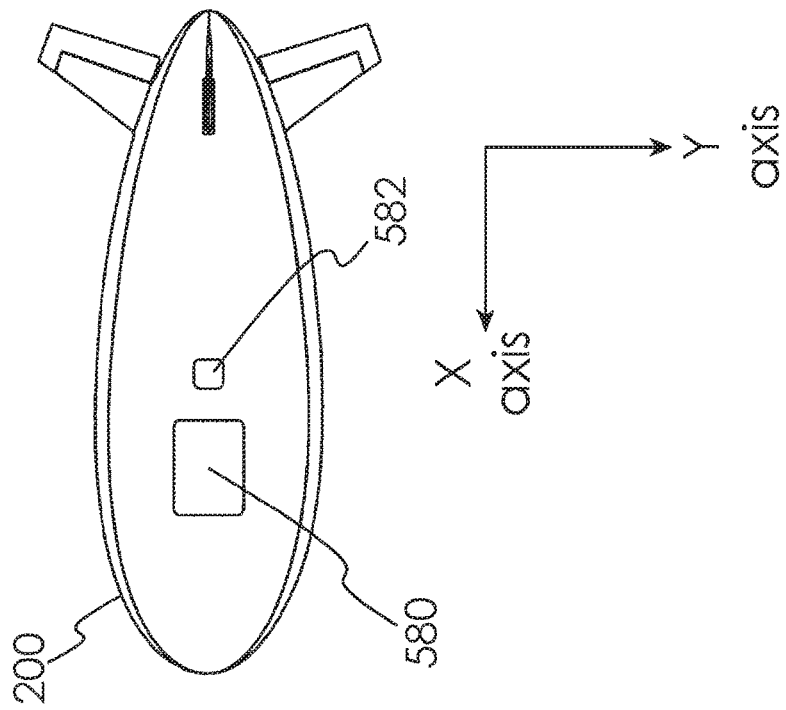
FIGS. 34A-B are schematic representations of a vehicle having tether attachment plates according to one embodiment of the present disclosure.
Figure 34A:
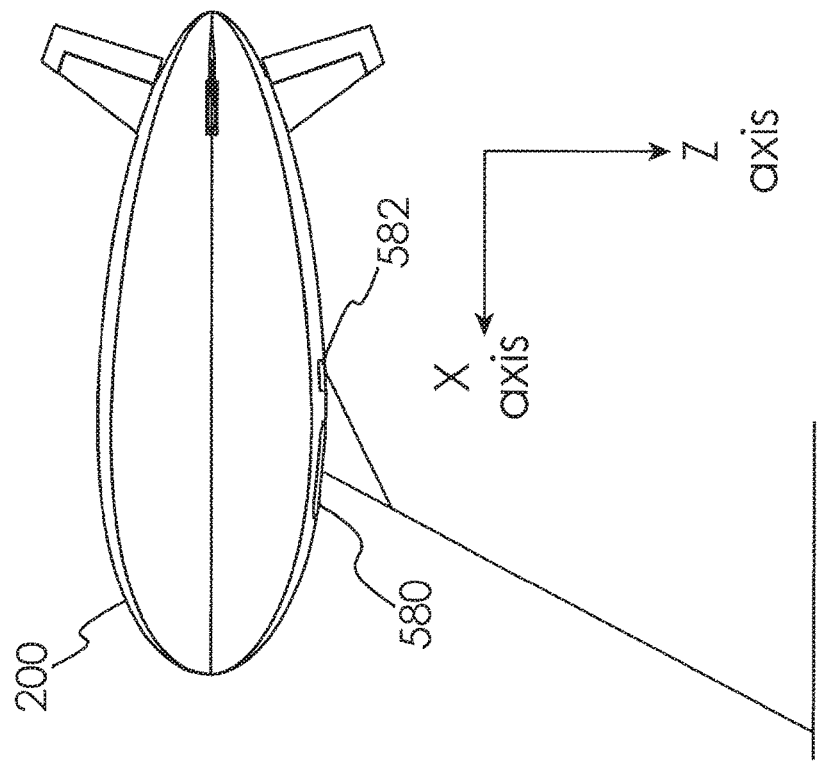

As shown in FIG. 34A-B, an aerostat tether attachment plate 580 may be provided to distribute the forces from the tether line evenly across a larger surface area of the envelope. This eliminates (or greatly reduces) the number of associated lines, extra tethers, or guy wires that are necessary in the prior art to operate an aerostat. For larger aerostat platforms with various stitching patterns and reinforcements to the envelopes (such that the envelope surface is not planar), appropriate channels may be made in the surface of the attachment plate 580 that faces the envelope in order to accommodate such features. As shown in FIG. 34A-B, a smaller plate 582 may be provided as a backup feature coupled to a secondary line running from the tether line to the secondary attachment plate 582.

Vehicle Buoyancy Control

In some embodiments, a weight with a quick release mechanism can be attached to the vehicle 200 to affect the buoyancy of the vehicle 200. In addition, the ballonet assembly 226 can be filled with the same fluid as the shell (e.g., helium) to provide additional buoyancy.

In one embodiment, a solenoid valve (not shown) and an air moving apparatus (not shown), e.g., a fan, can be used to moved air into the shell to affect buoyancy of the vehicle 200. This approach is particularly useful when the vehicle 200 is utilized to provide transport of a payload to a designated location, and wherein after the transfer the vehicle may have excessive buoyancy.

Projectile Resistance

With the main processing components being co-located in the main gondola 250, a bullet resistant layer may be provided in the main gondola 250. Also, as discussed above, for reasons of serviceability, analog dampening, sensor isolation, etc., the main gondola 250 may be physically separated from other compartments, e.g., the propulsion bay 230. However, it should be appreciated that the different compartments can be combined into one assembly and attached to the shell 202. In addition, certain components can be placed inside the shell 202 to protect against environmental conditions.

Rigid, Semi-Flexible and/or Flexible Support Structure

Figure 24A:
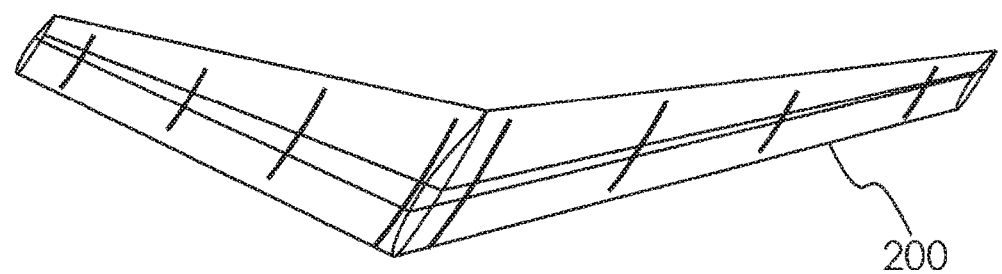
FIGS. 24A-C are schematic representations of a vehicle having rigid, semi-flexible, and/or flexible support structures according to one embodiment of the present disclosure.
Figure 24B:
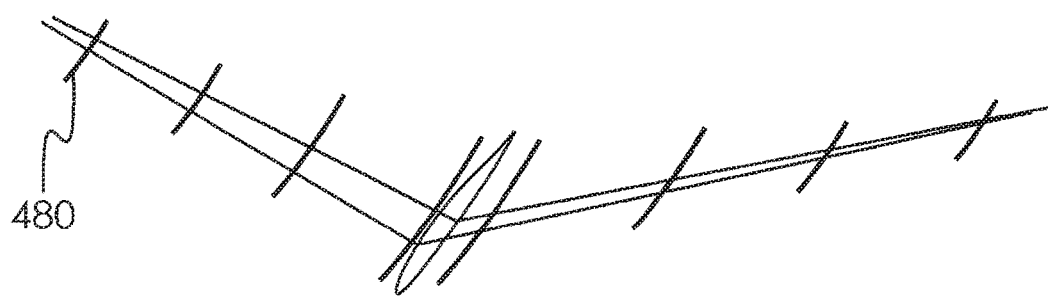
Figure 24C:
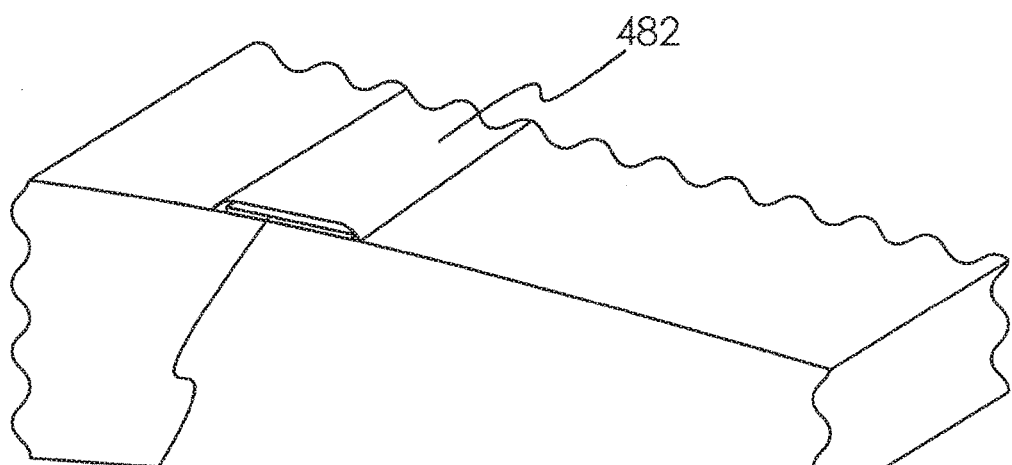

In some embodiments, the vehicle 200 comprises non-uniform, non-revolved shapes. For example, FIG. 24A shows an airship in the shape of a traditional flying wing. In some embodiments, reinforcing elements 480, such as rods, plates, tubes or the like, may be inserted into flexible sleeves 482 to add shape where desired by the designer, as shown in FIGS. 24B-C. The reinforcing elements 480 may be rigid, semi-flexible, and/or flexible. In some embodiments, the reinforcing elements 480 may be planar as shown in FIG. 24C. The reinforcing elements 480 are easily removed for packability and the reinforcing elements 480 are not joined to one another, so the vehicle may be broken down into just the reinforcing elements 480 and the envelope. Such a construction allows for rotationally non-symmetric shapes to be achieved. Aerodynamics or payload considerations may drive the desire to produce a vehicle having such shapes.

Non-Symmetric Shapes

Separate chambers in the vehicle 200 may be used to form non-symmetric shapes. For example, FIG. 28 illustrates three similar length airships with diverse flying characteristics used for different profiles. In some embodiments, the separate chambers can be used with reinforcing elements 480 to form non-symmetric shapes. Other reinforcements may include filaments, such as carbon tow or similar materials in tension, or a shell to force the chambers to hold a specific aerodynamic shape. The carbon tow can be manufactured into the envelope film, allowing for more complicated, asymmetric aerodynamic shapes.

Figure 29:
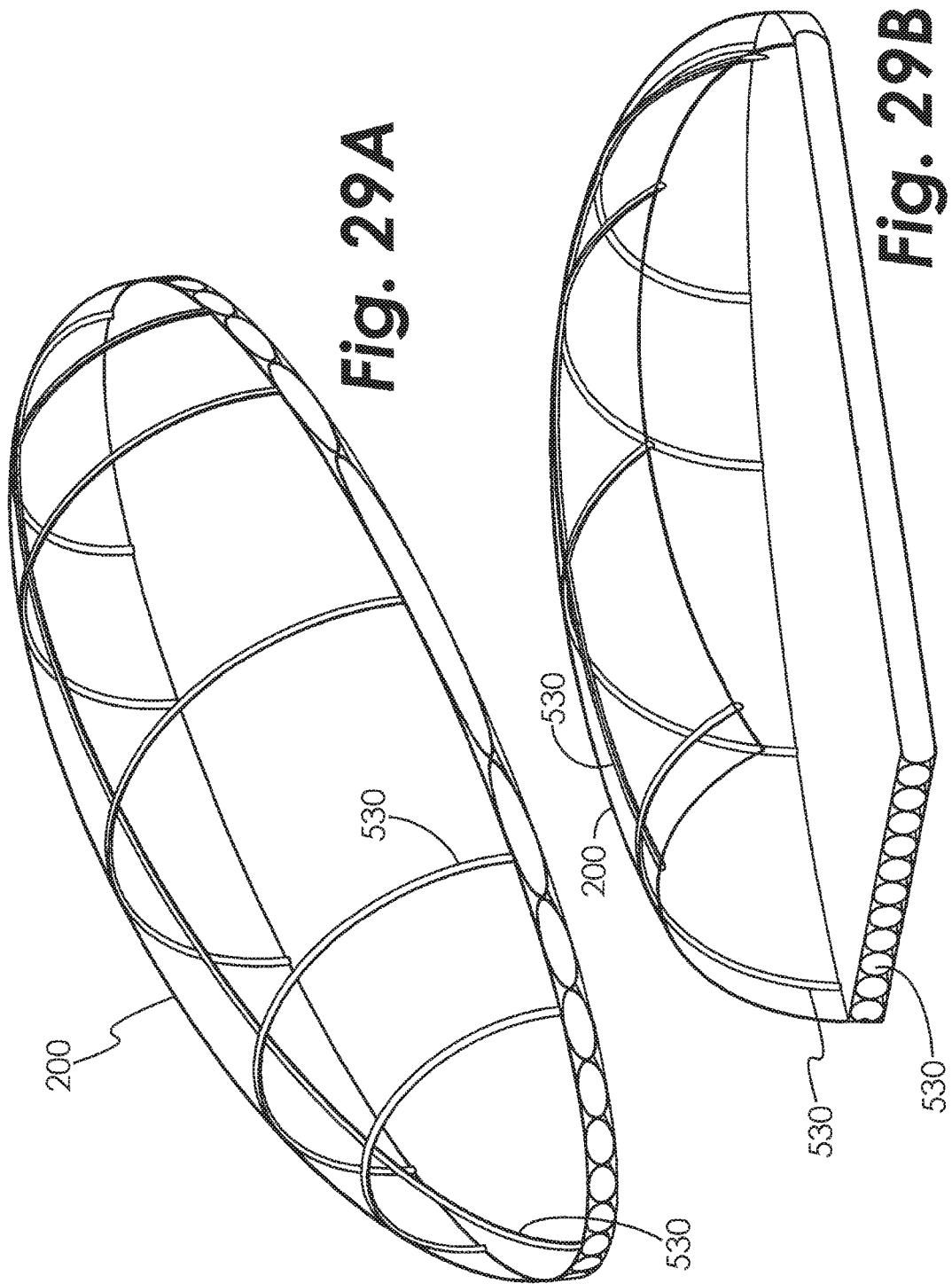
FIGS. 29A-B are schematic representations of a vehicle having pressurized tubes that dictate a shape of the vehicle according to one embodiment of the present disclosure.

Additionally, as shown in FIGS. 29A and B, high pressurized tubes 530 that run along the length of, or in rings around, the envelope or in any path necessary to hold the material in the desired shapes may be provided. Changing the pressure in the tubes 530 acts to change the shape of the vehicle 200 as needed, even during flight, relative to the mission, wind, speed and other variables.

Use of Vehicle as a Ground Shelter

In yet another embodiment, the vehicle 200 can be used as a shelter on the ground by removing fluid therein and replacing with air. The shell 202 can be used as a tent (shelter) in an emergency situation.

Internal Payload Bays

Figure 25A:
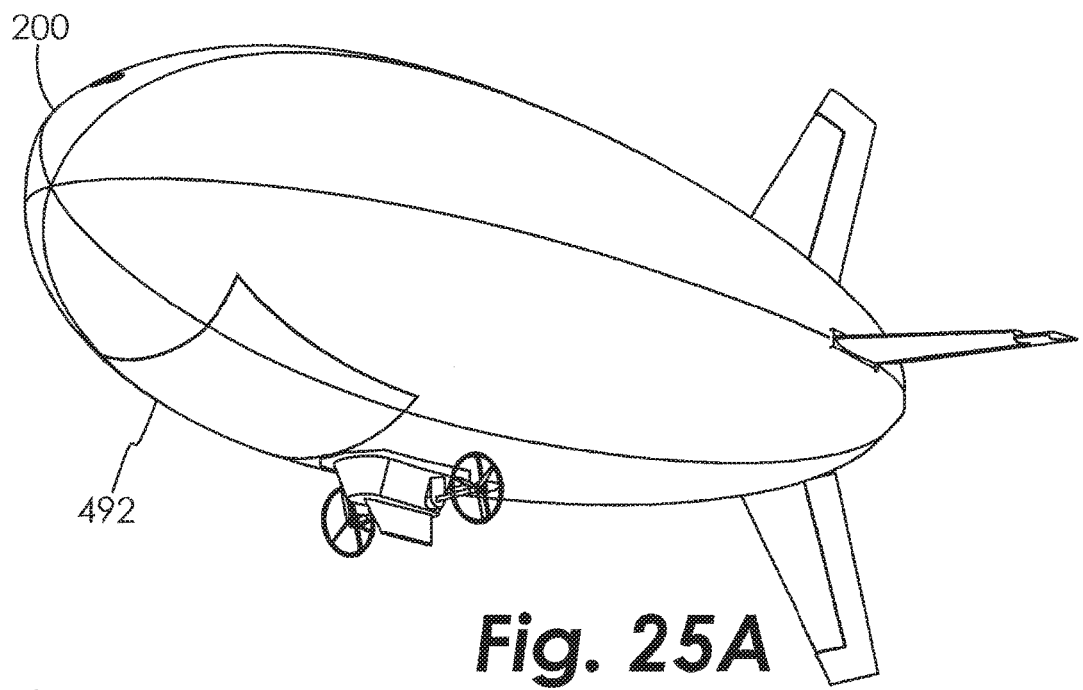
FIGS. 25A-B are schematic representations of a vehicle having an internal payload bay according to one embodiment of the present disclosure.
Figure 25B:
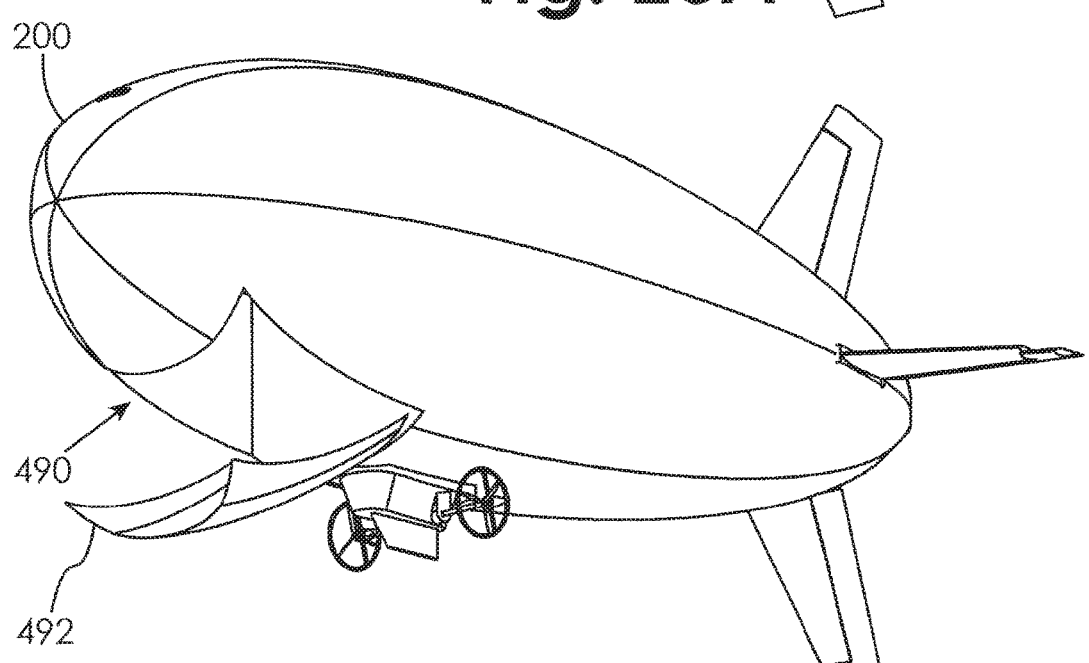

Internal payload bays of any configuration may be provided within the vehicle 200 envelope. One embodiment of such a payload bay is shown in FIGS. 25A and B. In the embodiment of FIGS. 25A and B, a payload bay 490 comprises an interior space segregated from the fluid holding chambers of the vehicle 200. The walls of the payload bay 490, including the retractable door 492, may be constructed from a rigid or semi-rigid material, such as carbon fiber, Kevlar, etc., for carrying substantial payload weight that is to be offloaded at a destination or while in flight. The compartment may be placed anywhere on the vehicle 200, while keeping in mind the airship flight and mass characteristics. Additional ballast, or additional payload bays, may be added on other parts of the vehicle 200 to compensate for the payload bay 490.

Field Servicing Tools Carried on the Airship

In some embodiments, field assembly and maintenance tools are carried onboard the airship, and may be redundant to some of the tools carried in the Command and Control Interface System 150. The presence of the tools onboard the airship allow for remote field servicing and ensures that repair is possible away from the Command and Control Interface System 150 or dedicated service facility.

Strong Magnets for Envelope Attachment

Figure 35:
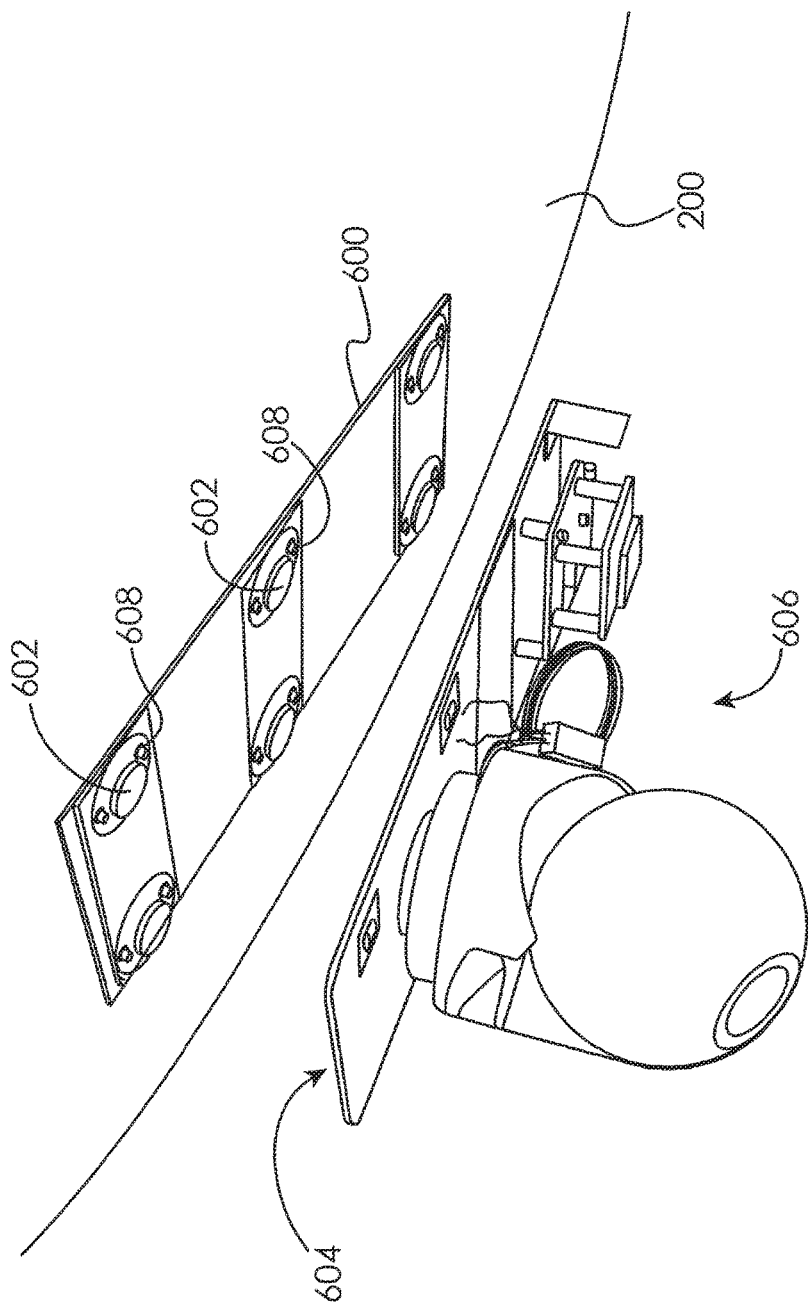
FIG. 35 is a schematic representation of a vehicle equipment attachment plate according to one embodiment of the present disclosure.

In some embodiments, attachment surfaces may be glued or otherwise attached to the envelope, and such attachment surfaces may include magnets to hold and/or align items being attached to the attachments surface. For example, as shown in FIG. 35, an equipment attachment surface 600 may be disposed on the bottom of the envelope. In some embodiments, the equipment attachment surface includes one or more magnets 602 that attract and hold one or more ferrous surfaces 604 on the equipment 606 to be mounted, such as a sensor pod or gondola to name just two non-limiting examples. In some embodiments, the one or more magnets are on the equipment 606. In other embodiments, both the equipment 606 and the equipment attachment surface 600 include magnets, either at different locations or at the same locations but with opposite magnetic polarity. In some embodiments, the equipment attachment surface 600 and/or the equipment 606 additionally have further alignment devices, such as protrusions 608 and corresponding recesses, to ensure that the equipment is properly aligned with the equipment attachment surface 600. The equipment attachment surfaces 600 may be used to attach any item to the vehicle, such as pods, sensors, lights, handles and tether coupling points, to name just a few non-limiting examples. The presence of the magnets 602 allows for quick coupling and uncoupling and, in some embodiments, the magnets 602 provide a self-aligning attachment mechanism.

Blimp-to-Blimp Information Communication

When a network of aerostats or airship systems is deployed at the same time, each blimp is monitoring the conditions at its location. Each of the blimps may therefore communicate their local conditions to each of the other blimps, either directly or through a central communication hub. For example, the blimps may monitor any type of local condition, such as weather conditions or the presence of enemy fire. This information will give blimps downrange of a weather issue or an area of enemy fire a predictive capability to prepare for that disturbance or to avoid it, such as by changing locations or grounding the vehicle.

Vehicle Cocoon

Figure 36:
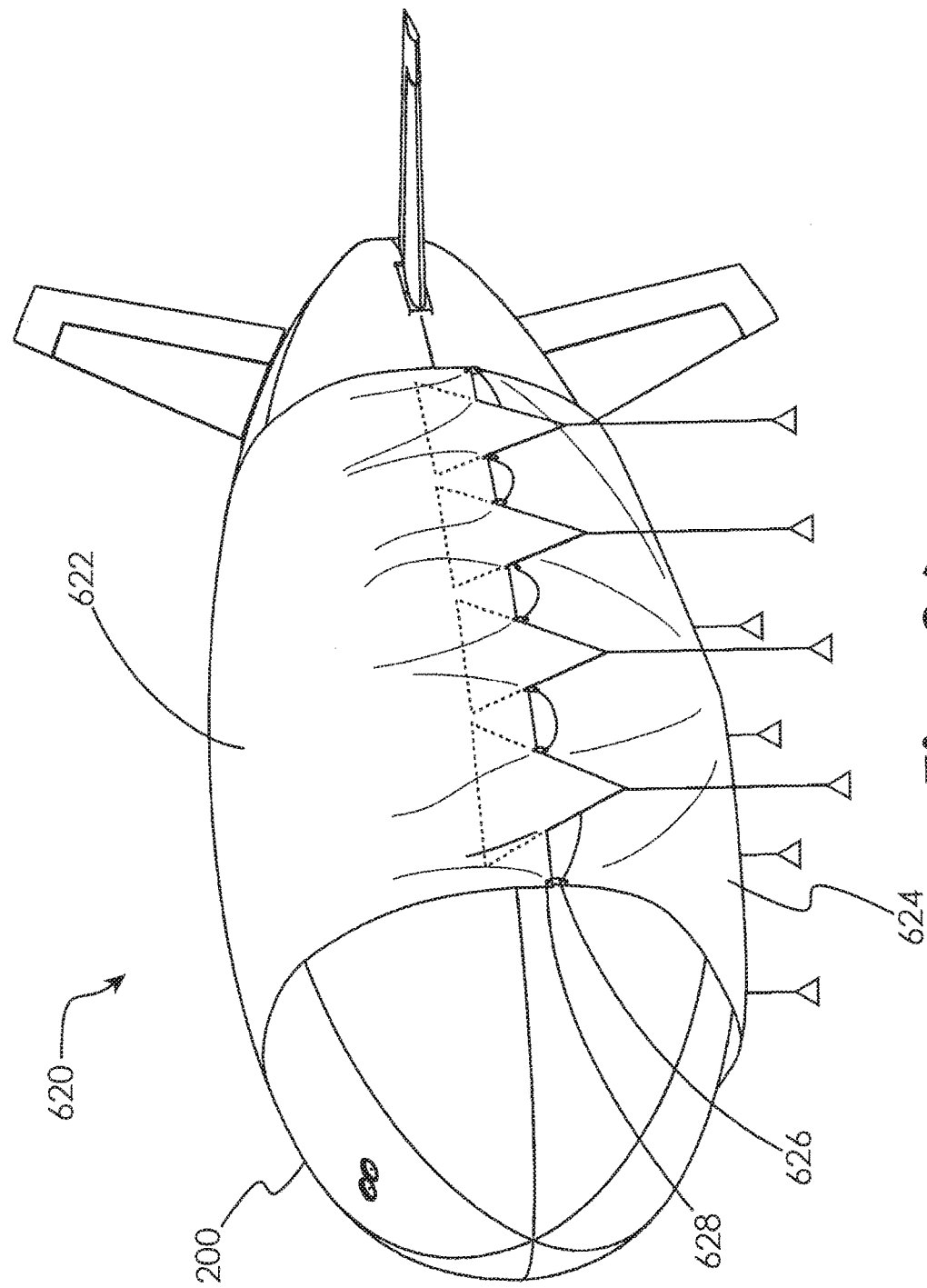
FIG. 36 is a schematic representation of a vehicle cocoon according to one embodiment of the present disclosure.

As shown in FIG. 36, a vehicle "cocoon" 620 may be provided to assist in the inflation of the vehicle 200 and/or to assist with working on the vehicle 200 on the ground. Cocoon 620 comprises an upper cocoon portion 622 and a lower cocoon portion 624. Upper portion 622 may be releasable joined to lower portion 624 along the edges thereof, such as by fasteners 626 and grommets 628 (or any other desired fastener system). In some embodiments, the upper portion 622 and lower portion 624 are permanently or semi-permanently joined around approximately one half of their peripheries, and releasable joined around the other approximate one half of their peripheries. The cocoon 620 has provision for staking the cocoon to the ground (or other mounting surface, such as a ground vehicle), such as triangular flaps 630 to which guy wires may be affixed, with the other end of the guy wires secured to the ground. In some embodiments, the cocoon 620 is placed only around portions of the vehicle 200 forward of the fins.

In use, the cocoon 620 may be deployed around a non-inflated vehicle 200 and staked to the ground. Then the vehicle may be inflated and the cocoon 620 will prevent the vehicle from floating away. The cocoon 620 also serves to provide a protective surface to prevent the vehicle envelope from being damaged by being in contact with the ground while being inflated.

The cocoon 620 may also be used to secure a previously inflated vehicle to the ground. The lower portion 624 is laid under the vehicle, and the upper portion 622 is thrown over the top of the vehicle. The portions 622 and 624 are then joined together and staked to the ground.

The vehicle may be released from the cocoon 620 by removing the fasteners 626 on one side of the vehicle. The vehicle will then float upwards, with the upper portion 622 falling toward the side on which it is still fastened to the lower portion 624. It will be appreciated that the cocoon 620 provides a convenient means for working on the vehicle on the ground, while also making it easy to release the vehicle when it is desired for the vehicle to become airborne. The cocoon 620 may be made from any desired material, such as nylon to name just one non-limiting example.

Mission Conduct

Detail regarding one embodiment method of conducting a mission including start-up, system arming, system launch, system mission, and system recovery (including communication), are depicted in Appendix A (e.g., see FIGS. 1*a*, 1*b*, 1*c*1, 1*c*2, 1*c*3, 1*c*4, 2*a*1, 2*a*2, 2*b*1, 2*b*2, 2*c*1, 2*d*1, 2*d*2, 2*d*3, 2*d*4, 2*e*1, 2*e*2, and 2*e*3).

Those skilled in the art will recognize that numerous modifications can be made to the specific implementations described above. Therefore, breadth of the above disclosure is not to be limited to the specific embodiments illustrated and described above. Other variations, alternatives, modifications, improvements, equivalents, and substantial equivalents of the embodiments and teachings disclosed herein, are contemplated by the authors of the present disclosure.

What is claimed:

1. A fin assembly for a vehicle having a skin defining an interior volume adapted to hold a first quantity of fluid that is lighter than air, the fin assembly comprising:
   a first rod disposed within the interior volume, the first rod having a first end and a second end;
   a second rod disposed within the interior volume, the second rod having a third end and a fourth end;
   a first horizontal fin disposed external to the interior volume and operatively coupled to the first end through the skin;

a second horizontal fin disposed external to the interior volume and operatively coupled to the second end through the skin;

a first vertical fin disposed external to the interior volume and operatively coupled to the third end through the skin; and a second vertical fin disposed external to the interior volume and operatively coupled to the fourth end through the skin.

2. The fin assembly of claim 1, wherein the first and second rods are coupled to one another.

3. The fin assembly of claim 2, further comprising:
wherein the first rod extends along a first axis;
wherein the second rod extends along a second axis, forming and angle therebetween.

4. The fin assembly of claim 3, wherein the angle is substantially 90 degrees.

5. The fin assembly of claim 1, further comprising:
a first drivetrain at least partially enclosed by the first rod; and
a second drivetrain at least partially enclosed by the second rod.

6. The fin assembly of claim 1, further comprising:
a first stiffening plate disposed at the skin between the first end and the first horizontal fin;
a second stiffening plate disposed at the skin between the second end and the second horizontal fin;
a third stiffening plate disposed at the skin between the third end and the first vertical fin; and
a fourth stiffening plate disposed at the skin between the fourth end and the second vertical fin.

7. The fin assembly of claim 1, wherein at least one of the first horizontal fin, the second horizontal fin, the first vertical fin, and the second vertical fin cooperates with a propulsion system to assist the vehicle in maintaining and changing at least one of stability, altitude, or position.

8. The fin assembly of claim 1, wherein at least one of the first rod or the second rod is hollow.

9. The fin assembly of claim 1, wherein at least one of the first horizontal fin, the second horizontal fin, the first vertical fin, and the second vertical fin has an angle of approximately 45° with respect to a plane positioned along a longitudinal axis of the vehicle.

10. The fin assembly of claim 1, wherein at least one of the first horizontal fin, the second horizontal fin, the first vertical fin, and the second vertical fin is moveable by utilizing an actuator.

11. The fin assembly of claim 1, wherein at least one of the first horizontal fin, the second horizontal fin, the first vertical fin, and the second vertical fin is monitored by a pressure sensor.

12. The fin assembly of claim 1, wherein at least one of the first horizontal fin, the second horizontal fin, the first vertical fin, and the second vertical fin is integral with the vehicle.

13. The fin assembly of claim 1, wherein at least one of the first horizontal fin, the second horizontal fin, the first vertical fin, and the second vertical fin has a control surface, wherein the control surface may be at least one of rigid or non-rigid.

14. The fin assembly of claim 1 further comprising guides to support and maintain at least one of the first horizontal fin, the second horizontal fin, the first vertical fin, and the second vertical fin.

15. The fin assembly of claim 1, wherein at least one of the first horizontal fin, the second horizontal fin, the first vertical fin, and the second vertical fin includes at least one of a power circuit, a processor circuit, or a tri-axis accelerometer device.

16. The fin assembly of claim 6, wherein each of the first stiffening plate, the second stiffening plate, the third stiffening plate, and the fourth stiffening plate are fused to the skin by at least one of heat or pressure.

* * * * *